United States Patent
Jung et al.

(10) Patent No.: US 9,869,556 B2
(45) Date of Patent: Jan. 16, 2018

(54) MOBILE TERMINAL AND CONTROL METHOD THEREFOR

(71) Applicant: LG ELECTRONICS INC., Seoul (KR)

(72) Inventors: Dukyung Jung, Seoul (KR); Jinsang Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 137 days.

(21) Appl. No.: 14/784,689

(22) PCT Filed: Apr. 16, 2014

(86) PCT No.: PCT/KR2014/003307
§ 371 (c)(1),
(2) Date: Oct. 15, 2015

(87) PCT Pub. No.: WO2014/171734
PCT Pub. Date: Oct. 23, 2014

(65) Prior Publication Data
US 2016/0061613 A1    Mar. 3, 2016

(30) Foreign Application Priority Data

Apr. 17, 2013    (KR) .................. 10-2013-0042398

(51) Int. Cl.
*G01C 21/26*    (2006.01)
*G04G 21/02*    (2010.01)
(Continued)

(52) U.S. Cl.
CPC ............ *G01C 21/26* (2013.01); *G01C 21/36* (2013.01); *G01C 21/3632* (2013.01);
(Continued)

(58) Field of Classification Search
CPC ......... G01C 21/26; G04G 21/02; G04G 21/06
See application file for complete search history.

(56) References Cited

U.S. PATENT DOCUMENTS

| 2008/0319653 | A1* | 12/2008 | Moshfeghi ......... G01C 21/3608 |
|---|---|---|---|
| | | | 701/532 |
| 2009/0171578 | A1* | 7/2009 | Kim .................. G01C 21/3632 |
| | | | 701/414 |

(Continued)

FOREIGN PATENT DOCUMENTS

| EP | 2 075 779 B1 | 4/2012 |
|---|---|---|
| JP | 2002-039783 A | 2/2002 |

(Continued)

OTHER PUBLICATIONS

International Search Report dated Oct. 6, 2014 for PCT Application No. PCT/KR2014/003307, 4 pages.

*Primary Examiner* — Basil T. Jos
(74) *Attorney, Agent, or Firm* — Fish & Richardson P.C.

(57) ABSTRACT

A mobile terminal may include a communication unit configured to communicate with a vehicle control apparatus installed in a vehicle, a body worn on the user's wrist portion, an output unit provided in the body, and a controller configured to control the output unit to output vehicle information acquired from the vehicle control apparatus to the outside, wherein the output unit displays the vehicle information on a screen and outputs it in the form of vibration of the body or voice. The mobile terminal may further include a position detection unit configured to detect the position of the mobile terminal, wherein the controller calculates a driving direction for arriving at the destination of the vehicle in real time-according to the position of the mobile terminal, and controls the output unit to display an arrow indicating the calculated driving direction in a turn-by-turn (TBT) manner on the screen.

19 Claims, 26 Drawing Sheets

(51) Int. Cl.
*G04G 21/06* (2010.01)
*G01C 21/36* (2006.01)
*H04B 1/3827* (2015.01)

(52) U.S. Cl.
CPC ......... *G01C 21/3661* (2013.01); *G04G 21/02* (2013.01); *G04G 21/06* (2013.01); *G01C 21/3667* (2013.01); *H04B 2001/3861* (2013.01); *H04B 2001/3866* (2013.01)

(56) References Cited

U.S. PATENT DOCUMENTS

2009/0321483 A1* 12/2009 Froloff .................. A45F 5/00
224/267
2014/0050193 A1 2/2014 Cho
2014/0066049 A1 3/2014 Cho

FOREIGN PATENT DOCUMENTS

| | | |
|---|---|---|
| KR | 2009-071077 A | 7/2009 |
| KR | 2009-074574 A | 7/2009 |
| KR | 2012-106255 A | 9/2012 |
| WO | WO 2012/148240 A2 | 11/2012 |

* cited by examiner

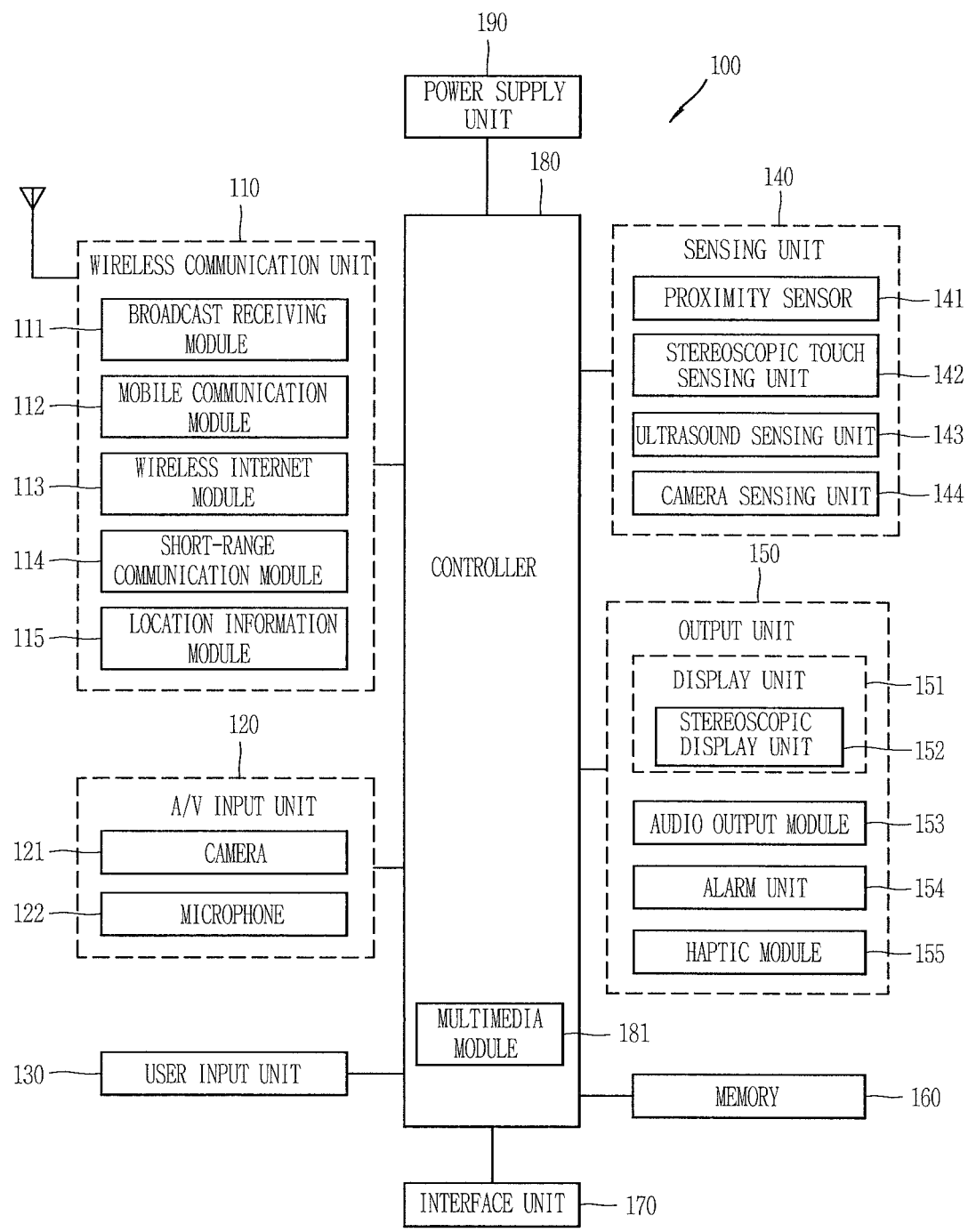

000# MOBILE TERMINAL AND CONTROL METHOD THEREFOR

CROSS REFERENCE TO RELATED APPLICATIONS

This application is a U.S. National Phase Application under 35 U.S.C. § 371 of International Application PCT/KR2014/003307, filed on Apr. 16, 2014, which claims the benefit of Korean Application No. 10-2013-0042398, filed on Apr. 17, 2013, the entire contents of which are hereby incorporated by reference in their entireties.

BACKGROUND OF THE DISCLOSURE

1. Field of the Disclosure

The technology disclosed in the present specification relates to a mobile terminal, and more particularly, to a mobile terminal having a body worn on a user's wrist portion and formed to always contact with the wrist portion so as to output vehicle information acquired from a vehicle control apparatus installed in a vehicle to the outside, and a control method thereof.

In particular, the technology disclosed herein relates to a mobile terminal for providing a navigation function of calculating a driving direction for arriving at the destination of the vehicle in real time according to the location of the mobile terminal, and displaying an arrow indicating the calculated driving direction in a turn-by-turn (TBT) manner on the screen, and a control method thereof.

2. Background of the Disclosure

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player. Efforts are ongoing to support and increase the functionality of mobile terminals. Such efforts include software and hardware improvements, as well as changes and improvements in the structural components.

In addition, in recent years, various types of mobile terminals have been developed in consideration of user convenience. Of them, a wearable device may include various types of electronic devices that are wearable on a user's body or user's clothes. The wearable device may include, for example, a smart watch, a wearable computer, a Google Glass, a Bluetooth headset, a smart wear, and the like.

The wearable device is implemented in the form of a multimedia device having a complex function according to its various functions. For example, a smart watch may capture still images or record moving images through a camera provided therein or reproduce multimedia content through a display unit formed on the body thereof in addition to a basic function as a watch. Otherwise, the smart watch may check messages over a wireless network and connect to a social network using various email plug-ins or the like.

Studies for providing more convenience to the user using various functions in the mobile terminal or wearable device have been actively carried out.

In particular, the need for the use of such a mobile terminal or wearable device in association with the driving or operation of a vehicle has been gradually increased.

SUMMARY OF THE DISCLOSURE

The technology disclosed in the present specification relates to a mobile terminal, and more particularly, and the objective of the present disclosure is to provide a mobile terminal having a body worn on a user's wrist portion and formed to always contact with the wrist portion so as to output vehicle information acquired from a vehicle control apparatus installed in a vehicle to the outside, and a control method thereof.

In particular, the objective of the technology disclosed herein is to provide a mobile terminal for providing a navigation function of calculating a driving direction for arriving at the destination of the vehicle in real time according to the location of the mobile terminal, and displaying an arrow indicating the calculated driving direction in a turn-by-turn (TBT) manner on the screen, and a control method thereof.

In order to accomplish the foregoing objectives, a mobile terminal according to the present disclosure, as a watch-type mobile terminal worn and used on a user's wrist portion, may include a communication unit configured to perform communication with a vehicle control apparatus installed in a vehicle, a body worn on the user's wrist portion to always contact with the wrist portion, an output unit provided in the body, and a controller configured to control the output unit to output vehicle information on the vehicle acquired from the vehicle control apparatus to the outside, wherein the output unit displays the vehicle information on a screen and outputs it in the form of vibration of the body or voice.

According to an example associated with the present disclosure, the mobile terminal may further include a position detection unit configured to detect the position of the mobile terminal, wherein the controller calculates a driving direction for arriving at the destination of the vehicle in real time according to the position of the mobile terminal, and controls the output unit to display an arrow indicating the calculated driving direction in a turn-by-turn (TBT) manner on the screen.

According to an example associated with the present disclosure, the communication unit may transmit the destination and the position of the mobile terminal to a previously set vehicle navigation apparatus.

According to an example associated with the present disclosure, the turn-by-turn navigation may be a scheme in which only the arrow is displayed on the screen or in which the arrow is displayed in a size larger than that of at least one graphic object when there exists the at least another graphic object for providing a vehicle navigation function.

According to an example associated with the present disclosure, the output unit may display additional information associated with at least one of the destination, a stopover on a driving route from the position of the mobile terminal to the destination, a distance from the position of the mobile terminal to the destination, a total required time, a remaining required time, and an arrival time, along with the arrow on the screen.

According to an example associated with the present disclosure, the mobile terminal may further include an input unit configured to receive the destination of the vehicle.

According to an example associated with the present disclosure, the input unit may receive the destination of the vehicle based on at least one of a user's touch input and voice input.

According to an example associated with the present disclosure, the vehicle control apparatus may perform a navigation function for the vehicle, and the communication unit may receive vehicle driving information associated with the navigation function from the vehicle control apparatus when a navigation link function is activated, and the controller may control the output unit to display an arrow indicating a driving direction of the vehicle in a turn-by-turn (TBT) manner on the screen based on the received vehicle driving information.

According to an example associated with the present disclosure, the vehicle driving information may include information associated with at least one of a destination of the vehicle, a stopover on a driving route, a current position of the vehicle, a speed of the vehicle, and a driving direction of the vehicle.

According to an example associated with the present disclosure, the controller may activate a navigation link function when the execution of the navigation link function for the vehicle is recognized by the vehicle control apparatus.

According to an example associated with the present disclosure, the controller may determine whether or not the user gets off the vehicle prior to arriving at the destination of the vehicle, and activate a pedestrian mode to output a walking direction to the destination of the vehicle through the output unit when the user gets off the vehicle prior to arriving at the destination of the vehicle.

According to an example associated with the present disclosure, the output unit may display an arrow indicating the walking direction in a turn-by-turn (TBT) manner on the screen.

According to an example associated with the present disclosure, the controller may activate the pedestrian mode when it is difficult to move the vehicle from a current position of the vehicle to a destination of the vehicle.

According to an example associated with the present disclosure, the controller may activate the pedestrian mode based on at least one of the user's touch input and voice input.

According to an example associated with the present disclosure, the controller may activate the pedestrian mode when the mobile terminal is away from the vehicle by more than a predetermined distance.

According to an example associated with the present disclosure, the output unit may output a preset notification signal prior to the vehicle arriving at a turn point at which the driving direction of the vehicle should be changed according to an arrow indicating the driving direction.

According to an example associated with the present disclosure, the preset notification signal may be output in the form of vibration of the body or voice.

According to an example associated with the present disclosure, the mobile terminal may further include an input unit configured to receive a screen mode change input from the user, wherein the output unit displays a screen in the turn-by-turn manner when the screen display mode is a TBT screen display mode, and displays a driving route to the destination of the vehicle and a map around the driving route on the screen when the screen display mode is a MAP screen display mode, and displays a screen in the TBT screen display mode and a screen in the MAP screen display mode at the same time when the screen display mode is a dual screen display mode, and the controller changes the screen display mode to the MAP screen display mode when the screen mode change input is received in a state that the previously set screen display mode is a TBT screen display mode, and changes the screen display mode to the TBT screen display mode when the screen mode change input is received in a state that the previously set screen display mode is a MAP screen display mode.

According to an example associated with the present disclosure, the input unit may receive a screen mode setting input from the user, and the controller may set the screen display mode to any one of the TBT screen display mode, the MAP screen display mode and the dual screen display mode based on the screen mode setting input.

According to an example associated with the present disclosure, the output unit may include a touch screen, and the screen mode change input may be a user touch input through the touch screen.

According to an example associated with the present disclosure, the controller may control the output unit to change the attribute of the arrow according to driving information from a current position of the vehicle to a turn point at which the driving direction of the vehicle should be changed to display it on the screen.

According to an example associated with the present disclosure, the driving information may include at least one of a remaining distance to the turn point, an entry direction to the turn point of the vehicle, and an entry speed to the turn point, and the attribute of the arrow may be at least one of a size, a shape, a display angle and a length of the arrow on the screen.

According to an example associated with the present disclosure, the controller may collect pattern information on the user's driving pattern for the vehicle or the user's walking pattern for a predetermined period of time, and change a screen display time point of the arrow based on the pattern information.

According to an example associated with the present disclosure, the driving pattern may include information associated with at least one of a driving speed, a number of sudden acceleration, and a number of sudden braking.

According to an example associated with the present disclosure, the walking pattern may be information associated with a walking speed.

According to an example associated with the present disclosure, the vehicle control apparatus may perform a navigation function for the vehicle, and the communication unit may transmit and receive vehicle driving information associated with the navigation function with the vehicle control apparatus based on a preset communication protocol.

According to an example associated with the present disclosure, the vehicle driving information may include information associated with at least one of a destination of the vehicle, a stopover on a driving route, a current position of the vehicle, a speed of the vehicle, and a driving direction of the vehicle.

According to an example associated with the present disclosure, the communication unit may transmit and receive the vehicle driving information when the destination of the vehicle or stopover on a driving route is set.

According to an example associated with the present disclosure, the vehicle information may be information associated with at least one of an air-conditioning function for the vehicle, whether or not a door is open or closed, whether or not a window is open or closed, whether or not a sunroof is open or closed, a battery charging state of the vehicle, a parking position of the vehicle, a navigation function provided in the vehicle, a theft state of the vehicle, and a fueling state of the vehicle.

According to an example associated with the present disclosure, the mobile terminal may further include an input unit configured to receive a user input from the user, wherein the controller generates a vehicle control signal based on the user input, and controls the communication unit to transmit the vehicle control signal to the vehicle control apparatus.

According to an example associated with the present disclosure, the vehicle control signal may be a control signal for controlling or setting a function associated with at least one of an air conditioning of the vehicle, an opening or closing of a door, an opening or closing of a window, an opening or closing of a sunroof, a battery charging state of the vehicle, a driving of the vehicle, and at least one device provided in the vehicle.

A mobile terminal for providing a navigation function according to an embodiment of the present disclosure may include an input unit configured to receive a destination, a receiving unit configured to receive a signal for calculating a current position of the mobile terminal, a controller configured to calculate a moving direction for arriving at the destination in real time according to the current position of the mobile terminal, a display unit configured to display an arrow indicating the calculated moving direction, and a communication unit configured to transmit the destination and the current position of the mobile terminal to a previously set vehicle navigation apparatus, wherein the vehicle navigation apparatus can guide a path to the destination using the current position of the mobile terminal as a departure.

According to an embodiment, the input unit may receive the destination as a voice signal.

According to an embodiment, when a moving direction for arriving at the destination is changed according to the current position of the mobile terminal, the controller may control the display unit to display an arrow indicating the changed moving direction.

According to an embodiment, the controller may control a previously set signal indicating the calculated moving direction to be output.

According to an embodiment, the communication unit may transmit and receive data with the vehicle navigation apparatus using a previously set protocol.

A control method of a mobile terminal for providing a navigation function according to an embodiment of the present disclosure may include (a) receiving a destination, (b) receiving a signal for calculating a current position of the mobile terminal, (c) calculating the current position of the mobile terminal, and calculating a moving direction for arriving at the destination in real time according to the calculated current position of the mobile terminal, (d) displaying an arrow indicating the calculated moving direction on the display unit, and (e) transmitting the destination and the current position of the mobile terminal to a previously set vehicle navigation apparatus, wherein the vehicle navigation apparatus can guide a path to the destination using the current position of the mobile terminal as a departure.

According to an embodiment, said (a) step may include receiving the destination as a voice signal.

According to an embodiment, said (d) step may include displaying an arrow indicating a changed moving direction when a moving direction for arriving at the destination is changed according to the current position of the mobile terminal.

According to an embodiment, said (d) step may include outputting a previously set signal indicating the calculated moving direction.

According to an embodiment, said (e) step may include transmitting and receiving data with the vehicle navigation apparatus using a previously set protocol.

A mobile terminal according to an embodiment disclosed in the present disclosure may acquire vehicle information on a vehicle from a vehicle control apparatus installed in the vehicle, and output the acquired vehicle information to the outside, thereby allowing a user to check the vehicle information in an easy, fast and efficient manner.

Furthermore, a mobile terminal according to an embodiment disclosed in the present disclosure may calculate a driving direction for arriving at the destination of the vehicle in real time according to the position of the mobile terminal, and display an arrow indicating the calculated driving direction in a turn-by-turn (TBT) manner on the screen, thereby receiving a moving direction to the destination when the moving direction is changed. Accordingly, it may be possible to save the power of the terminal, and allow the user to safely move to the destination without continuously keeping his or her eyes on the monitor.

In addition, it may be possible to receive directions in conjunction with vehicle navigation in an uninterrupted manner and to safely change the destination. At this time, a terminal microphone may be used to increase its voice recognition rate compared to when using a vehicle microphone. As a result, it may be possible to enhance the user's convenience.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 1 is a block diagram illustrating a mobile terminal 100 according to an embodiment disclosed in the present disclosure.

DETAILED DESCRIPTION OF THE DISCLOSURE

Figure 2A:
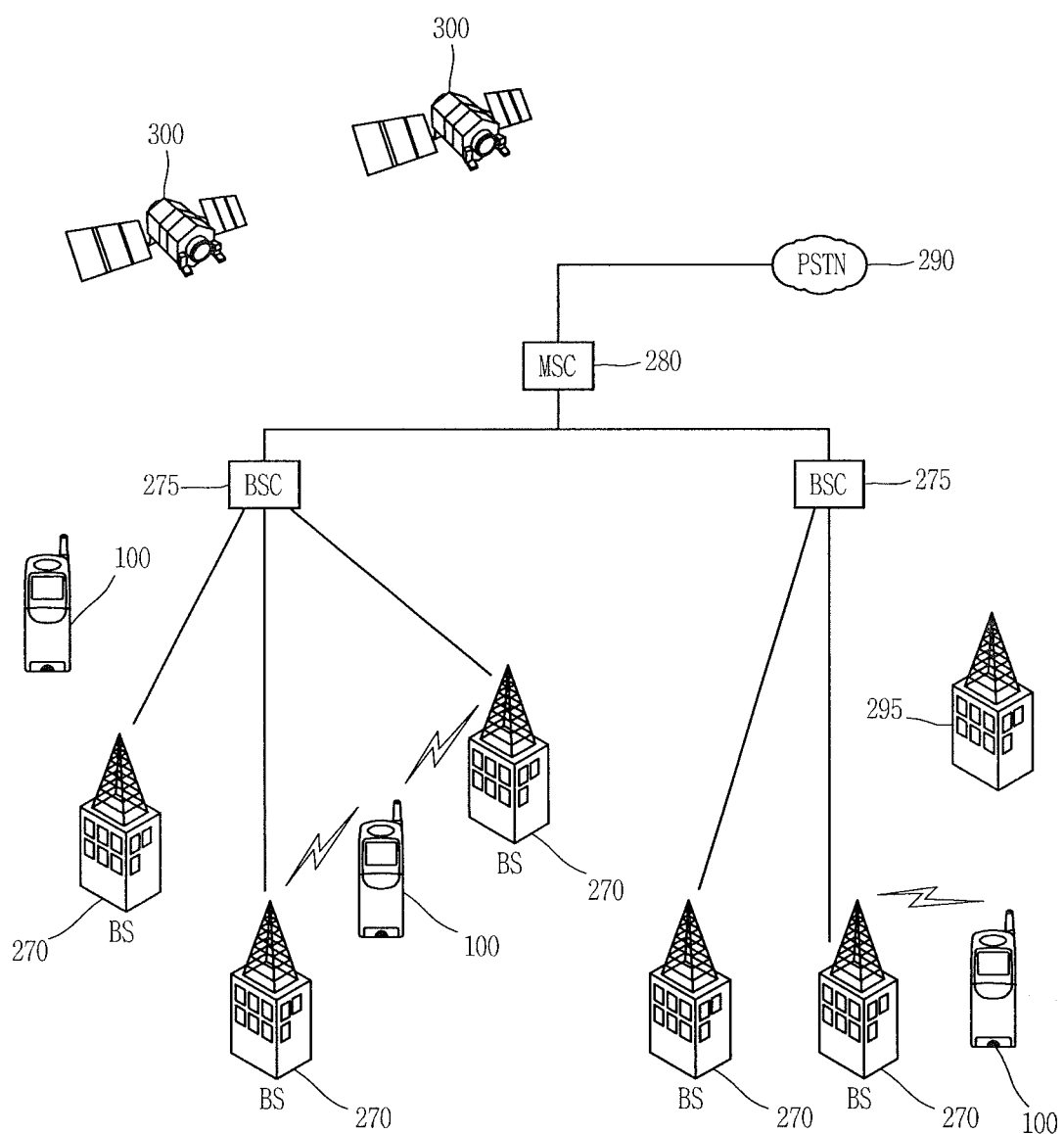
FIGS. 2A and 2B are conceptual views illustrating a communication system in which a mobile terminal 100 according to the present disclosure is operable.

The technology disclosed in the present disclosure may be applicable to a mobile terminal and a control method thereof. In particular, the technology disclosed in the present disclosure may be applicable to a wearable device linked or connected to a vehicle, and a control method thereof.

Specifically, the technology disclosed in the present disclosure relates to a mobile terminal linked or connected to a vehicle control apparatus to perform communication with the vehicle control apparatus provided in the vehicle, and a control method thereof.

In particular, the technology disclosed in the present disclosure may provide a moving direction to a destination, and provide a mobile terminal and a control method thereof linked to vehicle navigation.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices, and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

A vehicle control apparatus according to the present invention is applied to various pieces of equipment and apparatuses, such as a telematics terminal, a navigation terminal, audio video navigation (AVN) terminal, a television set, a 3D television set, an audio/video (A/V) system, an information providing center, and a call center.

In addition, the vehicle control apparatus according to the present invention is configured to be also in the form of a mobile terminal that is connected to the vehicle in a wired or wireless manner. In this case, like the mobile terminal described above, the vehicle control apparatuses include a mobile phone, a smart phone, a laptop computer, a digital-broadcast-dedicated terminal, a personal digital assistant (PDA), a portable multimedia player (PMP), a navigation system, a slate PC, a tablet PC, a ultrabook, a wearable device and the like.

Furthermore, the technology disclosed in the present disclosure may be applicable to a facilities control method for controlling facilities installed within a building, and also applicable to a facilities control system for providing a user interface (UI) for controlling the facilities in an effective and convenient manner. In particular, the user interface may be provided by a specific equipment or device, for example, central control device (or central control center.

The technical terms used in the present specification are set forth to mention specific embodiments of the present invention, and do not intend to define the scope of the present invention. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Preferred embodiments of the present invention will be described below in detail with reference to the accompanying drawings where those components are rendered the same reference number that are the same or are in correspondence, regardless of the figure number, and redundant explanations are omitted.

In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings.

Description of the Configuration or Form of Mobile Terminal According to an Embodiment Disclosed in the Present Disclosure Hereinafter, a mobile terminal according to an embodiment of the present invention will be explained in more detail with reference to FIGS. 1 to 5B.

FIG. 1 is a block diagram of a mobile terminal 100 according to an embodiment of the present invention.

As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include Bluetooth™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a location of a mobile terminal. An example of the location information module 115 may include a Global Positioning System (GPS) module or a Wireless Fidelity (Wi-Fi) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile tell final is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UT, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display and an e-ink display.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the three dimensional sensor, the sensing units 140 is configured to include a proximity sensor 141, a three dimensional touch sensing unit 142, a ultrasound sensing unit 143, a camera sensing unit 144, and a bio-information obtainment unit 145.

The proximity sensor 141 measures a distance between a sensing target object (for example, a user's finger or a stylus pen) with which a touch is applied without mechanical contact and a sensing surface using the strength of an electromagnetic field or infrared light. The terminal recognizes which part of a stereoscopic image is touched on using the distance. Particularly, a touch screen is a capacitive type, a proximity extent of the sensing target object is sensed with a change in an electric field due to the proximity of the sensing target object. The touch screen is configured in such a manner as to recognize a three dimensional touch using the proximity extent.

The three dimensional touch sensing unit 142 is configured to sense the strength of the touch that is applied to a touch screen or the time for which the touch is applied to the touch screen. For example, the three dimensional touch sensing unit 142 senses a pressure of the applied touch. The three dimensional touch sensing unit 142 determines that the higher the pressure of the touch being applied to an object is, the farther the object is positioned away from the touch screen.

The ultrasound sensing unit 143 is configured in such a manner that positional information on the sensing target object is recognized using ultrasound.

The ultrasound sensing unit 143, for example, is configured from an optical sensor and multiple ultrasound sensors. The optical sensor is formed in such a manner as to sense light, and the ultrasound sensor is formed in such a manner to sense ultrasound. Because light is faster than ultrasound, the time it takes for the light to arrive at the optical sensor is shorter than the time it takes the ultrasound to arrive at the ultrasound sensor. Therefore, a position of a source from which a wave originates is calculated using a difference in arrival time between the light and the ultrasound.

The camera sensing unit 144 includes at least one of a camera, a photo sensor, and a laser sensor.

For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the mobile terminal. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The bio-information obtainment unit 145 obtains bio-information through a user's specific body portion.

According to one embodiment, the bio-information obtainment unit 145 measures a bio-signal that is generated by physiological potential in the human body.

As one example, the bio-information obtainment units 145 is configured to include at least one among a pulse plethyamography (PPG) sensor, an electro-cardiogram (ECG) sensor, a galvanic skin reflex (GSR) sensor, an electro-encephalogram (EEG) sensor, an electro-myogram (EMG) sensor, and an electro-oculography (EOG) sensor. These sensor measure a pulse blood flow, an electrocardiogram, a galvanic skin reflex, an electro-encephalogram, an electro-myogram, and a bio-signal by eye movements.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the mobile terminal 100 according to the present disclosure will be described.

Figure 2B:
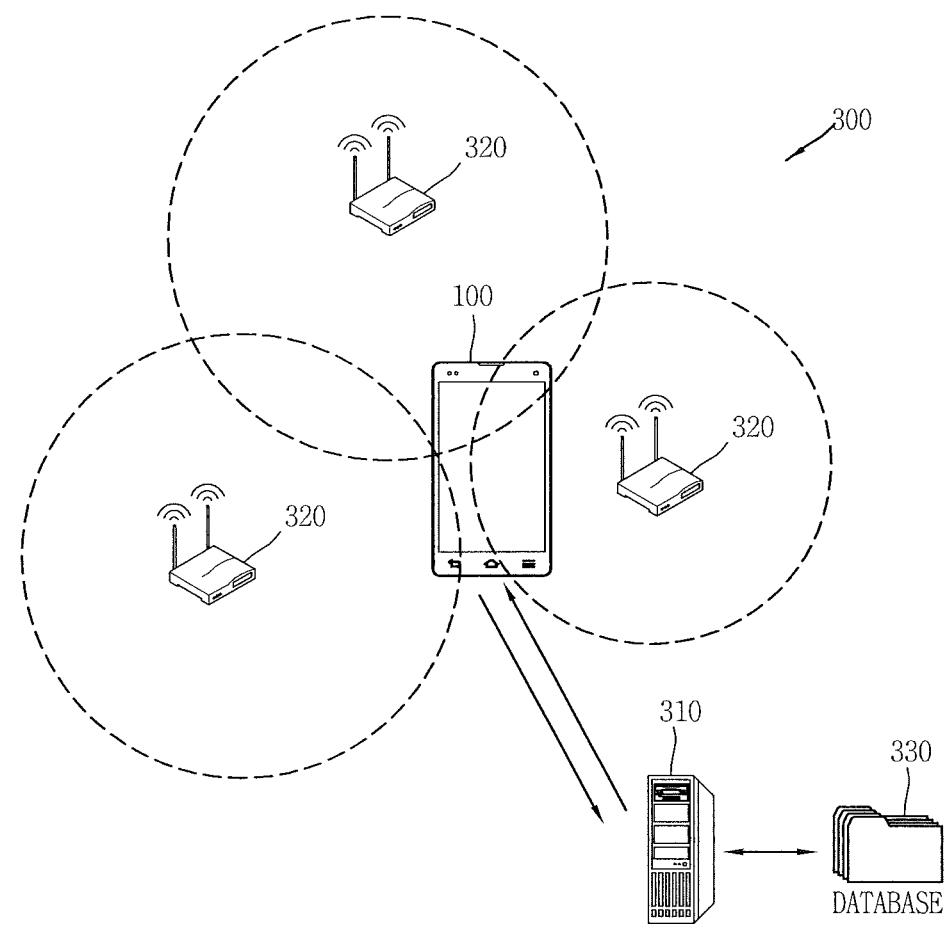

FIGS. 2A and 2B are conceptual views of a communication system operable with a mobile terminal 100 in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminal s 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites."Alternatively, individual sectors of a given base station 270 may be referred to as cell sites.

A broadcasting transmitter (BT) 295, as shown in FIG. 2A, transmits a broadcast signal to the mobile terminal s 100 operating within the system. The broadcast receiving module 111 (FIG. 1B) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminal s 100. Two satellites are depicted in FIG. 2, but it is understood that useful position information may be obtained with greater or fewer satellites than two satellites. The GPS module 115 (FIG. 1B) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminal s 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminal s 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AR thereby extracting the location information of the mobile terminal 100.

Furthermore, the extracted location information of the display device 100 may be transmitted to the display device 100 through the WiFi location determination server 310, thereby acquiring the location information of the display device 100.

Types of realization of the mobile terminal, disclosed in the present specification, according to one embodiment, are described below referring to FIGS. 3A to 5B.

Figure 3A:
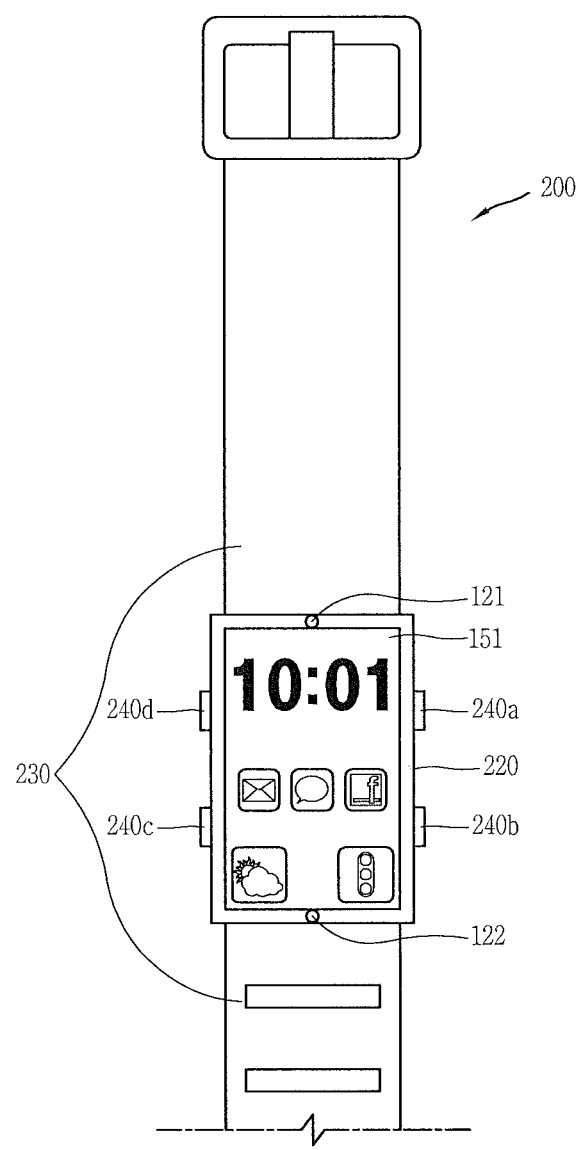
FIGS. 3A and 3B are views illustrating the front and rear surfaces of a smart watch according to an embodiment of the present disclosure.
Figure 3B:
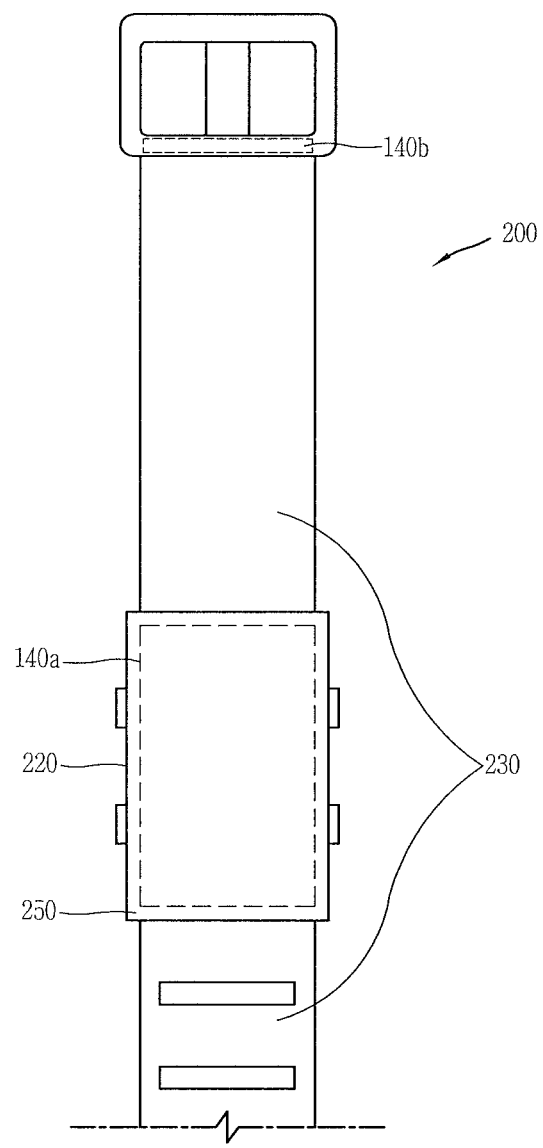

FIGS. 3A and 3B are diagrams illustrating a front side and a rear side of a smart watch according to one embodiment of the present invention.

That is, FIGS. 3A and 3B illustrate a case where the mobile terminal 100 takes the form of a smart watch, which is a watch-type mobile terminal, among wearable devices.

A smart watch 200 that is disclosed in the present specification has rectangular construction. However, the present invention is not limited to this, and of course, may be applied to a smart watch having various types of constructions in the shape of a circle, a triangle, or the like.

The smart watch 200 includes a band 230 and a body 220. A case forming an appearance of the body 220 may include a front case 210 and a rear case 250. A space formed by the front case 210 and the rear case 250 may accommodate various components therein. At least one intermediate case may further be disposed between the front case 210 and the rear case 250. Such cases may be formed by injection-molded synthetic resin, or may be formed using a metallic material such as stainless steel (STS) or titanium (Ti).

Referring to FIG. 3A, a display unit 151, a camera 121, a microphone 122, and the like are arranged in the front case 210.

The display 151 occupies most parts of a main surface of the front case 210. A camera 121 and a microphone 122 may be arranged at two ends of the display unit 151.

Various types of visual information may be displayed on the display unit 151. Such information may be displayed in the form of texts, numbers, signs, graphics or icons.

For input of such information, at least one of the texts, numbers, signs, graphics or icons may be arranged in the form of a keypad. Such keypad may be called 'soft key'.

The display unit 151 may be operated as an entire region, or as a plurality of divided regions. In the latter case, the plurality of regions may be associated with each other.

In addition, a wire/wireless headset port (not illustrated) and a wire/wireless data port (not illustrated) are arranged on one lateral face of a main body of the smart watch 200. These ports are configured as one example of an interface 170 (refer to FIG. 1).

Referring to FIG. 3B, a first sensor 145a is arranged on a rear face of the main body 220, that is, a rear case 250. The first sensor 145a is a sensor that senses a state of a user's skin or a signal of a user' living body. In addition, a second sensor 145b that senses a movement of a user's muscle and the like is arranged on a band 230 that comes into contact with a skin of a user' wrist.

An antenna for receiving broadcast signals may be disposed on a side surface of the body 220. The antenna, part of the broadcast receiving module 111 (refer to FIG. 1) may be provided in the body 220 in a retractable manner.

Then, an audio output module (not illustrated), an interface, and the like are arranged in the main body 220 of the smart watch 200. In addition, a user input unit 240, a connection port, and the like are arranged lateral faces of the front case 210 and the rear case 250.

The user input unit 240 is operated to receive a command for controlling the operation of the smart watch 200, which may include at least one of manipulation units 240a, 240b, 240c and 240d. The manipulation units may be referred to as manipulating portions, and may include any type of ones that can be manipulated in a user's tactile manner.

Commands inputted through the manipulation units may be variously set. For instance, the manipulation units may be configured to input commands such as START, END, SCROLL or the like, and configured to input commands for controlling a level of sound outputted from the audio output unit 152, or commands for converting the current mode of the display 151 to a touch recognition mode.

A connection port may be configured to receive data from an external device or to receive power, thereby transmitting it to each component inside the smart watch 200. Alternatively, the connection port may be configured to allow data inside the smart watch 200 to be transmitted to an external device. The connection port may be configured as one example of the interface unit 170 (refer to FIG. 1).

A power supply unit (not illustrated) that supplies electric power to the smart watch 200 is installed in the main body 220 of the smart watch 200. The power supply unit is configured to be in the form suitable to be built into the main body 220.

Figure 4A:
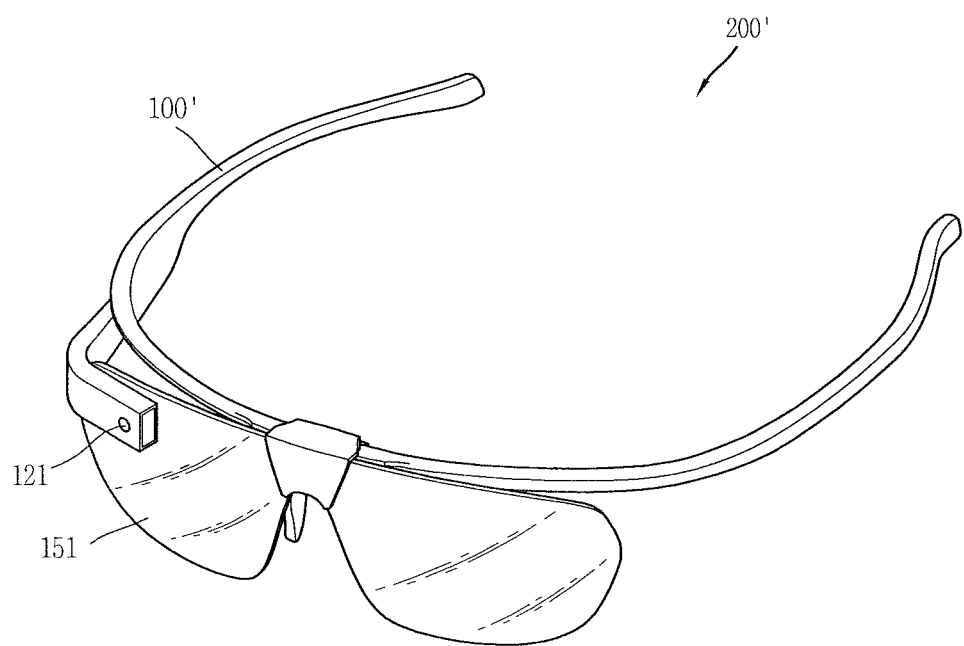
FIGS. 4A and 4B are conceptual views illustrating a wearable glasses type terminal according to an embodiment disclosed in the present disclosure.
Figure 4B:
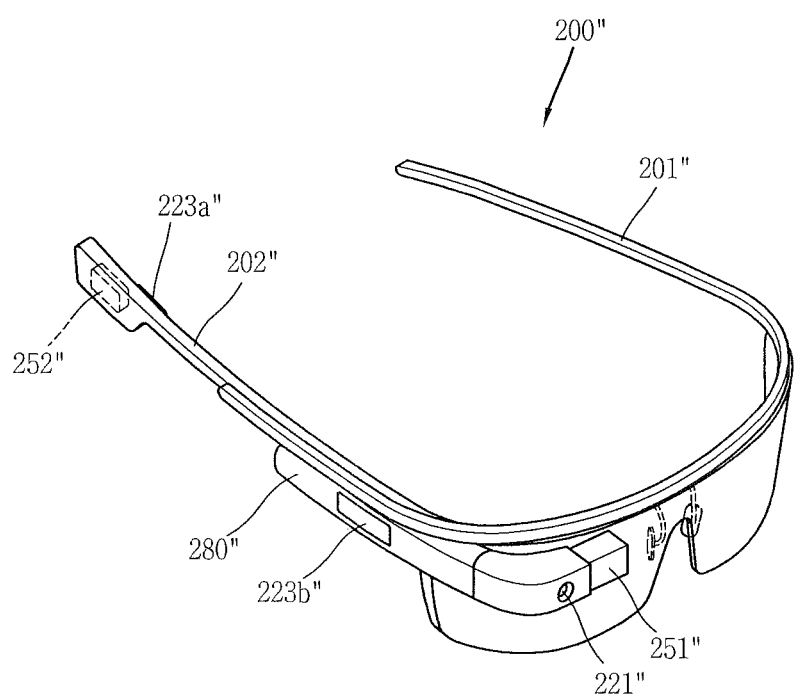

FIGS. 4A and 4B are diagrams of a wearable glasses-type terminal, disclosed in the present specification, according to one embodiment.

That is, FIGS. 4A and 4B illustrate a case where the mobile terminal 100 is realized as a type of smart glasses, which is a glasses-type mobile terminal, among wearable devices.

Referring to FIG. 4A, a wearable glasses-type terminal 200', disclosed in the present specification, according to one embodiment, is configured to include a main body 100', a display unit 151, a controller 180.

The wearable glasses-type terminal 200', disclosed in the present specification, according to one embodiment may further include a user input unit, a voice recognition unit, and a motion sensing unit.

The wearable glasses-type terminal 200', disclosed in the present specification, according to one embodiment, is realized as a head-mounted display (HMD). A specific example, the wearable glasses-type terminal 200' is realized as smart glasses.

The main body 100' is formed in such a manner that it is mountable on the human head. For example, the main body 100' is realized as a frame of the smart glasses.

The display units 151, coupled with the main body 100', are arranged in positions that correspond to both eyes, respectively. In addition, the display unit 151 has optical transparency, and visual information is output to the display unit 151.

The visual information is generated in the wearable glasses-type terminal 200', or means a virtual object that is input from an external device. For example, the virtual object means an application, an icon corresponding to the application, content, a UI for a communication mode or the like. The virtual object is generated by the controller 180 or is input from the mobile terminal, such as a smart phone.

At this point, since the display unit 151 has the optical transparency, the user can view an external environment through the display unit 151.

In addition, according to one embodiment, the external environment may be viewed through the display unit 151 and at the same time, information on an arbitrary external object that makes up the external environment may be output to the display unit 151. For example, the external object is a business card, a human being, or an external device with which mutual communication is possible.

As described above, the controller 180 controls the wearable glasses-type terminal 200'. Specifically, the controller 180 outputs information on the external device, which is sensed in a wireless communication unit 110, to the display unit 151.

For example, the controller 180 identifies a position of the sensed external device. At this point, the controller 180 determines whether or not the sensed external device is positioned within a user's sight and based on a result of this determination, determines whether or not the information on the sensed external device will be output.

In addition, the controller 180 is mounted on the main body 100' of the wearable glasses-type terminal 200' or the controller 180 and the main body 100 are integrally formed into one piece. According to another embodiment, the controller 180 may be arranged away from the main body 100'.

The camera 121 is arranged in front of at least one of the left-eye and right-eye display units 151. Alternatively, the camera 121 is arranged on one side or both sides of the frame 100' and thus photographs an object that is out of the wearer's sight.

The user input unit 130 is realized as a separate touch panel that is provided on one side or both sides of the frames 110. Alternatively, the user input unit 130 may be realized as a physical key. For example, an ON/OFF switch for a power source is realized in such a manner that it is provided on one side of the frame 110'.

According to another embodiment, the user input unit 130 may be realized as a separate external device that is connected to the main body 100'. Accordingly, the user can input a specific command into the separate external device. Alternatively, the display unit 151 is realized as a touch screen, and thus the user can input a control command directly into the display unit 151.

According to another embodiment, the user input unit 130 may be realized as a module that recognizes a user's voice command. Accordingly, the user can input a specific voice command into the main body 100'.

On the other hand, the wearable glasses-type terminal according to one embodiment appears on the market. The smart glasses, realized as the wearable device conveniently, executes a function that is executed in the existing mobile terminal.

The external environment that is seen through the display unit 151 and the visual information being output are displayed together on the display unit 151 of the smart glasses (this is referred to as an augmented reality). Accordingly, the user can more easily grasp the information on the arbitrary object that makes up the external environment.

In addition, the smart glasses performs wireless communication with other different smart glasses or with the external device that is capable of communicating with the smart glasses. At this point, information relating to the external device is output to the display unit 151.

FIG. 4B is a perspective view illustrating a wearable device where an eye-proximity display according to an embodiment of the present invention can be mounted.

Referring to FIG. 4B, the wearable device is a glass-type mobile terminal 200", which can be wearable on a head of a human body and be provided with a frame (case, housing, etc.) therefor. The frame may be made of a flexible material to be easily worn. The frame of mobile terminal 200" is shown having a first frame 201" and a second frame 202", which can be made of the same or different materials.

The frame may be supported on the head and defines a space for mounting various components. As illustrated, electronic components, such as a control module 280", an audio output module 252", and the like, may be mounted to the frame part. Also, a display unit 251" for covering either or both of the left and right eyes may be detachably coupled to the frame part.

The control module 280" controls various electronic components disposed in the mobile terminal 200". The control module 280" may be understood as a component corresponding to the aforementioned controller 180 (refer to FIG. 1). FIG. 4B illustrates that the control module 280" is installed in the frame part on one side of the head, but other locations are possible.

The display unit 251" may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 200", the display unit 251" may be located to correspond to either or both of the left and right eyes. FIG. 4B illustrates that the display unit 251" is located on a portion corresponding to the right eye to output an image viewable by the user's right eye.

The display unit 251" may project an image into the user's eye using a prism. Also, the prism may be formed from optically transparent material such that the user can view both the projected image and a general visual field (a range that the user views through the eyes) in front of the user.

In such a manner, the image output through the display unit 251" may be viewed while overlapping with the general visual field. The mobile terminal 200" may provide an augmented reality (AR) by overlaying a virtual image on a realistic image or background using the display.

The camera 221" may be located adjacent to either or both of the left and right eyes to capture an image. Since the camera 221" is located adjacent to the eye, the camera 221" can acquire a scene that the user is currently viewing.

In the drawings, the camera 221" is provided at the control module 280". However, the camera 221" may be positioned at most any location of the mobile terminal. In some embodiments, multiple cameras 221" may be utilized. Such multiple cameras 221" may be used to acquire a stereoscopic image.

The glass-type mobile terminal 200" may include user input units 223a" and 223b", which can each be manipulated by the user to provide an input. The user input units 223a" and 223b" may employ techniques which permit input via a tactile input. Typical tactile inputs include a touch, push, or the like. The user input units 223a" and 223b" are shown operable in a pushing manner and a touching manner as they are located on the frame part and the control module 280", respectively.

If desired, the mobile terminal 200" may include a microphone which processes input sound into electric audio data, and an audio output module 252" for outputting audio. The audio output module 252" may be configured to produce audio in a general audio output manner or an osteoconductive manner. When the audio output module 252" is implemented in the osteoconductive manner, the audio output module 252" may be closely adhered to the head when the user wears the mobile terminal 200" and vibrate the user's skull to transfer sounds.

Hereinafter, a structure of the mobile terminal of FIG. 1 according to an embodiment of the present invention will be explained with reference to FIGS. 5A and 5B.

Figure 5A:
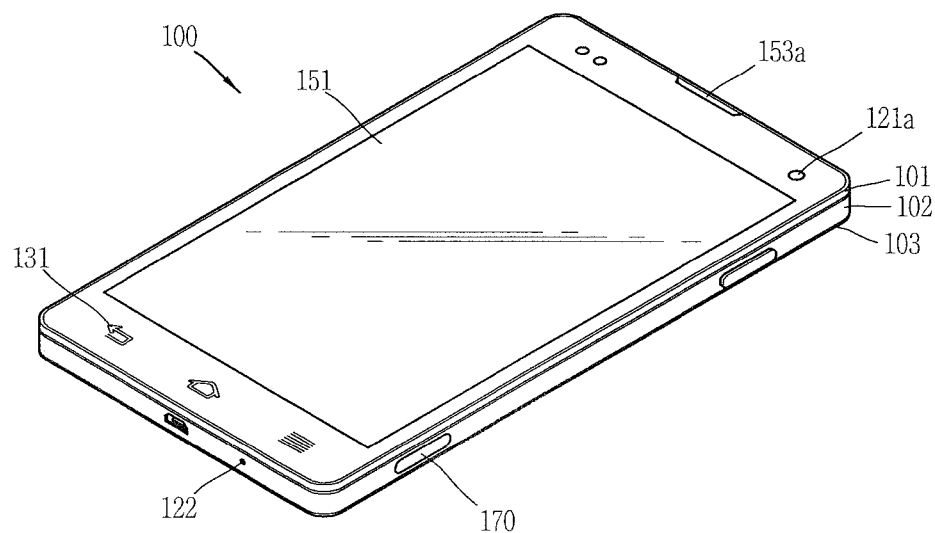
FIG. 5A is a front perspective view illustrating an example of a mobile terminal 100 associated with the present disclosure.

FIG. 5A is a front perspective view of a mobile terminal 100 according to an embodiment of the present invention.

The mobile terminal 100 according to the present disclosure is a bar type mobile terminal. However, the present disclosure is not limited to this, but may be applied to a watch type, a clip type, a glasses-type, or a slide type in which two or more bodies are coupled to each other so as to perform a relative motion, a folder type, a swing type, a swivel type and the like.

A body of the mobile terminal 100 includes a case (casing, housing, cover, etc.) forming an outer appearance. The case may include a front case 101 and a rear case 102. A space formed by the front case 101 and the rear case 102 may accommodate various components therein. At least one intermediate case may further be disposed between the front case 101 and the rear case 102. A battery cover 103 for covering a battery 191 may be detachably mounted to the rear case 102.

Such cases may be formed by injection-molded synthetic resin, or may be formed using a metallic material such as stainless steel (STS) or titanium (Ti).

A display 151, a first audio output module 153a, a first camera 121a, a first manipulation unit 131, etc. may be disposed on a front surface of the body. A microphone 122, an interface unit 170, a second manipulation unit 132, etc. may be provided on a side surface of the body.

The display unit 151 may output information processed in the mobile terminal 100. The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display and an e-ink display.

The display unit 151 may include a touch sensing means for inputting information in a touch manner. Once part on the display unit 151 is touched, the content corresponding to the touched position is input. The content input in a touch manner, may be characters, or numbers, or menu items which can be set in each mode.

The touch sensing means may be transmissive so that visual information output from the display unit 151 can be viewed, and may include a structure for enhancing visibility of the touch screen at a bright place. Referring to FIG. 5A, the display unit 151 occupies most of the front surface of the front case 101.

The first audio output module 153a and a first camera 121 are arranged at a region adjacent to one end of the display unit 151, and the first manipulation unit 131 and the microphone 122 are arranged at a region adjacent to another end of the display unit 151. The second manipulation unit 132 (refer to FIG. 5B), the interface unit 170, etc. may be arranged on side surfaces of the body.

The first audio output module 153a may be implemented as a receiver for transmitting a call sound to a user's ear, or a loud speaker for outputting each type of alarm sound or a playback sound of multimedia.

A sound generated from the first audio output module 153 may be configured to be emitted through an assembly gap between structures. In this case, a hole independently formed to output audio sounds may not be seen or is otherwise hidden in terms of appearance, thereby further simplifying the appearance and manufacturing of the mobile terminal 100. The present invention is not limited to this. The hole for outputting audio sounds may be formed at a window.

The first camera 121a processes image frames such as still images or moving images, obtained by an image sensor in a video call mode or a capturing mode. The processed image frames may be displayed on the display unit 151.

The user input unit 130 is manipulated to receive a command for controlling the operation of the mobile terminal 100, and may include a first manipulation unit 131 and a second manipulation unit 132. The input keys may be referred to as manipulation portions, and may include any type of ones that can be manipulated in a user's tactile manner.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 5B:
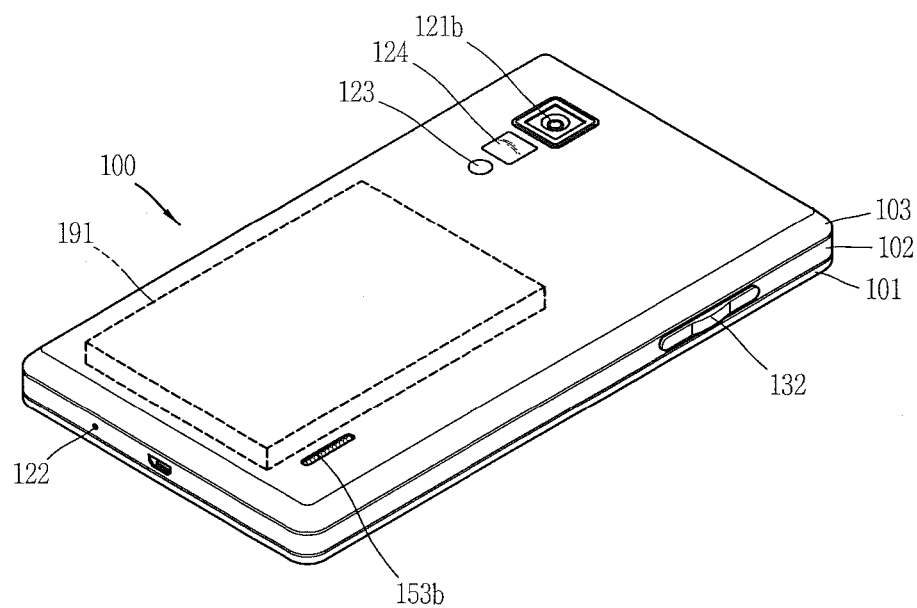
FIG. 5B is a rear perspective view illustrating an example of a mobile terminal 100 associated with the present disclosure.

FIG. 5B is a rear perspective view illustrating the mobile terminal 100 illustrated in FIG. 5A.

Referring to FIG. 5B, a second camera 121b may be additionally mounted at a rear surface of the terminal body, namely, the rear case 102. The second camera 121b has an image capturing direction, which is substantially opposite to the direction of the first camera unit 121a (refer to FIG. 5A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153*b* together with the first audio output unit 153*a*(refer to FIG. 5A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

It should be understood by those skilled in the art that the technology of a mobile terminal or wearable device disclosed in the present disclosure can be implemented as a different specific form without departing from the scope and technical concept disclosed in the present disclosure.

Description of Vehicle Control Apparatus and Navigation Function Disclosed in the Present Disclosure The vehicle control apparatus disclosed in the present specification is described below referring to FIGS. 6A to 8C.

Figure 6A:
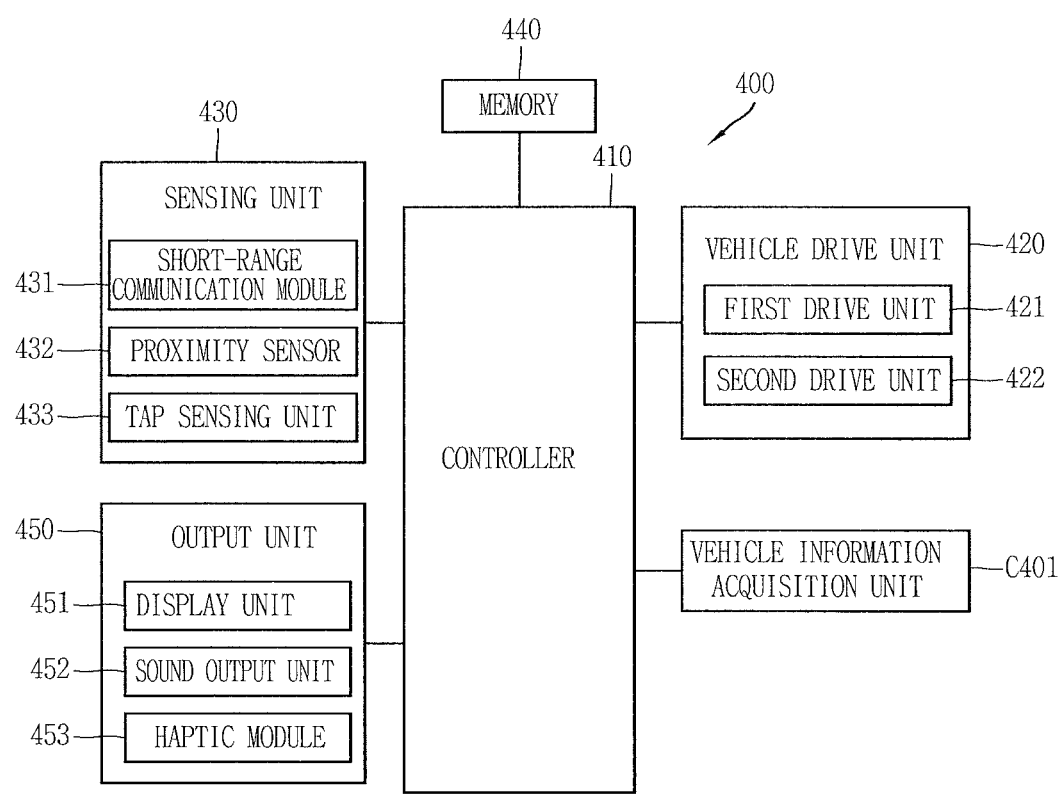
FIG. 6A is a block diagram for explaining a vehicle control apparatus associated with the present disclosure.

FIG. 6A is a block diagram for describing the vehicle control apparatus according to the present invention.

Figure 6B:
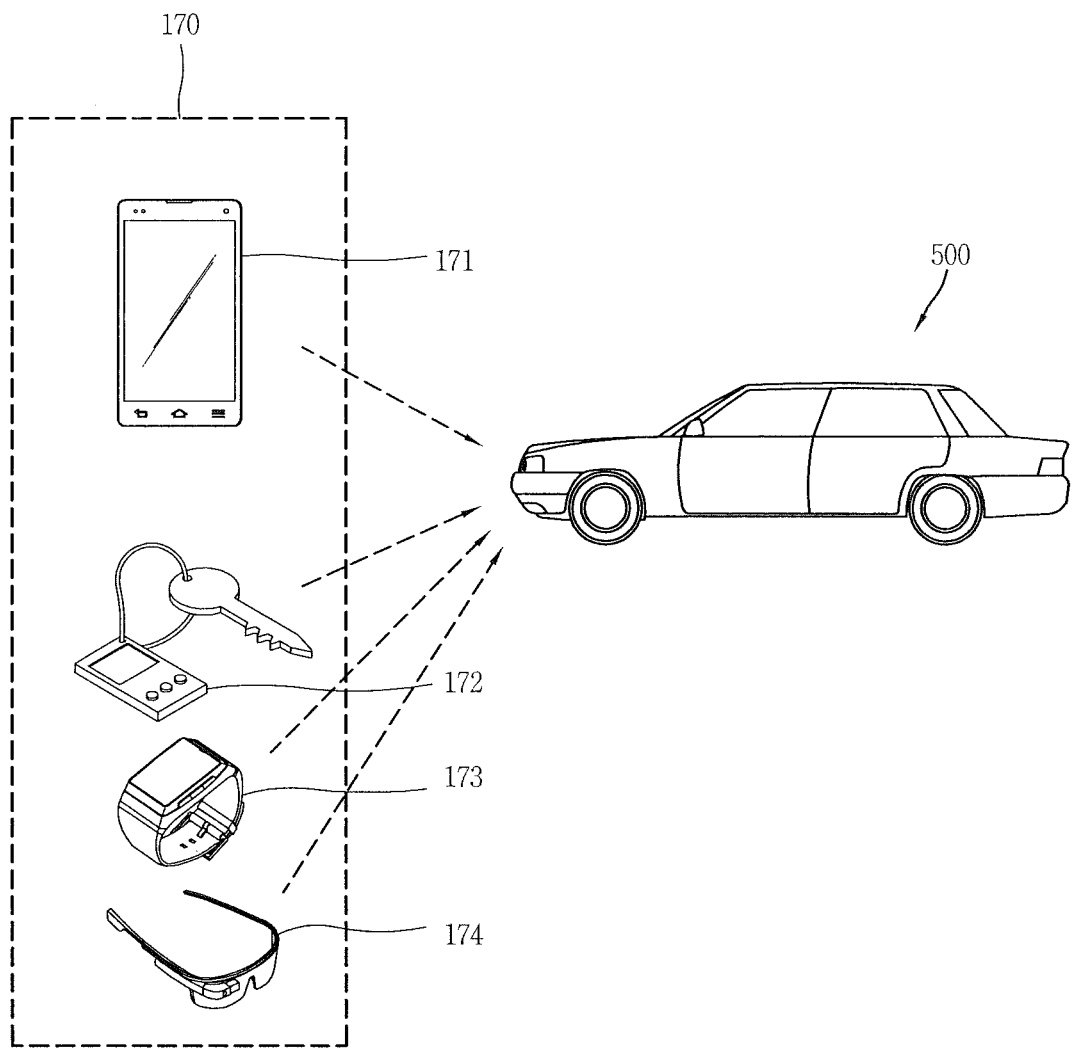
FIG. 6B is an exemplary view illustrating an example of external devices connected to a vehicle control apparatus associated with the present disclosure.

FIG. 6B is a diagram illustrating one example of an external device that is connected to the vehicle control apparatus according to the present invention.

Referring to FIGS. 6A and 6B, FIG. 6A is a block diagram for describing the vehicle control apparatus, disclosed in the present specification, according to one embodiment. FIG. 6B is a diagram illustrating an example of the external device that is capable of being connected to the vehicle control apparatus, disclosed in the present specification, according to one embodiment.

First, as illustrated in FIG. 6A, a vehicle control apparatus 400, disclosed in the present specification, according to one embodiment, is configured to include a controller 410, a sensing unit 430 connected to the controller 410, a vehicle drive unit 420, and a memory 440. The vehicle control apparatus 400 may further include an output unit 450. Then, the vehicle control apparatus 400 is formed in a body of a vehicle that is configured to include an external frame that makes up an external appearance of the vehicle, a window, and an internal frame which is formed in such a manner that the user rides in. At this point, the constituent elements illustrated in FIG. 6A are not essential in realizing the vehicle control apparatus 400 according to the present invention, and thus the vehicle control apparatus 400 described in the present specification may include one or more constituent elements in addition to the constituent elements described above and may omit one or more constituent elements.

The sensing unit 430 is typically implemented using one or more sensors configured to sense internal information of the vehicle control apparatus 400, the surrounding environment of the vehicle control apparatus 400, user information, and the like. For example, the sensing unit 430 is shown having a proximity sensor 432 and an illumination sensor. If desired, the sensing unit 430 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor, a microphone 122, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The vehicle control apparatus 400 may be configured to utilize information obtained from sensing unit 430, and in particular, information obtained from one or more sensors of the sensing unit 430, and combinations thereof.

The sensing unit 430 may further include a short-range communication module 431. The short-range communication module 431 for short-range communication may support short-range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, Wireless Universal Serial Bus (Wireless USB). The short-range communication module 431 may support wireless communication between the vehicle control apparatus 400 and an external device 170 (refer to FIG. 6B) through wireless area networks.

The external device may be the mobile terminal 100 described above. Particularly, the external device may be in the form of the wearable device 200, which is one type of the mobile terminal described above.

The vehicle drive unit 420 cancels a locked state of the vehicle or switches the vehicle to the locked state. At this point, the locked state of the vehicle is a state where one or more of or all of the functions of the vehicle are limited, the vehicle does not start, or a door of the vehicle does not open. As opposed to the locked state, the canceling of the locked state makes the vehicle return to a state where, at least one among a driver seat, a front passenger seat, rear passenger seats, and a trunk can open, all the functions of the vehicle can be performed, that is, the vehicle can start, or various functions, such as a navigation function and a ventilation function, can be performed.

In addition, the vehicle drive unit 420 changes various settings and enables a function to be automatically performed. For example, the vehicle drive unit 420 controls each constituent element of the vehicle under the control of the controller 410, for example, controls the extent to which a window of the front driver seat or the front passenger seat is opened or controls an angle of a rear view mirror. The vehicle drive unit 420 adjusts a height or a horizontal position (for example, a distance between the seats) of at least one among the front driver seat or the front passenger seat and the rear seats. The vehicle drive unit 420 may set a steering wheel in the driver seat, for example, may set a height of the steering wheel and a sensitivity of the steering wheel and the like under the control of the controller 410. In addition, under the control of the controller 410, the vehicle drive unit 420 may enable a gear to operate in an automatic transmission or in a manual transmission, and in a case of a hybrid vehicle, may enable any one, among a mode of operation of a combustion engine and a mode of operation of an electric motor mode, to be preferentially selected.

In addition, under the control of the controller 410, the vehicle drive unit 420 may change not only a hardware setting state of the vehicle, but also a software setting state of the vehicle. For example, under the control of the controller 410, the vehicle drive unit 420 may enable a predetermined music play list to be displayed or may enable one music item on the predetermined music play list to be automatically reproduced. In addition, the vehicle drive unit 420 may automatically set a predetermined specific destination point and may enable a path to the specific destination point to be automatically displayed though a navigation apparatus. In addition, under the control of the controller 410, the vehicle drive unit 420 may enable a distance from a preceding or following vehicle or a speed of the vehicle to be automatically set at the time of cruise driving of the vehicle.

To do this, the vehicle drive unit 420 is configured to include different sub-drive units, and the sub-drive units change hardware or software setting states of the vehicle, respectively. The sub-drive unit that changes the hardware setting state of the vehicle is referred to as a first drive unit 421, and the sub-drive unit that changes the software setting state of the vehicle is referred to as a second drive unit 422.

At this point, in order to change the hardware setting of the vehicle, the first drive unit 421 is configured to include different constituent elements that change the external frame or the internal frame of the vehicle. For example, the first drive unit 421 may further include a hardware drive unit for adjusting a height of the seat or an angle of the back of the seat, and may further include a unit for adjusting the height of the steering wheel, which is configured to include an elastic member or a pressure member, such as a coil or a spring for elevating or lowering the height of the steering wheel.

On the other hand, the second drive unit 422 is realized as at least one or more application programs or applications. For example, the second drive unit 122 is realized as being in the form that includes any one among application programs for driving the navigation apparatus or an application program for reproducing already-stored medium data (for example, MP3) and the like. These application programs or applications may be those for one among types of drive control of the vehicle.

The output unit 450 is for generating an output associated with a sense of sight, an auditory sense, or a tactual sense, and is configured to include at least one among a display unit 451, a sound output unit 452, a haptic module 453, and an optical output unit 454. The touch sensor is configured to be layered into, or is integrally formed into the display unit 451 on which various pieces of image information is displayed, or is integrally formed into the display unit 451, thereby realizing a touch screen. The touch screen functions as a user input unit 423 that provides an input interface between the vehicle control apparatus 400 and the user, and at the same time, provides an output interface between the vehicle control apparatus 400 and the user.

The touch screen is realized as on various portions of the vehicle. For example, the touch screen is realized on entire windshield glass in the vehicle or one portion of the windshield glass, and may be realized anywhere on the external surface (surface exposed to outside of the vehicle) or an internal surface (a surface that faces the inside of the vehicle). In addition, the touch screen may be realized on an external or internal surface of a side window in the driver seat, a side window in the front passenger seat, or a window in the rear seat of the vehicle. The touch screen may be realized on a rear view mirror or a sunroof of the vehicle.

In addition, the touch screen may be realized not only on glass such as the window or sunroof of the vehicle, but also on the external or internal frame of the vehicle. For example, the touch screen may be realized on a surface of the external frame of the vehicle, that is, the external frame between the windshield and the window, or between the windows, such as a A-pillar, a B-pillar, or a C-pillar. In addition, the touch screen may be realized on at least one portion (for example, one portion in the vicinity of a door knob of a vehicle door) of the external surface of the vehicle door. The touch screen may be formed also on a surface of a cover of a gear box within the vehicle or on one portion of a cover of a console box. In addition, of course, two or more of the touch screens may be formed on at least one or more different portions of the vehicle.

Data available to various functions of the vehicle control apparatus 400 is stored in the memory 440. Multiple application programs or applications that run on the vehicle control apparatus 400, data and commands for the vehicle control apparatus 400 are stored in the memory 440. At least one or more of these application programs are downloaded from an external server over a wireless communication network. In addition, for basic functions (for example, a vehicle starting function, a navigation function, and vehicle locking and unlocking functions), at least one or more of these application programs are pre-installed on the vehicle control apparatus 400 before shipping. On the other hand, the application program is stored in the memory 440 and is installed on the vehicle control apparatus 400. The controller 400 runs the application program in order that the application program performs operation (or a function) of the vehicle control apparatus.

According to one embodiment, the application program may be a navigation program that performs a navigation function.

Pieces of information relating to at least one or more users are stored in the memory 440. At this point, the information relating to the user is authentication infatuation on the user and information relating to various setting conditions of the vehicle that are set by the user himself/herself or are set properly based on the bio-information on the user. The information relating to the user is, for example, setting information relating to indoor temperature or humidity in the vehicle, which is set by the user himself/herself, setting information that depends on a driving habit of the user, or the like. In addition, the information relating to the user may be a record of driving paths along which the user drove. In addition, the authentication information may be information on a password or a pattern that is predetermined by the user, or may be information that is based on the bio-information on the user, such as recognition information on user's fingerprints or irises. In addition, the authentication information may be information relating to a user's gesture.

According to one embodiment, the user's bio-information may be acquired by the mobile terminal 100, particularly, the wearable device 200.

To this end, the wearable device may be a mobile terminal worn and used on a user's specific body portion.

In particular, the wearable device may be a watch-type mobile terminal worn and used on a user's wrist portion.

In this case, the wearable device may include a communication unit that performs communication with the vehicle control apparatus installed in the vehicle and a body worn on the user's wrist portion and formed to always contact with the wrist portion.

Furthermore, the wearable device may further include a bio-information acquisition unit that acquires bio-information on the user from the specific body portion (for example, a wrist portion).

Here, the communication unit may transmit the acquired user's bio-information to the vehicle control apparatus 400, and the user's bio-information may be stored in the memory 440.

The bio-information is at least one of information on a heart rate, a body fat, a blood pressure, a blood sugar, a facial shape, a fingerprint, a brain wave, and an iris for the user.

It should be understood by those skilled in the art that various bio-information that can be acquired according to the form of the body are applicable to a technology disclosed in the present disclosure.

In addition, a program for operation of the controller 410 is stored in the memory 440, pieces of data, (for example, user authentication information, or driving environment setting information) that are input or output may be temporarily stored in the memory 440. Pieces of data on various patterns of vibration and sound that are output when a touch input is applied to the touch screen are stored in the memory 440.

The memories 440 include storage media, such as a flash memory, a hard disk, a solid state disk (SSD), a silicon disk drive (SDD), a multimedia card micro type, a card memory (for example, an SD, a XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The vehicle control apparatus 400 may operate in association with a web storage apparatus that, like the memory 140, performs a storage function over the Internet.

On the other hand, the controller 410 normally controls entire operation of the vehicle control apparatus 400 in addition to the operation associated with the application programs described above. The controller 410 processes the signal, the data, the information, and the like that are input or output through the constituent elements described above, or controls driving of the vehicle by running the application program that is stored in the memory 440. In addition, the controller 410 controls at least one or more, among the constituent elements that are described referring FIG. 1A, in order to run the application program stored in the memory 440. Furthermore, the controller 410 controls the constituent elements that are included in the vehicle control apparatus 400, in combination of at least two or more of them. in order to run the application program.

, a dome switch, a touchpad (e.g., static pressure/capacitance), a jog wheel, a jog switch and the controller 410 determines whether or not the user is an authenticated user, based on the authentication information. The authentication information is recognition information on the user's finger or on a predetermined pattern. In addition, the authentication information is recognition information on user's irises, or information relating to a user's specific gesture. For example, pattern recognition information or finger recognition information is input, as the authentication information, into the controller 410. The pattern recognition information is on multiple-times tapping (for example, multiple taps or multiple knocks) that are applied by the user to one portion of the external or internal surface of the vehicle. The finger recognition information is input through one portion of the external or internal surface of the vehicle, or through a touch screen region that is formed on the window and the window shield glass and the like in the driver seat or the passenger seat. In addition, the controller 410 may recognize the user's gesture that is made inside of or outside of the vehicle, or may recognize the iris information on the user, using the photo sensor or the camera that is provided in the sensing unit 430.

Then, the controller 410 cancels the locked state of the vehicle only when the user is an authenticated user. Then, the vehicle control apparatus 400 enables the user to open the door of the vehicle, the trunk, and the like without having to use the key to them. In addition, the controller 410 may make the vehicle start using predetermined authentication information on the user. In addition, the controller 410 may switch the state of the vehicle to the locked state. That is, based on the selection by the authenticated user, the controller 410 may maintain the locked state of the vehicle until the authentication information on the authenticated user is input again. On the other hand, when the authentication information on the user is input from outside of the vehicle in the state where the vehicle is unlocked, based on this, the controller 410 switches the state of the vehicle to the locked state. Then, when the same authentication information is input again in a state where the vehicle is switched to the locked state, the vehicle may be switched back to the unlocked state.

The touch screen is formed on one portion of the vehicle in order that the authentication information on the user is input into the controller 410. Information on user's fingers or information on the user-set pattern is input into the controller 410 through the formed touch screen. Alternatively, a predetermined password may be input into the controller 410. To do this, the controller 410 performs pattern recognition processing that recognizes writing input or picture-drawing input that is applied to the touch screen, as text or an image, respectively. Furthermore, the controller 410 controls one among the constituent elements described above, or a combination of two or more of them in order to realize the vehicle control apparatus 400 according to various embodiments of the present invention, which are described below.

In addition, the controller 410 may display various pieces of image information on the touch screen that is formed on one portion of the vehicle. For example, the controller 410 may display a finger input region for authenticating the user or graphic objects for applying a pattern input on the touch screen, and may display a result of the user authentication, information relating to the currently-authenticated user, or the like.

Then, when the user is an authenticated user, the controller 410 changes the setting state of the vehicle using the user-related information that corresponds to the corresponding user. For example, by controlling the first drive unit 421, the controller 410 adjusts the height of the driver seat or the like, the angle of the back of the seat, or the like and may adjust the indoor temperature or humidity in the vehicle, based on the authenticated information on the user. In addition, based on information that corresponds to the authenticated user, the controller 410 adjusts the extent to which the window of the driver seat and the front passenger seat are opened or controls the angle of the rear view mirror and the like. The controller 410 may adjust the height of the steering wheel and the like.

The controller 410 may change a vehicle operation mode as well according to the authenticated user. For example, the controller 410 may switch a power steering wheel operation mode to a specific mode (for example, a nominal mode or a sports mode) according to a preference of the authenticated user. In addition, the controller 110 may switch a gear transmission mode to a manual transmission mode or an automatic transmission mode according to a preference of the authenticated user.

In addition, the controller 410 may change not only such hardware settings, but also software settings. For example, if the authenticated user rides in the vehicle, the controller 410 automatically selects his/her favorite music item or a list containing a music item that he/she previously listens to. In addition, the controller 410 may automatically select a channel of a radio broadcasting system that the authenticated user frequently tunes in and listens to.

In addition, the controller 410 may change various settings of the vehicle, based on the time at which the authenticated user rides in the vehicle. For example, based on the time at which the user is authenticated and on the record of the authenticated driver's driving, the controller 410 searches for a destination point where the authenticated user frequently goes at the corresponding time. That is, if the user has a habit of regularly going "home" after work at between 8:00 pm and 9:00 pm, when the user rides in the vehicle at between 8:00 pm to 9:00 pm, the controller 410 may automatically set the destination point to "home" and display the corresponding path on a display unit of the navigation apparatus, based on the record of the driving.

In this manner, the controller 410 of the vehicle control apparatus 400 according to the embodiment of the present invention enables the user to control the vehicle using the authentication information. As a result, the user can ride in the vehicle and control the vehicle in an easier and more convenient manner. When the user is authenticated, the controller 410 of the vehicle control apparatus 400 according to the embodiment of the present invention adjusts various driving environment settings of the vehicle as well, based on the fact that the user is authenticated, thereby automatically providing his/her favorite driving environment.

In addition, whether or not the user rides in the vehicle, the controller 410 may change the hardware or software settings of the vehicle in a convenient manner, based on the user's selection. For example, the controller 410 may change at least one hardware or software setting, based on the multiple-times tapping on the inside of the vehicle, for example, the console box, the gear box, or the windows in the driver seat or the front passenger seat. As one example, if the user applies the tapping multiple times to the steering wheel of the vehicle, the controller 410 recognizes this and thus may adjust the height of the steering wheel or may change the power steering wheel operation mode from one mode to another.

On the other hand, the controller 410 changes the hardware or software setting state, based not only on the multiple taps, but also on the user's gesture. For example, the controller 410 makes it possible for a camera, a photo sensor, a laser sensor, or an infrared sensor to sense movements of the driver or the passenger who rides in the vehicle. Then, based on the movements of the driver and the passenger, the controller 410 may perform a specific function and adjust a currently-set state. As one example, if the passenger sitting on the front passenger seat make a hand-lowering gesture toward the window in the front passenger seat, the extent to which the window in the front passenger seat is opened is adjusted based on the passenger's gesture. In addition, if a specific gesture (for example, a fingers-flicking gesture or a hands-clapping gesture) is sensed, the controller 410 may reproduce predetermined specific music data, based on the driver's or passenger's gesture.

On the other hand, at least one or more among the constituent elements described above, operate in cooperation with one another to realize operation or control of the vehicle control apparatus 400, or a method of controlling the vehicle control apparatus 400, which are described above, according to various embodiments. In addition, the operation or the control of the vehicle control apparatus 400, or the method of controlling the vehicle control apparatus 400 is realized on the vehicle control apparatus 400 by running at least one application program that is stored in the memory 440.

The constituent elements enumerated above are described in more detail below referring to FIG. 6A, before describing the vehicle control apparatus 400 according to the various embodiments.

The sensing unit 430 senses at least one among information on the inside of the vehicle control apparatus, information on an surrounding environment of the vehicle control apparatus, and information on the user, and generates a sensing signal corresponding to the sensed information. Based on the sensing signal, the controller 410 controls driving of or operation of the vehicle control apparatus 400, or performs data processing, a function, or an operation associated with the application program that is stored on the vehicle control apparatus 400. Typical sensors among various sensors that can be included in the sensing unit 430 are described in more detail.

The proximity sensor 432 may include a sensor to sense presence or absence of an object approaching a surface, or an object located near a surface, by using an electromagnetic field, infrared rays, or the like without a mechanical contact. The proximity sensor 432 may be arranged at an inner region of the mobile terminal covered by the touch screen, or near the touch screen.

The proximity sensor 432, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 432 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 432 senses a proximity touch and a proximity touch pattern (for example, a proximity touch distance, a proximity touch direction, a proximity touch speed, proximity touch time, a proximity touch position, a proximity touch movement state, and the like). On the other hand, the controller 410 processes data (or information) that corresponds to the proximity touch operation and the proximity touch pattern that are sensed through the proximity sensor 432, and further outputs visual information that corresponds to the processed data, on the touch screen. Furthermore, the controller 410 may control the vehicle control apparatus 400 in such a manner that different operations are performed or different pieces of data (or different pieces of information) are processed depending on whether the touch applied to the same point on the touch screen is a proximity touch or a contact touch.

A touch sensor can sense a touch applied to the touch screen, such as the display unit 451, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 451, or convert capacitance occurring at a specific part of the display unit 451, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 410. Accordingly, the controller 410 may sense which region of the display unit 451 has been touched. Here, the touch controller may be a component separate from the controller 410, the controller 410, and combinations thereof.

In some embodiments, the controller 410 may execute the same or different controls according to a type of touch object that touches the touch screen or a touch key provided in addition to the touch screen. Whether to execute the same or different control according to the object which provides a touch input may be decided based on a current operating state of the vehicle control apparatus 400 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 410, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The sensing unit 430 typically includes at least one a camera sensor (CCD, CMOS etc.), a photo sensor (or image sensors), and a laser sensor.

Implementing a camera 421 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

As described above, various pieces of image information relating to inputting of the authentication information on the user are displayed on the display unit 451. For example, a graphic object that indicates a region for inputting a user's fingerprint or a graphic object for inputting the pattern information are displayed on the display unit 451 that is formed, as the touch screen, on one portion of the vehicle. In addition, if user authentication is ended, a result of the user authentication and information relating to the currently-authenticated user may be displayed on the display unit 451. These pieces of image information are displayed on at least one portion of the windshield glass of the vehicle, the window in the front passenger seat, or the like. To do this, at least one portion of the window of the vehicle or at least one portion of the windshield glass of the vehicle that is equipped with the vehicle control apparatus 400 according to the embodiment of the present invention is designed in such a manner that the touch input by the user is sensed.

In addition, the display unit 451 is formed on not only the external surface of the windshield glasses and of the window, but also on the internal surface. Then, information that is processed in the vehicle control apparatus 400 may be displayed (or output) on the display unit 451 that is formed on the internal surface.

For example, screen information that is displayed on the display unit 451 that is formed on the internal surface is execution screen information on an application program that is run on the vehicle control apparatus 400, or information on a user interface (UI) and a graphic user interface (GUI) that depend on the execution screen information.

In addition, the display unit 451 may be realized as included in the sensing unit 130. In this case, a result of the sensing by the sensing unit 430, and a result of matching the user authentication information or at least one portion (for example, a name of the user and like) of the authentication information inherent to the user may be displayed on the display unit 451.

Audio data that is stored in the memory 440 is output through the sound output unit 452. A sound signal associated with a function (for example, a user authentication confirmation sound and a user authentication guidance sound) that is performed in the vehicle control apparatus 400 may be output through the sound output unit 452. The sound output unit 452 is configured to include a speaker, a buzzer, and the like.

On the other hand, the output unit 450 of the vehicle control apparatus 400, disclosed in the present specification, according to the embodiment, is configured to include the haptic module 453. The haptic module 453 generates various haptic effects that the user can feel. A typical example of the haptic effect that is generated by the haptic module 453 is vibration. If it is sensed that the touch input by the user is applied to the touch screen realized on the external frame of the internal frame of the vehicle, the widow in the form of glass, or the like, the controller 410 outputs haptic information using the haptic module 453. Accordingly, using the haptic information, the user can confirm whether he/she properly input the authentication information.

The strength, pattern and the like of the vibration generated by the haptic module 453 can be controlled by user selection or setting by the controller. For example, the haptic module 453 may output different vibrations in a combining manner or a sequential manner.

Besides vibration, the haptic module 453 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 453 can also be implemented to allow the user to feel a tactile effect through a muscle sensation such as the user's fingers or arm, as well as transferring the tactile effect through direct contact. Two or more haptic modules 453 may be provided according to the particular configuration of the vehicle control apparatus 400.

Various embodiments to be explained later may be implemented in a computer or a computer-readable recording medium, by software, hardware, or a combination thereof.

On the other hand, the sensing unit 430 of the vehicle control apparatus 400, disclosed in the present specification, according to the embodiment may further include a main body that is configured to be mounted on the body and to come into contact with one portion of a user's body, and a tap sensing unit 433 for sensing a tap on the main body or a tap gesture. At this point, the tap that is sensed in the tap sensing unit 433 of the vehicle control apparatus 400 is a means for inputting the authentication information on the user. In addition, if the user rides in the vehicle, the tap is used as a means for controlling various functions of the vehicle control apparatus 400. Then, the tap is construed to mean a motion of lightly hitting the main body of the vehicle control apparatus 400 or an object, with a tapping tool such as a finger, or a motion of lightly bringing the tapping tool into contact with the main body of the vehicle control apparatus 400 or the object. At this point, the main body of the sensing unit 430 is formed on the body of the vehicle that is configured to include the external frame and the internal frame of the vehicle and the window or the windshield glass.

On the other hand, the tapping tool with which the tap is applied is a thing that applies an external force to the main body of the vehicle control apparatus 400 or the object, such as a finger, a stylus pen, a pen, a pointer, and a fist. On the other hand, the tipping tool is not necessarily limited to the thing that can be applied to the vehicle control apparatus 400 according to the present invention, and any type of thing may be possible as long as it can apply the external force to the main body of the vehicle control apparatus 400 or the object.

On the other hand, the objects to which the tap gesture is applied is at least one among the main body of the vehicle control apparatus 400 and the object that is placed on and on the vehicle control apparatus 400.

On the other hand, the tap or the tap gesture is sensed by at least one among an acceleration sensor and a touch sensor that are included in the tap sensing unit 433. At this point, the acceleration sensor is a sensor that is capable of measuring dynamic forces, such as acceleration, vibration, and impact, which are applied to the main body of the vehicle control apparatus 400.

That is, the acceleration sensor senses vibration (or a movement) of the main body of the vehicle control apparatus 400, which occurs due to the tap gesture, and thus senses whether the tap is applied to the object. Therefore, the acceleration sensor senses the tap on the main body of the vehicle control apparatus 400 or senses that an object that is positioned close to the main body of the vehicle control apparatus 400 to such an extent that it can be sensed whether the movement or the vibration occurs in the main body of the vehicle control apparatus 400 is tapped on.

In this manner, as long as the sensing of the movement or the vibration of the main body of the vehicle control apparatus 400 is possible, the acceleration sensor senses not only the application of the tap to the main body of the vehicle control apparatus 400, but also senses the application of the tap to points other than the main body.

In the vehicle control apparatus 400 according to the present invention, in order to sense the tap on the vehicle control apparatus, only one among the acceleration sensor and the touch sensor is used, the acceleration sensor and the touch sensor are sequentially used, or the acceleration sensor and the touch sensor are used at the same time. On the other hand, a mode in which only the acceleration sensor is used to sense the tap is referred to as a first mode, a mode in which the touch sensor is used to sense the tap is referred to as a second mode, and a mode in which the acceleration sensor and the touch sensor are all utilized (at the same time or sequentially) to sense the tap is referred to as a third mode or a hybrid mode.

On the other hand, if the tap is sensed through the touch sensor, it is possible to more accurately recognize a position at which the tap is sensed.

On the other hand, in the vehicle control apparatus 400 according to one embodiment, in order to sense the tap through the acceleration sensor or the touch sensor, the display unit 451 of the vehicle control apparatus 400 also operates in an inactivated state in a specific mode in which a minimum amount of current or electric power is consumed. The specific mode is referred to as a doze mode.

For example, in the dose mode, a light-emitting element for outputting a screen is turned off and the touch sensor is turned on in the display unit 451 in a touch screen structure in which the touch sensor is layered into the display unit 451. In addition, the dose mode is a mode in which the display unit 451 is turned off and the acceleration sensor is turned on. In addition, the dose mode is a mode in which the display unit 451 is turned off and the touch sensor and the acceleration sensor are all turned on.

Therefore, in the dose mode, that is, in a state where the display unit 451 is turned off (in a state where the display unit 451 is inactivated), if the user applies the tap to at least one point on the touch screen that is formed on one portion of the vehicle, or to a specific point on the main body of the vehicle control apparatus 400, it is sensed that the tap is applied from the user, through at least one among the touch sensor or the acceleration sensor that is turned on.

In addition, in order to distinguish between a tap as a means for inputting the authentication information on the user or a tap as a means for controlling a function of the vehicle control apparatus 400, and a simple collision of an outside arbitrary object with the touch screen, only if the tap is applied two or more times within a reference time to the touch screen formed on one portion of the vehicle, it is determined that the "tap" is sensed for inputting the authentication information on the user and controlling the vehicle control apparatus 400. For example, if it is determined that as a result of the sensing by the tap sensing unit 433, the tap is applied one time to the touch screen formed on one portion of the vehicle, the controller 410 may recognize that only the outside arbitrary object or an human body collides with the touch screen, without recognizing that the one-time tap is for inputting the authentication information on the user.

Therefore, only if the tap sensing unit 433 senses that the tap is applied at least two or more times (or multiple times) consecutively within the reference time, it is determined that the "tap" as the means for inputting the authentication information on the user or as the mean of controlling the function of the vehicle control apparatus 400 is sensed.

That is, the tap gestures mean that the tap gesture is to be sensed at least two or more times consecutively within the reference time. Therefore, the sensing of the "tap" hereinafter means that it is sensed that a user's finger or an object such as a touch pen is lightly hit substantially multiple times on the main body of the main body of the vehicle control apparatus 400.

Furthermore, the controller 410 may make it possible not only to sense the tap within the reference time, but also to determine whether the taps applied using user's different fingers are sensed or the taps applied using one finger of the user's are sensed. For example, if it is sensed that the taps are applied to one predetermined portion of the vehicle, that is, one portion of the window of the vehicle or one portion of the window shield glass, an A-pillar, a B-pillar, a C-pillar, a sunroof, one portion of a vehicle door, or a console box or a gear box in the vehicle, the controller 410 makes it possible to sense whether the taps are applied using one finger or using different fingers, using fingerprints that are sensed from the portion to which the taps are applied. In addition, the controller 410 recognizes a position on the display unit 451, at which the taps are sensed, or acceleration that is generated due to the taps, through at least one, among the touch sensor and the acceleration sensor that are provided in the tap sensing unit 433. Thus, the controller 410 makes it possible to sense whether the taps are applied using one finger or using different fingers.

Furthermore, considering additionally an angle at which the tap is applied and a distance between points to which the tap is applied or a direction in which the fingerprint is recognized, the controller 410 determines whether the taps are applied using one finger or using both hands or at least two fingers.

On the other hand, the taps mean multiple-times tapping that are sensed consecutively within the reference time. At this point, the reference time is a very short time, for example, a time in a range of 300 ms to 2 s.

To do this, when the tap sensing unit 433 senses that the main body of the vehicle control apparatus 400 is tapped on, the tap sensing unit 433 senses whether the next tapping is applied consecutively within the reference time after the first tapping is sensed. Then, if the next tapping is sensed within the reference time, the tap sensing unit 433 or the controller 410 determines that the tap is sensed for inputting the authentication information on the user or for controlling a specific function of the vehicle control apparatus 400 according to the embodiment of the present invention. In this manner, only if a second tap is sensed within a predetermined time after a first tap is sensed, the controller 410 recognizes the first and second taps as "effective taps." Thus, the controller distinguishes between the tap that is applied to input the authentication information on the user or to control the vehicle control apparatus 400 and the collision of an object with the inside or outside of the vehicle, which occurs unintentionally or due to a user mistake.

There are various method of recognizing the "effective tap." For example, when it is sensed that the second tap is applied a second reference number of times or greater to the main body within a predetermined time after sensing the first tap that is applied a first reference number of times or greater, the controller 410 may recognizes the first and second taps as the "effective taps." At this point, the first reference number of times and the second reference number of times may be the same or be different. For example, the first reference number of times may be 1, and the second reference number of times may be 2. As another example, the first reference number of times and the second reference number of times may be all 1.

In addition, only if the tap is applied to within a "predetermined region," it is determined that the "taps" are sensed. That is, when it is determined that the main body of the vehicle control apparatus 400 is first tapped on, the controller 410 calculates a predetermined region from a point at which the tapping is first sensed. Then, if the tapping is consecutively sensed the first or second reference number of times or greater at the "predetermined region" within the reference time after the first tapping is sensed, the controller 410 determines that the first tap or the second tap is applied.

On the other hand, of course, the reference time and the predetermined region that are described above can be variably modified according to the embodiment.

On the other hand, of course, the first tap and the second tap may be sensed as a separate tap according to not only the reference time and the predetermined region, but also a position at which each tap is sensed. That is, if the second tap is sensed in a position that is a predetermined distance or above away from the position in which the first tap is sensed. the controller 410 determines that the first tap and the second tap are applied. Then, if the first tap and the second tap are recognized based the position in which the tap is sensed, the first tap and the second tap may be sensed at the same time.

In addition, if the first tap and the second tap are configured from multiple touches, that is, from multiple-times tapping, of course, the multiple touches that make up each of the first tap and the second tap are sensed at the same time. For example, if the first touch that makes up the first tap is sensed and at the same time, the first touch that makes up the second tap is sensed in a position that is a predetermined distance or above from a position in which the first touch that makes up the first tap is sensed, the controller 110 makes it possible to enable the first touch that makes up each of the first tap and the second tap. Then, the controller 410 makes it possible to enable an additional touch input, which is sensed in each position. If the touch is sensed the first reference number of times or greater or the second reference number of times or greater, the controller 410 determines that the first tap and the second tap are applied.

On the other hand, when the tap sensing unit 433 senses multiple times that the tap is applied to the main body of the vehicle control apparatus 400, the controller 410 controls not only the user authentication, but also at least one among functions that is executable on the vehicle control apparatus 400. At this point, the functions that is executable on the vehicle control apparatus 400 means all types of functions that is executable or operable on the vehicle control apparatus 400. At this point, one among the executable functions is a function of an application that is installed on the vehicle control apparatus 400. Then, "an arbitrary function is executed" means "an arbitrary application program is executed or is run on the vehicle control apparatus 400." For example, based on the user's multiple taps that are sensed in the console box, the controller 410 reproduces a music file or controls the navigation apparatus in such a manner that a path to a predetermined destination point is automatically set.

As another example, a function that is executable in the vehicle control apparatus 400 is a function that is necessary for basic driving of the vehicle control apparatus 400. For example, the function necessary for the basic driving is a function of turning on/off an air conditioner or a warm-air circulator provided in the vehicle, a function of starting the vehicle, a function of switching between the locked state and the unlocked state, or the like. In addition, the function necessary for the basic driving is a function of turning a cruise control function of the vehicle on or off.

On the other hand, the controller 410 forms a position for inputting the authentication information on the user, based on a point on the main body or the touch screen at which the tapping by the user is sensed. For example, the controller 410 forms a region for inputting the pattern information, or forms a region for inputting the bio-information on the user, for example, the user's fingerprint, in such a manner that the point at which the tapping by the user is first applied serves the center of the region for inputting the pattern information or the bio-information. In this case, even though the user applies the tap to a different point on the main body or the touch screen each time he/she applies the tap, the point at which the information on the user-set pattern or the bio-information on the user varies each time the user applies the tap. Accordingly, the user can minimize exposure of the authentication information, and this is a safeguard against an illegal act, such as when the vehicle is stolen.

Of course, the user authentication information may be also input into the vehicle control apparatus 400 through an external device that is predetermined based on the user's selection. For example, the sensing unit 430 is connected to a predetermined external device outside of the vehicle using a short-range communication module 431. The authentication information on the user may be input into the sensing unit 430 through the short-range communication module 431 and may be authenticated by the controller 410.

The vehicle control apparatus 400 obtains vehicle information from the vehicle.

According to one embodiment, the vehicle information is obtained through the sensing unit 430 described above.

According to another embodiment, the vehicle control apparatus 400 separately is configured to include a vehicle information acquisition unit C401 that obtains the vehicle information.

At this point, the vehicle information is information relating to at least one, among an air conditioning function of the vehicle, a function of checking whether doors (including a hood, a trunk, a fuel intake) are opened or closed, a function of checking whether the windows are opened or closed, a function of checking whether the sunroof is opened or closed, a charged state of a battery of the vehicle, a place where the vehicle is parked, a function of the navigation apparatus provided in the vehicle, a function of checking whether the vehicle is stolen, an amount of fuel in the vehicle, and the like.

In addition, the vehicle information is configured to further include at least information relating to at least one, among current driving speed of the vehicle, current driving acceleration, mileage, the number of times that the vehicle gains sudden acceleration, the number of times that the vehicle stops suddenly.

To that end, the vehicle information acquisition unit C401 communicates with various sensors provided in the vehicle.

For example, the vehicle information acquisition unit C401 is installed in the vehicle, communicates with an acceleration sensor that measures acceleration of the vehicle, and gathers acceleration information on the vehicle.

In addition, for example, the vehicle information acquisition unit C401 performs communication with a black box provided in the vehicle, and obtains when a vehicle accident occurs.

In this case, images associated with the vehicle accident are stored in the memory 440.

FIG. 6B illustrates an example in which an external device that is predetermined in this manner is connected to the vehicle control apparatus according to the embodiment of the present invention.

Referring to FIG. 6B, the predetermined external device 170 is a mobile terminal, such a phone 171 or a smart key 172 that is carried by the user. In this case, the controller 410 recognizes a serial number of the external device 170. If the external device 170 is positioned within a given distance from the controller 410, the controller 110 automatically recognizes a specific user. Then, the controller 410 receives the authentication information that is input through the external device 170. The authentication information that is input from the external device 170 is transferred to the vehicle control apparatus 400 through a communication module provided in the external device 170 and through the short-range communication module 431 of the sensing unit 430.

On the other hand, the authentication information is the bio-information on the user.

According to one embodiment, the bio-information is obtained by the mobile terminal 100 (or the wearable device 200).

To this end, the wearable device 200 may be a watch-type mobile terminal worn and used on a user's wrist portion.

In this case, the wearable device 200 may include a communication unit that performs communication with the vehicle control apparatus 400 installed in the vehicle 500 and a body worn on the user's wrist portion and formed to always contact with the wrist portion.

Furthermore, the wearable device 200 may further include a bio-information acquisition unit that acquires bio-information on the user from the specific body portion (for example, a wrist portion).

Here, the communication unit may transmit the acquired user's bio-information to the vehicle control apparatus 400, and the user's bio-information may be stored in the memory 440.

The bio-information is at least one of information on a heart rate, a body fat, a blood pressure, a blood sugar, a facial shape, a fingerprint, a brain wave, and an iris for the user.

For example, the authentication information is information on the user's heart rate or fingerprints, recognition information on the user's irises, information on the predetermined password of the user, or information on the pattern that is set by the user. In addition, the authentication information may be information relating to a user's specific gesture.

According to an embodiment, the authentication of the user is done based on multiple pieces of bio-information or multiple pieces of authentication information.

For example, the user's heart rate and the user's gesture are checked, and then the authentication of the user is done.

To do this, the external device 170 may additionally have a configuration for the user inputting the authentication information, that is, a configuration for executing the same functions as those of at least one or more among the sensors provided in the sensing unit 430 of the vehicle control apparatus 400 according to one embodiment or the same functions as those of additional sensors.

For example, the external device 170, such as the smart key 172 or the smart phone 171, may further include a sensing unit that is the same as, is similar to, corresponds to the touch screen into which the user can input the pattern information, or the tap sensing unit 433 which is provided in the sensing unit 430 of the vehicle control apparatus 400. In addition, the external device 170 may further include a fingerprint recognition unit for recognizing the user's fingerprints. Of course, the external device 170 may further include an inertial sensor, a gyro sensor, an acceleration sensor, or the like.

In addition, for example, a smart watch 173, which is a watch-type mobile terminal, is configured to include a sensor that obtains the user' heartbeat.

In addition, for example, smart glasses 174, which is a glasses-type mobile terminal, is configured to include an iris recognition camera for recognizing the user's irises.

In this case, the user can input the authentication information on him/her using at least one piece of information among the information on the fingerprints, the predetermined pattern information, and the iris recognition information. In addition, the user may input the authentication information on him/her into the external device 170 by making a specific gesture while wearing the external device 170. In this case, according to the user's gesture, the controller 110 of the external device 170 recognizes the user's gesture using information on a change in a position of the external device 170, that is, an acceleration measurement value, an amount of change in gravity, or a value that is obtained by measuring an amount of change in inertia. Thus, the controller 110 makes use of such information as the authentication information. In addition, the external device 170 may recognize that the position is changed, using an image of the user that is input through the camera and the like, and may measure a value that is changed.

On the other hand, if the authentication information is input in this manner, the controller 410 of the vehicle control apparatus 400 controls the driving of the vehicle using the authentication information that is input. For example, the controller 410 may recognize the current user according to the authentication information, and may cancel the locked state of the vehicle and set an internal environment of the vehicle that corresponds to the recognized user. In addition, if the locked state of the vehicle is canceled and the authentication information is input back in a state where the vehicle stops, the controller 410 may return the unlocked state of the vehicle to the locked state.

On the other hands, the vehicle may be controlled immediately using the authentication information on the user, which is input through the external device 170, but the controller 410 may request the user to go through an authentication process one more time. In this case, if the external device 170 is positioned within a given distance from the controller 410 or the authentication information is input through the external device 170, the controller 410 switches the state of the vehicle to a wake up state and prepares for starting the vehicle according to the authentication information that is input from the authenticated user. If in a state where the vehicle switches to the wake up state, the user inputs the authentication information one more time into a predetermined region (for example, the window in the driver seat or in the front passenger seat, the A- or B-, or C-pillar, or the like), the controller 410 authenticates the user according to the input and thus starts the vehicle.

In addition, the example is described above in which an authentication procedure is one more time is performed, but of course, more authentication procedures may be performed without limitation. In addition, the example is described above in which if the authentication information on the user is input through external device 170, the multiple authentication procedures are performed, but of course, the multiple authentication procedure may be applied also to a case where the user inputs the authentication information on him/her directly into the touch screen region that is formed on one portion of the vehicle.

Figure 7:
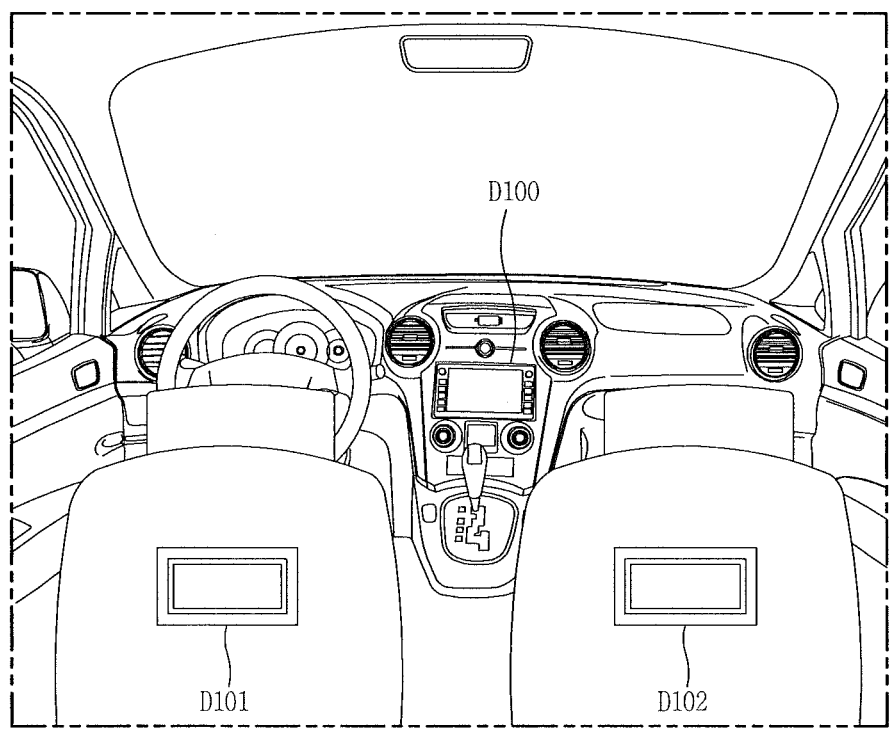
FIG. 7 is an exemplary view for explaining a display unit in a vehicle control apparatus according to an embodiment disclosed in the present disclosure.

FIG. 7 is a diagram for describing the display unit of the vehicle control apparatus, disclosed in the present specification, according to one embodiment.

FIG. 7 illustrates a case where the vehicle control apparatus 400 is realized as in the form of a head unit of the vehicle.

The vehicle control apparatus 400 is configured to include multiple display units D100 to D102.

For example, as illustrated in FIG. 7, the vehicle control apparatus 400 is configured to include one first display unit D100 in front of the driver seat, and two second display units D101 and D102 in front of the rear seats.

At this time, generally, only the first display unit D100 is subject to regulations for safe driving.

Therefore, only the first display unit D100 is subject to vehicle content display regulations, and all content is displayed on the second display units D101 and D102 with any limitation.

Figure 8A:
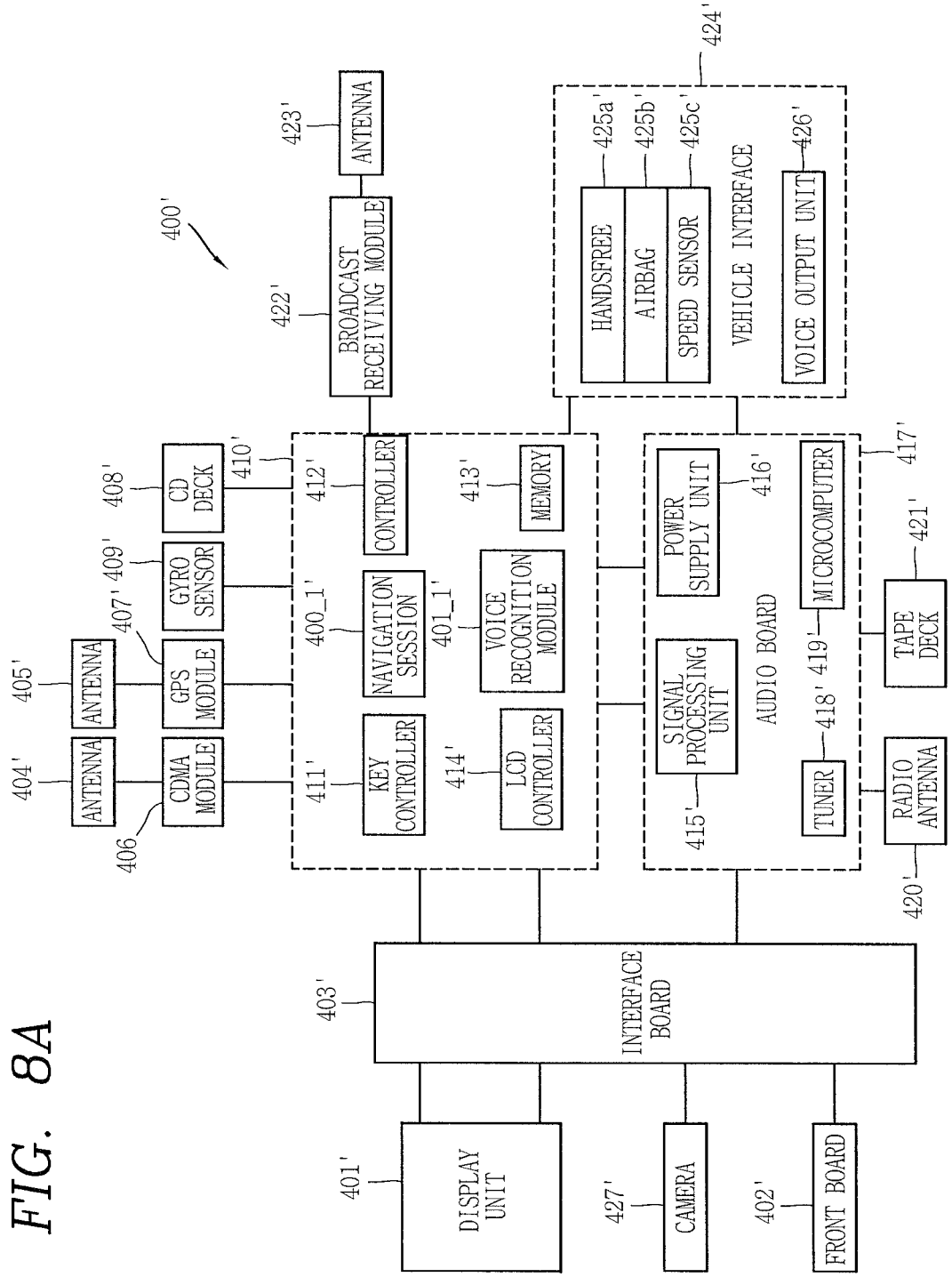
FIG. 8A is a block diagram illustrating the configuration of a vehicle control apparatus according to another embodiment disclosed in the present disclosure.

FIG. 8A is a block diagram illustrating a configuration of the vehicle control apparatus, disclosed in the present specification, according to another embodiment.

FIG. 8A illustrates a case where the vehicle control apparatus 400 is realized as in the form of an image display apparatus, a head unit of the vehicle, or a telematics terminal.

As illustrated in FIG. 8A, a vehicle control apparatus 400' is configured to include a main board 410'. A controller (for example, a central processing unit (CPU) 412' that controls all operations of the vehicle control apparatus 400', a program for processing or controlling the controller 412', a key controller 411' that controls various key signals, and an LCD controller 414' that controls a liquid crystal display (LCD) are built into the main board 410'.

Map information (map data) for displaying directions-suggestion information on a digital map is stored in the memory 413'. In addition, a traffic information collection/control algorithm for inputting the traffic information according to a condition of a road along which the vehicle moves currently, and information for controlling the algorithm are stored in the memory 413'.

The main board 410' is configured to include a code division multiple access (CDMA) module 406' that is assigned a serial number and is built into the vehicle, a global positioning system (GPS) module 207 that receives GPS signals for identifying a vehicle position, tracking a driving path from a departure point to a destination point, and so forth, transmits traffic information collected by the user, a CD deck 408' for reproducing signals recorded on a compact disk (CD), a gyro sensor 409' and the like. The CDMA module 406' and the GPS module 407'transmit/receive a signal to/from antennas 404' and 405', respectively.

In addition, a broadcast reception module 422' is connected to the main board 410' and receives a broadcast signal through an antenna 423'. A display unit (LCD) 401' that controlled by the LCD controller 414' through an interface board 430', a front board 402' that is controlled by the key controller 411', and a camera 427' that captures an image of a scene inside of and/or outside of the vehicle are connected to the main board 410'. Various video signals and text signals are displayed on the display unit 401'. Buttons for inputting various key signals are provided on the front board 402'. The front board 410' provides the key signal corresponding to the button selected by the user. In addition, the display unit 401' is configured to include a proximity sensor and a touch sensor (touch screen).

A menu key for directly inputting the traffic information is provided on the front board 402'. The menu key is configured in such a manner that the menu key is controlled by the key controller 411'.

The audio board 417' is connected to the main board 410' and processes various audio signals. The audio board 417' is configured to include a microcomputer 419' for controlling the audio board 417', a tuner 418' that receives a radio signal, a power supply unit 416' that supplies electric power to the microcomputer 419', and a signal processing unit 415' that processes various voice signals.

In addition, the audio board 417' is configured to include a radio antenna 420' for receiving the radio signal and a tape deck 421' for reproducing an audio tape. The audio board 417' may be configured to further include a voice output unit (for example, an amplifier) 426' for outputting the voice signal that is signal-processed in the audio board 417'.

The voice output unit (amplifier) 426' is connected to a vehicle interface 424'. That is, the audio board 417' and the main board 410' are connected to the vehicle interface 424'.

A hands-free kit 425a' for inputting the voice signal, an air bag 425b' for driver's or passenger's safety, a speed sensor 425c' for detecting a vehicle speed, and so on may be connected to the vehicle interface 424'. The speed sensor 425c' calculates the vehicle speed and provides information on the calculated vehicle speed to the central processing unit 412'.

A navigation session 400_1' applied to the vehicle control apparatus 400' generates the directions-suggestion information, based on the map data and current position information on the vehicle, and notifies the user of the generated directions-suggestion information.

The display unit 401' senses a proximity touch within a display window through the proximity sensor. For example, when a pointer (for example, a finger or a stylus pen) comes into proximity touch with the display unit 401', the display unit 401' detects a position of the proximity touch and outputs positional information corresponding to the detected position to the controller 412'.

A voice recognition device (or a voice recognition module) 401_1' recognizes a voice generated by the user and performs a corresponding function according to the signal of the recognized voice.

The navigation session 400_1' applied to the vehicle control apparatus 400' displays the driving path on the map data. When the position of the mobile communication terminal 100' is within a predetermined distance from a blind spot included in the driving path, the navigation session 400_1' automatically sets up a connection to a terminal (for example, a vehicle navigation apparatus) mounted in the vehicle in the vicinity and/or to a mobile terminal being carried by a pedestrian in the vicinity over a wireless network (for example, a short-range wireless communication network). Thus, the navigation session 400_1' receives the positional information on the vehicle in the vicinity from the terminal mounted in the vehicle in the vicinity and receives the positional information on the pedestrian from the mobile terminal being carried by the pedestrian in the vicinity.

On the other hand, the main board 410' is connected to an interface unit (not illustrated) 430', and the interface unit 430' (not illustrated) is configured to include an external-apparatus interface unit 431' and a network interface unit 432'.

The external-apparatus interface unit 431' connects an external device and the vehicle control apparatus 400'. To do this, the external-apparatus interface unit 431' is configured to include an A/V input/output unit (not illustrated) or a wireless communication unit (not illustrated).

The external-apparatus interface unit 431' is connected, for example, to an external device, such as a digital versatile disk (DVD) player, a Blu-ray disk player, a game apparatus, a camera, a camcorder, or a computer (notebook computer) in a cable or wireless manner. The external-apparatus interface unit 431' transfers to the controller 412' of the vehicle control apparatus 400' an image, a voice, or data signal that is input from outside through the connected external device. In addition, the image, the voice, or the data signal that is processed in the controller 412' is output to the connected external device. To do this, the external-apparatus interface unit 431' is configured to include an A/V input/output unit (not illustrated) or a wireless communication unit (not illustrated).

The A/V input and output unit is configured to include a USB port, a Composite Video Banking Sync (CVBS) port, a composite port, a S-video port (analog), a Digital Visual Interface (DVI) port, a High Definition Multimedia Interface (HDMI) port, a RGB port, a D-SUB port, and the like in order to input an image and a voice signal from the external device to the vehicle control apparatus 400'.

The wireless communication unit performs short-range communication with a different electronic apparatus. The vehicle control apparatus 400' is connected to the different electronic apparatus in accordance with telecommunication standards, such as Bluetooth, Radio Frequency Identification (RFD), Infrared Data Association (IrDA), Ultra Wideband, and ZigBee over the network.

In addition, the external-apparatus interface unit 431' may be connected to various set-top box through at least one among the various ports, and may perform an input/output operation while in connection to the set-top box.

On the other hands, the external-apparatus interface unit 431' receives an application or an application list that is present in the adjacent external device, and transfers the application or the application list to the memory 413'.

The network interface unit 432' provides an interface for connecting the vehicle control apparatus 400' to a wire/wireless network, such as the Internet. The network interface unit 432' is configured to include, for example, an Ethernet port for the connection to the wire network. For the connection to the wireless network, telecommunication standards are used such as Wireless LAN (WLAN) (Wi-Fi), Wireless broadband (Wibro), World Interoperability for Microwave Access (Wimax), and High Speed Downlink Packet Access (HSDPA).

The network interface unit 432' transmits or receives data to and from the different user or the different electronic apparatus over a connected network, or a different network linked to the connected network. Particularly, one or more pieces among pieces of content data stored in the vehicle control apparatus 400' are transmitted to the user or the electronic apparatus selected from among other users or other electronic apparatuses that are pre-registered with the vehicle control apparatus 400'.

On the other hand, the network interface unit 432' is connected to a predetermined web page over a connected network or a different network linked to the connected network. That is, the network interface unit is connected to the predetermined web page to transmit or receive data to or from a corresponding server. In addition, items of content or pieces of data are received that are provided by a content provider or a network administrator. That is, content, such as a movie, an advertisement, a game, VOD, and a broadcast signal, and information relating to these, which are provided from the content provide or the network administrator, are received. In addition, update information on firmware and an update file, which are provided by the network administrator, are received. In addition, pieces of data are transmitted to the content provider and the network administrator over the network such as the Internet.

In addition, the network interface unit 432' selects a desired application from applications in the public domain, and receives the selected application, over the network.

Figure 8B:
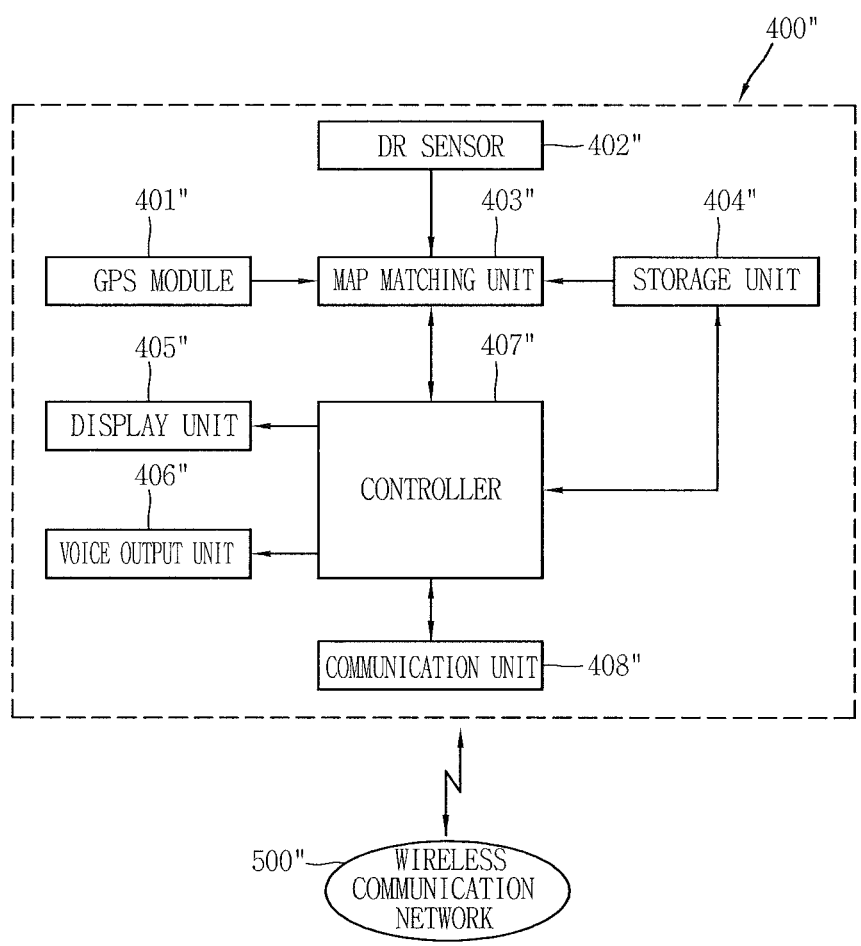
FIG. 8B is a block diagram illustrating the configuration of a vehicle control apparatus according to another embodiment disclosed in the present disclosure.

FIG. 8B is a block diagram illustrating a configuration of the vehicle control apparatus, disclosed in the present specification, according to another embodiment.

FIG. 8B is a configuration diagram illustrating the vehicle control apparatus 400', focusing on a function of the vehicle navigation apparatus.

If a vehicle control apparatus 400" is realized as the vehicle navigation apparatus, the vehicle control apparatus 400" is categorized into an in-ash type and an on-dash type according to how the vehicle navigation apparatus is installed. The in-dash type navigation (vehicle navigation) apparatus is inserted into a given space secured within a dashboard of the vehicle, and is held in place there. The on-dash type navigation (vehicle navigation) apparatus is held in place on the dashboard of the vehicle, or is held in place in the vicinity of the dashboard using a given support, in a manner that can be attached to and be detached from the dashboard. Thus, the on-dash type navigation apparatus is portable.

The vehicle control apparatuses 400" according to the present embodiments include the in-dash type of navigation (vehicle navigation) apparatus and the on-dash type of navigation (vehicle navigation) apparatus. In addition, the navigation (vehicle navigation) apparatuses include all information processing apparatuses that are capable of receiving and/or processing the traffic information, such as various types of portable terminals that are capable of performing a navigation function in cooperation with a GPS receiver within the vehicle, which receives a navigation message that is transmitted from a global positioning system (GPS) satellite.

As illustrated in FIG. 8B, the vehicle control apparatus 400" is configured to include a GPS module 401", a dead-reckoning sensor (DR) sensor 402", a storage unit (or memory) 404", a map mapping unit 403", a communication unit 408", a controller 407", a display unit 405", and a voice output unit 406". The GPS module 401" receives a global positioning system (GPS) signal from the satellite and generates first vehicle position data on the navigation apparatus (whose position is defined as being the same as that of the mobile communication terminal 100), based on the received GPS signal. The dead-reckoning sensor (DR) sensor 402" generates second vehicle position data, based on a driving direction of a vehicle and a speed of the vehicle. The map data and various pieces of information are stored in the storage unit 404" (or memory). The map mapping unit 403" generates a vehicle estimation position, based on the first vehicle position data and the second vehicle position data, matches the generated vehicle estimation position with a link (or a map match link, or a map match road) within the map data stored in the storage unit 404", and outputs the matching-caused map information (the result of map matching). The communication unit 408" receives real time traffic information from an information provision center and/or from the vehicle in the vicinity over a wireless communication network 500", receives traffic light-signal information, and performs telephone communication. The controller 407" generates the directions-suggestion information, based on the matching-caused map information method (the result of map matching). The directions-suggestion map (including information on the point of interest) included in the directions-suggestion information and the traffic signal-light information are displayed on the display unit 405". The voice output unit 406" outputs directions-suggestion voice information (a directions-suggestion voice message) included in the directions-suggestion information and a voice signal corresponding to the traffic light-signal information.

At this point, the communication unit 408" may further include a hands-free kit including a Bluetooth module and may receive a broadcast signal including the traffic information in a TPEG format from the broadcasting station through an antenna. The broadcast signal includes not only audio and video data in accordance with various types of specifications, such as ground wave or satellite Digital Multimedia Broadcasting (DMB), Digital Audio broadcasting (DAB), digital Video Broadcasting (DVB-T and DVB-H), but also additional information, such as traffic information and various types of additional data, which is provided through traffic information (TPEG) service and Binary Format for Scene (BIFS) data service. In addition, the communication unit 408" performs synchronizing on a signal band in which the traffic information is provided, demodulates the synchronized signal, and outputs the demodulated signal to a TPEG decoder (which is included in a controller 407).

The TPEG decoder decodes the traffic information in the TPEG format and provides to the controller 407" various type of information that include the light signal information included in the traffic information.

The directions-suggestion information includes not only the map data, but also various types of information relating to driving, such as traffic lane information, speed limit information, turn-by-turn information, traffic safety information, traffic condition information, vehicle information, path-finding information, and the like.

The signal that is received through the GPS module 401" may be configured in such a manner as to provide the position information on the terminal to the vehicle control apparatus 400" using wireless communication methods proposed by the Institute of Electrical and Electronics Engineers (IEEE), such as IEEE 802.11, IEEE 802.15, IEEE 802.16, and IEEE 802.20. IEEE 802.11 is a set of standard specifications for wireless networks, such as wireless LAN and wireless LAN including one portion of Infrared Communication and so on. IEEE 802.15 is a set of standard specifications for wireless Personal Area Network (PAN) including Bluetooth, UWB, ZigBee, and so on. IEEE 802.16 is a set of standard specifications for wireless Metropolitan Area Network (MAN) (Broadband Wireless Access (BWA)) including Fixed Wireless Access (FWA) and so on. IEEE 802.20 is a set of mobile Internet standard specifications for wireless MAN (Mobile Broadband Wireless Access (MBWA)).

The vehicle control apparatus 400" may be configured to further include an input unit. The input unit is used when the user selects a function that is wanted by the user or inputs information. Various devices, such as a keypad, a touch screen, a jog shuttle, and a microphone, are used as the input unit.

The map matching unit 403" generates the vehicle estimation position, based on the first vehicle position data and the second vehicle position data, and reads the map data corresponding to the driving path from the storage unit 404".

The map matching unit 403" matches the vehicle estimation position with a link (road) included in the map data and outputs the matching-caused map information (the result of map matching) to the controller 407". For example, the map matching unit 403" generates the vehicle estimation position, based on the first vehicle position data and the second vehicle position data. The map matching unit 403" matches the generated vehicle estimation position with the links within the map data stored in the storage unit 404", in the linking order, and outputs the matching-caused map information (the result of map matching) to the controller 407". The map matching unit 403" may output information on characteristics of roads, included in the matching-caused map information (the result of map matching), such as one-story road and multi-story road, to the controller 407". In addition, a function of the map matching unit 403" may be realized in the controller 407".

The map data is stored in the storage unit 404". At this point, the map data being stored is included to include geographic coordinates (or latitude and longitude coordinates) indicating latitude and longitude in a unit of degree-minute-second (in a DMS unit). At this point, in addition to the geographic coordinates, the map data being stored may include Universal Transverse Mercator (UTM) coordinates, Universal Polar System (UPS) coordinates, and Transverse Mercator (TM) coordinates.

Various types of information, such as various types of menu screens, points of interest (POI) (hereinafter referred to as "POI"), and information on function characteristics according to a specific position on the map data are stored in the storage unit 404".

Various user interfaces (UI) and/or various graphic user interfaces (GUI) are stored in the storage unit 404".

Data, programs, and so on necessary to operate the vehicle navigation apparatus 400 are stored in the storage 404".

Destination information that is input from the user through the input unit is stored in the storage unit 404". At this point, the destination information is on the destination point, or on any one among the destination point and the departure point.

The image information (or directions-suggestion map) included in the direction-suggestion information generated by the controller 407 is displayed on the display unit 405". At this point, the display unit 405 is configured to include the touch sensor (touch screen) and the proximity sensor. In addition, the directions-suggestion information includes not only the map data, but also the various types of information relating to driving, such as the traffic lane information, the speed limit information, the turn-by-turn (TBT) information, the traffic safety information, the traffic condition information, the vehicle information, the path-finding information and the like.

When the image information is displayed, various menu screens and various items of content, such as the directions-suggestion information, are displayed on the display unit 405", using a user interface and/or a graphic user interface that are included in the storage unit 404". At this point, the content that is displayed on the display unit 405" includes the menus screen including various pieces of text or image data (including the map data or various types of information data), a menu screen including icons, a list menus, a combo box, and the like, and the like.

The voice output unit 406" outputs voice info' nation (or a voice message for the directions-suggestion information) included in the directions-suggestion information generated by the controller 407". At this point, the voice output unit 406" may be an amplifier or a speaker.

The controller 407" generates the directions-suggestion information, based on the matching-caused map information, and outputs the generated directions-suggestion information to the display unit 405" and the voice output unit 406". At this point, the directions-suggestion information is displayed on the display unit 405".

The controller 407" receives the real-time traffic information from the information provision center and/or the terminal (vehicle navigation device) mounted in the vehicle in the vicinity and generates the directions-suggestion information.

The controller 407" establishes a connection to a call center through the communication unit 408" and thus makes a telephone call or transmits/receives information between the vehicle control apparatus 400" and the call center. At this point, the communication unit 408" may further include a hand-free module that has a Bluetooth function which uses a short-range wireless communication method.

When a POI search menu is selected by the user, the controller 407" searches for the POI positioned on a path from a current position to the destination point, and displays the resulting POI to the display unit 405". At this point, the controller 407" searches for the POI (a path to the POI does not need to be changed (to be researched for), in which case the POI is positioned to the left or to the right of a driving road) positioned on the path from the current position to the destination point and for the POI (a path to the POI needs to be changed, in which case a predetermined path has to be changed in order to drive by way of the POI in the vicinity) positioned in the vicinity of the path from the current position to the destination point, and displays the resulting POI on the display unit 405".

Figure 8C:
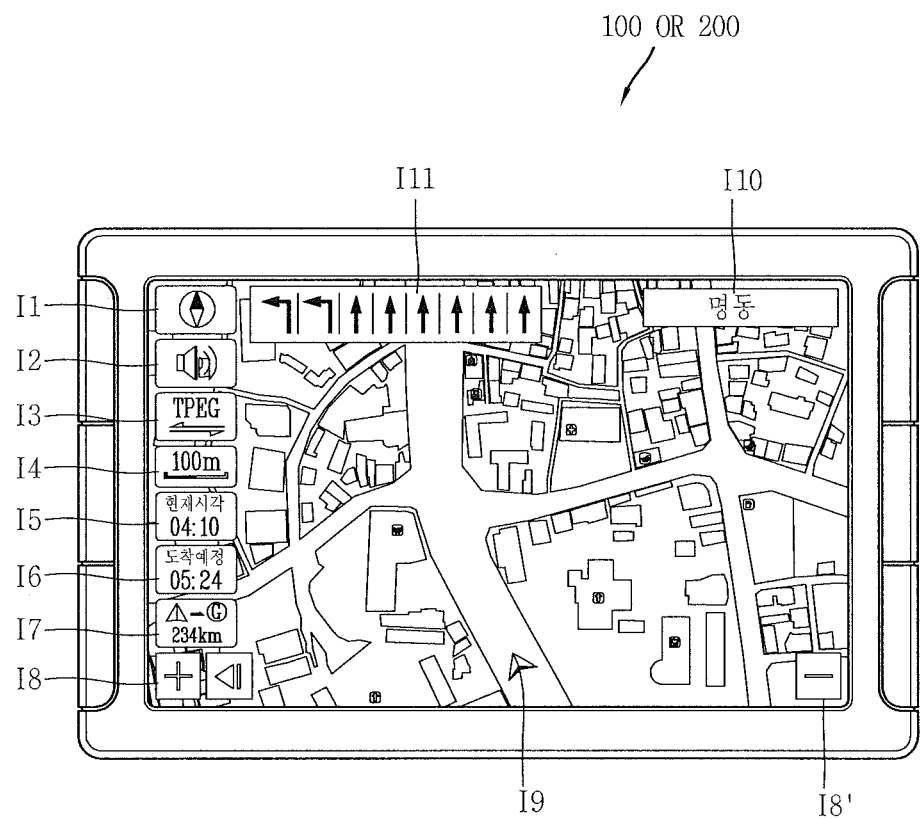
FIG. 8C is an exemplary view illustrating a screen associated with a navigation function according to an embodiment disclosed in the present disclosure.

FIG. 8C is a diagram illustrating a screen associated with a navigation function, disclosed in the present specification, according to one embodiment.

The screen illustrated in FIG. 8C is a screen that is displayed by the mobile terminal 100, the wearable device 200, or the vehicle control apparatus 400.

If the mobile terminal 100 is realized as in the form of a mobile terminal, a smart phone, a laptop computer, a digital broadcast terminal, a personal digital assistant (PDA), a portable multimedia player (PMP), a wearable device, and the like, only one or more among constituent elements illustrated in FIG. 8C may be displayed or none of the constituent elements may be displayed. 다.

As illustrated in FIG. 8C, an icon I1 indicating a compass direction of the map is displayed on one region of the screen on the display unit to which a screen associated with the navigation function is provided. The map is displayed on the display unit to which the screen associated with the navigation function is provided, in such a manner that a specific direction (for example, the true north direction of the Earth), a moving direction of a moving object, a direction of the destination point, and the like are displayed fixed to an upper portion of the screen.

An icon I2 indicating whether or not a sound output module 162 is activated and a volume setting is displayed on one region of the screen on the display unit to which the screen associated with the navigation function is provided. The user can activate or inactivate the sound output module 162 or adjust the volume by applying the touch input to the icon I2.

An icon I3 indicating whether or not a path search function is activated that is in accordance with Transport Portal Experts Group (TPEG) specifications for transmission of traffic information is displayed on one region of the screen on the display unit. Transport Portal Experts Group (TPEG) was found in 1997 by the European Broadcasting Unit for the purpose of establishing protocols for traffic information. In a navigation system, a path suggestion function that uses real time traffic situation information is in accordance with TPEG.

An icon I4 indicating a scale of the map data is displayed on one region of the screen on the display unit.

An icon I5 indicating present time is displayed on one region of the screen in the display unit. In addition, an icon I6 indicating estimated time at which the moving object arrives at a predetermined destination point is displayed on one region of the screen on the display unit. Furthermore, an icon indication estimated time that it takes the moving object to arrive at the predetermined destination point is displayed on one region of the screen on the display unit.

An icon I7 indicating a distance to the predetermined destination point is displayed on one region of the screen on the display unit.

An icon I8 or an icon I8' for increasing or decreasing a size of the displayed map, respectively, is displayed on one region of the screen on the display unit.

An icon I9 indicating a position and a moving direction of the moving object is displayed on one region of the screen on the display unit. The icon I9 may be displayed on a point on the map, which corresponds to the current position of the moving object. In addition, the moving direction of the moving object is displayed as a direction of a sharp point of an arrow in the icon I9, and the like.

An icon I10 indicating a name of a place in which the moving object is located is displayed on one region of the screen on the display unit.

If the vehicle drives down a street, an icon I11 indicating lanes of the street is displayed on one region of the screen on the display unit.

A path to the predetermined destination point I12 (refer to FIG. 8C) is displayed on the display unit. If the destination point of the moving object is not set, the path may not be displayed.

All the functions (for example, including the navigation function) that are performed by the vehicle 400 described above are performed the mobile terminal 100 or the wearable device 200 that is connected to the vehicle control apparatus 400 in a wired or wireless manner.

In addition, the vehicle control apparatus 400 and the mobile terminal 100 performs all the functions in cooperation with each other or in conjunction with each other.

To do this, the mobile terminal 100 or the wearable device 200 is configured to include a constituent element that is the same as, is similar to, and corresponds to that included in the vehicle control apparatus 400.

For example, the acceleration sensor provided in the mobile terminal 100 or the wearable device 200 plays a role of the acceleration sensor included in the vehicle control apparatus 400.

For the cooperation or conjunction between the vehicle control apparatus 400 and the mobile terminal 100, a virtual network computing (VNC) method is applied.

The virtual network computing (VNC) means a graphic desktop sharing system that remotely controls a different computer (or a different terminal) using a RFB protocol in an computer environment.

The VNC transmits keyboard and mouse events or a touch event from one terminal to another, and thus provides a method of updating a graphic screen over the network.

In addition, all the functions that are performed by the vehicle control apparatus 400 described above are shared between the vehicle control apparatus 400 and the mobile terminal 100 or the wearable device 200 and thus are performed.

That is, when it comes to performing a specific function, among all the functions that are performed by the vehicle control apparatus 400 described above, one portion of the specific function is performed by the vehicle control apparatus 400, the other portions of the specific function are performed by the mobile terminal 100 or the wearable device 200.

For example, in a case of the air conditioning function for the vehicle, a setting temperature is input into an air conditioner that is provided within the vehicle, by the mobile terminal 100 or the wearable device 200. The vehicle control apparatus 400 performs control in such a manner that the air conditioner operates to maintain the setting temperature that is input.

It is apparent to a person of ordinary skill in the art that the technology relating to the vehicle control apparatus, disclosed in the present specification, can be realized in a different form within a range that does not deviate from the technological idea disclosed in the present specification.

Hereinafter, the configuration of a watch-type mobile terminal and a function thereof according to embodiments disclosed the present disclosure will be described in more detail with reference to FIGS. 9 through 21.

Description of Mobile Terminal According to Embodiments Disclosed in the Present Disclosure A mobile terminal according to embodiments disclosed in the present disclosure which will be described below may be implemented in part or a combination of the configurations and processes included in the foregoing embodiments, and the redundant description thereof will be below omitted to clearly express a mobile terminal according to embodiments disclosed in the present disclosure.

For example, a mobile terminal according to embodiments disclosed in the present disclosure may be the same as, similar to or correspond to a mobile terminal described with reference to FIGS. 1 through 5A, and redundant description thereof will be omitted to clearly express a mobile terminal according to embodiments disclosed in the present disclosure.

A mobile terminal according to embodiments disclosed in the present disclosure may be a watch-type mobile terminal worn and used on a user's wrist portion, and the mobile terminal may include a communication unit configured to perform communication with a vehicle control apparatus installed in a vehicle, a body worn on the user's wrist portion to always contact with the wrist portion, an output unit provided in the body, and a controller configured to control the output unit to output vehicle information on the vehicle acquired from the vehicle control apparatus to the outside.

According to an embodiment, the output unit may display the vehicle information on a screen and output it in the form of vibration of the body or voice.

Furthermore, according to an embodiment, the mobile terminal may further include a position detection unit configured to detect the position of the mobile terminal.

In this case, the controller may calculate a driving direction for arriving at the destination of the vehicle according to the location of the mobile terminal, and control the output unit to display an arrow indicating the calculated driving direction in a turn-by-turn (TBT) manner on the screen.

Figure 9:
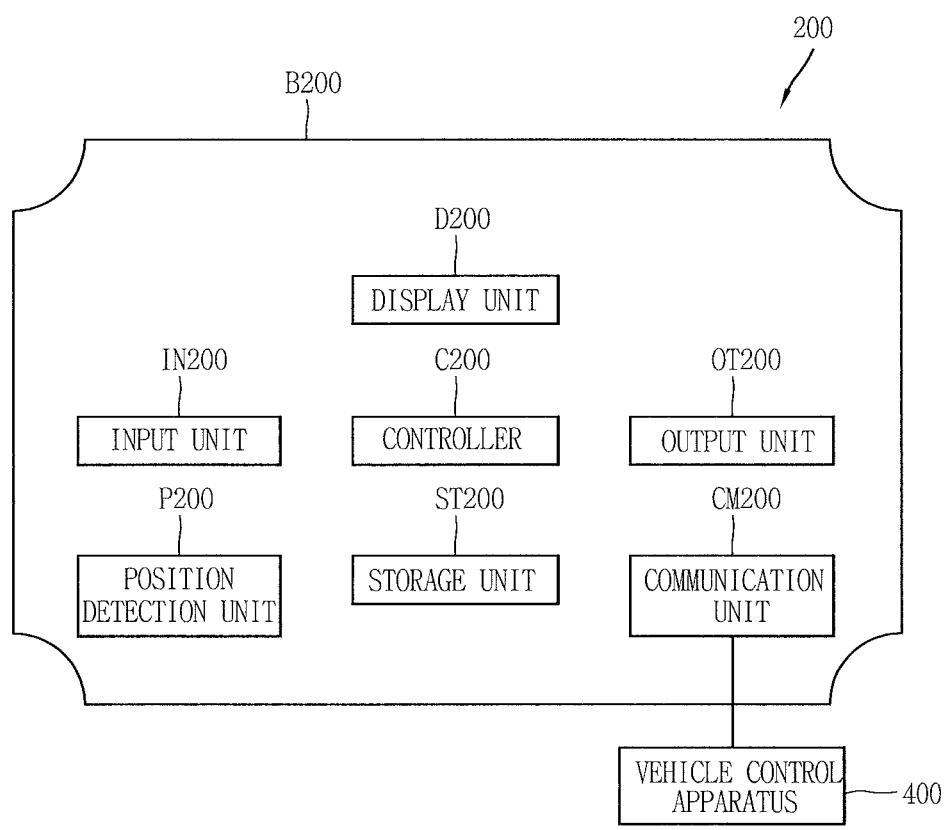
FIG. 9 is a block diagram illustrating the configuration of a watch-type mobile terminal according to embodiments disclosed in the present disclosure.

FIG. 9 is a block diagram illustrating the configuration of a watch-type mobile terminal according to embodiments disclosed in the present disclosure.

A watch-type mobile terminal according to embodiments disclosed in the present disclosure may be a smart watch type mobile terminal worn and used on a user's wrist portion.

Referring to FIG. 9, the mobile terminal 200 according to embodiments disclosed in the present disclosure may include a controller C200, a communication unit CM100, a body B200, and an output unit OT200.

Furthermore, the mobile terminal 200 according to an embodiment may further include an input unit IN200, a position detection unit P200, a display unit D200, and a memory unit ST200 configured to store various information processed by the mobile terminal 200.

In addition, the mobile terminal 200 may further include various constituent elements for implementing the function of a mobile terminal according to embodiments disclosed in the present disclosure.

The constituent elements as illustrated in FIG. 9 are not necessarily required, and the mobile communication terminal 200 may be implemented with greater or less number of elements than those illustrated elements.

Hereinafter, the constituent elements will be described in sequence.

The communication unit CM200 may perform the role of performing communication with a vehicle control apparatus installed in a vehicle. The communication unit CM200 may include an electronic component for at least any one of Bluetooth™, Zigbee, Ultra Wide Band (UWB), Wireless USB, Near Field Communication (NFC), Wireless LAN and a mobile communication network.

According to an embodiment, the communication unit CM200 may acquire vehicle information on the vehicle 500 from the vehicle control apparatus 400.

Here, the vehicle information may be information associated with at least one of an air-conditioning function for the vehicle 500, whether or not a door is open or closed, whether or not a window is open or closed, whether or not a sunroof is open or closed, a battery charging state of the vehicle 500, a parking location of the vehicle 500, a navigation function provided in the vehicle 500, a theft state of the vehicle 500, and a fueling state of the vehicle 500. According to an embodiment, the mobile terminal 200 may further include a position detection unit P200 configured to detect the position of the mobile terminal.

According to an embodiment, the controller C200 calculates a driving direction for arriving at the destination of the vehicle 500 according to the location of the mobile terminal 200, and controls the output unit OT200 to display an arrow indicating the calculated driving direction in a turn-by-turn (TBT) manner on the screen.

In this case, the communication unit CM200 may transmit the destination and the location of the mobile terminal 200 to a previously set vehicle navigation apparatus.

Here, the vehicle navigation apparatus may be the vehicle control apparatus 400.

Furthermore, the vehicle navigation apparatus may be a preset another terminal other than the vehicle control apparatus 400. For example, the vehicle navigation apparatus may be a mobile terminal carried by a passenger who rides in the vehicle 500.

According to an embodiment, the communication unit CM200 may receive vehicle driving information associated with the navigation function from the vehicle control apparatus when a navigation link function is activated.

Here, the vehicle driving information may include information associated with at least one of a destination of the vehicle 500, a stopover on a driving route, a current location of the vehicle 500, a speed of the vehicle 500, and a driving direction of the vehicle 500.

Furthermore, according to an embodiment, the communication unit CM200 may transmit and receive vehicle driving information associated with the navigation function with the vehicle control apparatus 400 based on a preset communication protocol.

Here, the preset communication protocol may be at least one of Bluetooth, Radio Frequency Identification (RFID), Infrared Data Association (IrDA), Ultra Wideband (UWB), ZigBee, Wireless LAN (protocol such as Bluetooth, 802.11n), Wi-Fi, Wireless Broadband (Wibro), World Interoperability for Microwave Access (Wimax), High Speed Downlink Packet Access (HSDPA) and Near Field Communication (NFC).

According to an embodiment, the mobile terminal 200 may include an input unit IN200 configured to receive a user input from the user.

Furthermore, according to an embodiment, the controller C200 may generate a vehicle control signal based on the user input.

In this case, the communication unit CM200 may transmit the vehicle control signal to the vehicle control apparatus 400.

The body B200 may include constituent elements included in the body B200 therein or on a surface thereof to support the constituent elements to determine as well as maintain the form of the body B200, thereby performing the role of protecting it from external shock.

According to an embodiment, the body B200 may be formed to be worn on the user's wrist portion.

Furthermore, the body B200 may be formed to always contact with the wrist portion.

The output unit OT200 may be provided in the body, and perform the role of outputting information or results processed by the body B200 to the outside.

According to an embodiment, the output unit OT200 may perform the role of displaying the vehicle information on the screen or outputting it to the outside in the form of vibration of the body or voice.

Furthermore, according to an embodiment, the output unit OT200 may display an arrow indicating the driving direction calculated in real time by the controller C200 in a turn-by-turn (TBT) manner on the screen.

To this end, the output unit OT200 may include the display unit D200.

Furthermore, according to an embodiment, the output unit OT200 may display additional information associated with at least one of the destination, a stopover on a driving route from the location of the mobile terminal to the destination, a distance from the location of the mobile terminal to the destination, a total required time, a remaining required time, and an arrival time, along with the arrow on the screen.

Furthermore, according to an embodiment, when a navigation link function is activated, the output unit OT200 may display an arrow indicating a driving direction of the vehicle in a turn-by-turn (TBT) manner on the screen based on vehicle driving information associated with the navigation function received from the vehicle control apparatus.

According to an embodiment, when the user gets off the vehicle prior to arriving at the destination of the vehicle, a pedestrian mode may be activated.

When the pedestrian mode is activated, the output unit OT200 may output a walking direction to the destination of the vehicle.

Furthermore, the output unit OT200 may display an arrow indicating the walking direction in a turn-by-turn (TBT) manner on the screen.

According to an embodiment, the output unit OT200 may output a preset notification signal prior to the vehicle 500 arriving at a turn point at which the driving direction of the vehicle 500 should be changed according to an arrow indicating the driving direction.

Here, the preset notification signal may be output in the form of vibration of the body or voice.

According to an embodiment, when the screen display mode is a TBT screen display mode, the output unit OT200 may display a screen in a turn-by-turn (TBT) manner.

Furthermore, when the screen display mode is a MAP screen display mode, the output unit OT200 may display a driving route to the destination of the vehicle and a map around the driving route on the screen.

Furthermore, when the screen display mode is a dual screen display mode, the output unit OT200 may display a screen in the TBT screen display mode and a screen in the MAP screen display mode at the same time.

In this case, when the screen mode change input is received in a state that the previously set screen display mode is a TBT screen display mode, the controller C200 may change the screen display mode to the MAP screen display mode.

Furthermore, when the screen mode change input is received in a state that the previously set screen display mode is a MAP screen display mode, the controller C200 may change the screen display mode to the TBT screen display mode.

According to an embodiment, the output unit OT200 may include a touch screen.

In this case, the screen mode change input may be a user touch input through the touch screen.

According to an embodiment, the output unit OT200 may change the attribute of the arrow according to driving information from a current location of the vehicle 500 to a turn point at which the driving direction of the vehicle 500 should be changed to display it on the screen.

The display unit D200 may display and output information processed in the mobile terminal 200. For example, the display unit D200 may display a User Interface (UI) or a Graphic User Interface (GUI) associated with a function provided by the mobile terminal 200.

As described above, the display unit D200 may be implemented to be included in the output unit OT200.

The display unit D200 may include at least one of a Liquid Crystal Display (LCD), a Thin Film Transistor-Liquid Crystal Display (TFT-LCD), an Organic Light-Emitting Diode (OLED), a flexible display, and a three-dimensional (3D) display.

In addition, the display unit D200 may be implemented in two or more in number according to the implementation form of the mobile terminal 200. For example, an external display (not shown) and an internal display (not shown) may be concurrently provided in the mobile terminal 200.

When the display unit D200 and a touch sensitive sensor (hereinafter, referred to as a "touch sensor") have a layered structure therebetween, the display unit D200 may be used as an input device rather than an output device. For example, the touch sensor may have a form such as a touch film, a touch sheet, a touch pad, and the like.

The position detection unit P200 may perform the role of detecting the position of the mobile terminal 200.

To this end, the position detection unit P200 may include a Global Positioning System (GPS) module (or GPS sensor) or Wireless Fidelity (Wi-Fi) module.

Furthermore, according to an embodiment, the position detection unit P200 may further include a DR sensor.

In this case, when position information obtained from the GPS sensor is inaccurate, the position detection unit P200 may detect a current position of the mobile terminal 200 based on a sensing result from the DR sensor.

Here, "DR" as an abbreviation of "dead reckoning" may denote "deduced reckoning" or "deduced positioning" in Korean.

The dead reckoning technology is a method used by navigators prior to the development of a position tracking technology using GPS, and "dead reckoning", as a generic term of the method of measuring the moving distance and direction of a vessel based on the location of a port to estimate its current position, had been called "deduced reckoning" in early days, but has been designated as "dead reckoning" in recent years since "deduced" had been pronounced as "ded", and then generalized as "dead".

The dead reckoning technology used by navigators has been combined with vehicle navigation in recent years and used to more accurately find a current position in an underground space where GPS satellite radio waves are completely blocked as well as in the building forest with a large distortion and loss of GPS radio waves in assistance to GPS.

To this end, a vehicle DR unit may include a gyro sensor and an acceleration sensor to find a rotational direction of the vehicle, and may be designed to have a vehicle speed sensor so as to track the movement distance.

The controller C200 may perform the role of controlling constituent elements included in the mobile terminal 200 to implement a function carried out by the mobile terminal 200 according to an embodiment disclosed in the present disclosure.

According to an embodiment, the controller C200 may control the output unit OT200 to output vehicle information on the vehicle 500 acquired from the vehicle control apparatus 400.

Furthermore, the controller C200 may calculate a driving direction for arriving at the destination of the vehicle 500 in real time according to the position of the mobile terminal 200.

In this case, the controller C200 may control the output unit OT200 to display an arrow indicating the calculated driving direction in a turn-by-turn (TBT) manner on the screen.

Here, the turn-by-turn navigation may be is a scheme in which only the arrow is displayed on the screen or in which the arrow is displayed in a size larger than that of at least one graphic object when there exists the at least another graphic object for providing a vehicle navigation function.

According to an embodiment, the vehicle control apparatus 400 may perform a navigation function for the vehicle 500.

When a navigation link function is activated, the controller C200 may control the output unit OT200 to display an arrow indicating a driving direction of the vehicle 500 in a turn-by-turn (TBT) manner on the screen based on vehicle driving information associated with the navigation function from the vehicle control apparatus 400 received through the communication unit CM200.

Furthermore, the controller C200 may activate the navigation link function when the execution of the navigation link function for the vehicle 500 is recognized by the vehicle control apparatus 400.

According to an embodiment, the controller C200 may determine whether or not the user gets off the vehicle 500 prior to arriving at the destination of the vehicle 500.

The controller C200 may activate a pedestrian mode to output a walking direction to the destination of the vehicle 500 through the output unit OT200 when the user gets off the vehicle prior to arriving at the destination of the vehicle.

In this case, the output unit OT200 may display an arrow indicating the walking direction in a turn-by-turn (TBT) manner on the screen.

According to an embodiment, the controller C200 may activate the pedestrian mode when it is difficult to move the vehicle from a current position of the vehicle 500 to a destination of the vehicle 500.

Furthermore, the controller C200 may activate the pedestrian mode based on at least one of the user's touch input and voice input.

Furthermore, the controller C200 may activate the pedestrian mode when the mobile terminal 200 is away from the vehicle 500 by more than a predetermined distance.

According to an embodiment, the controller C200 may change the screen display mode to the MAP screen display mode when the screen mode change input is received from the user through the input unit IN200 in a state that the previously set screen display mode is a TBT screen display mode.

Furthermore, the controller C200 may change the screen display mode to the TBT screen display mode when the screen mode change input is received in a state that the previously set screen display mode is a MAP screen display mode.

According to an embodiment, when a screen mode setting input is received from the user through the input unit IN200, the controller C200 may set the screen display mode to any one of the TBT screen display mode, the MAP screen display mode and the dual screen display mode based on the screen mode setting input.

According to an embodiment, the controller C200 may control the output unit OT200 to change the attribute of the arrow according to driving information from a current position of the vehicle 500 to a turn point at which the driving direction of the vehicle 500 should be changed to display it on the screen.

Here, the driving information may include at least one of a remaining distance to the turn point, an entry direction to the turn point of the vehicle 500, and an entry speed to the turn point of the vehicle 500.

Here, the attribute of the arrow may be at least one of a size, a shape, a display angle and a length of the arrow on the screen.

According to an embodiment, the controller C200 may collect pattern information on the user's driving pattern for the vehicle or the user's walking pattern for a predetermined period of time.

In this case, the controller C200 may change a screen display time point of the arrow based on the pattern information.

Here, the driving pattern may include information associated with at least one of a driving speed, a number of sudden acceleration, and a number of sudden braking.

Furthermore, the walking pattern may be information associated with a walking speed.

According to an embodiment, the vehicle control apparatus 400 may perform a navigation function for the vehicle 500.

In this case, as described above, the communication unit CM200 may transmit and receive vehicle driving information associated with the navigation function with the vehicle control apparatus 400 based on a preset communication protocol.

Here, the vehicle driving information comprises information associated with at least one of a destination of the vehicle 500, a stopover on a driving route, a current position of the vehicle 500, a speed of the vehicle 500, and a driving direction of the vehicle 500.

Furthermore, the communication unit CM200 may transmit and receive the vehicle driving information when the destination of the vehicle 500 or stopover on a driving route is set.

Here, the vehicle information may be information associated with at least one of an air-conditioning function for the vehicle 500, whether or not a door is open or closed, whether or not a window is open or closed, whether or not a sunroof is open or closed, a battery charging state of the vehicle 500, a parking position of the vehicle 500, a navigation function provided in the vehicle 500, a theft state of the vehicle 500, and a fueling state of the vehicle 500.

According to an embodiment, the controller C200 may generate a vehicle control signal based on the user input received from the user through the input unit IN200.

In this case, the controller C200 may control the communication unit CM200 to transmit the vehicle control signal to the vehicle control apparatus.

Here, the vehicle control signal may be a control signal for controlling or setting a function associated with at least one of an air conditioning of the vehicle, an opening or closing of a door, an opening or closing of a window, an opening or closing of a sunroof, a battery charging state of the vehicle, a driving of the vehicle, and at least one device provided in the vehicle.

The input unit IN200 may perform the role of receiving an external input (or user input) from the outside (or user) to control the mobile terminal 200.

According to an embodiment, the input unit IN200 may perform the role of receiving the destination of the vehicle 500 to carry out a navigation function.

According to an embodiment, the input unit IN200 may receive the destination of the vehicle 500 based on at least one of a user's touch input and voice input.

Furthermore, the input unit IN200 may receive the screen mode change input from the user.

Furthermore, the input unit IN200 may receive the screen mode setting input from the user.

Furthermore, the input unit IN200 may receive a user input for generating the vehicle control signal.

The input unit IN200 may generate input data for the operation control of the mobile terminal 200.

The input unit IN200 may be configured with a keypad, a dome switch, a touchpad (resistance/capacitance), a jog wheel, a jog switch, and the like. In particular, when the touchpad forms an interlayer structure with the display unit D100, it may be referred to as a touch screen.

According to an embodiment, the input unit IN200 may receive (enter) various user inputs from the user.

For example, the input unit IN200 may set a parameter or environment associated with hardware or software included in the mobile terminal 200 or receive a set input for setting required to allow the mobile terminal 200 to perform a specific function.

According to an embodiment, the input unit IN200 may receive a user input through a user interface provided for the user in the mobile terminal 200. In particular, the user interface may be a graphic user interface (GUI).

The storage unit ST100 may store a program for the processing and control of the controller C200, and perform a function for the temporary storage of input/output data (for example, the user input, control input, setting input, etc.).

For example, the storage unit ST200 may store a current position of the mobile terminal 200 when the user gets on or off the vehicle 500.

The storage unit ST200 may include at least one storage medium, such as a flash memory, a hard disk, a solid state disk or solid state drive (SSD), a multimedia card micro type, a card memory (for example, an SD, a XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Furthermore, the mobile terminal 200 may manage a web storage performing the storage function of the storage unit ST200 on the Internet.

First Embodiment—Route Guidance Function in TBT Manner

A first embodiment disclosed in the present disclosure may be implemented in part or a combination of the configurations and processes included in the foregoing embodiments, and the redundant description thereof will be omitted below to clearly express the first embodiment disclosed in the present disclosure.

In recent years, a mobile terminal may provide a navigation function for providing route guidance to a set destination.

However, there is difficulty in providing walking directions in real time. Furthermore, there is a problem in which the user should always keep his or her eyes on a route guidance providing screen to receive route guidance.

The technology disclosed in the present disclosure relates to a mobile terminal capable of providing a navigation function and a control method thereof.

In particular, the technology disclosed in the present disclosure, as a watch-type mobile terminal worn and used on a user's wrist portion, relates to a mobile terminal capable of providing a navigation function and a control method thereof.

A mobile terminal according to an embodiment of the present disclosure may include an input unit configured to receive a destination, a receiving unit configured to receive a signal for calculating a current position of the mobile terminal, a controller configured to calculate a moving direction for arriving at the destination in real time according to the current position of the mobile terminal, a display unit configured to display an arrow indicating the calculated moving direction, and a communication unit configured to transmit the destination and the current position of the mobile terminal to a previously set vehicle navigation apparatus, wherein the vehicle navigation apparatus can guide a path to the destination using the current position of the mobile terminal as a departure.

More specifically, a mobile terminal according to an embodiment disclosed in the present disclosure may be a watch-type mobile terminal worn and used on a user's wrist portion, and the mobile terminal may include a communication unit configured to perform communication with a vehicle control apparatus installed in a vehicle, a body worn on the user's wrist portion to always contact with the wrist portion, an output unit provided in the body, and a controller configured to control the output unit to output vehicle information on the vehicle acquired from the vehicle control apparatus to the outside.

In this case, the output unit may display the vehicle information on a screen and output it in the form of vibration of the body or voice.

Furthermore, according to an embodiment, the mobile terminal may further include a position detection unit configured to detect the position of the mobile terminal.

In this case, the controller may calculate a driving direction for arriving at the destination of the vehicle according to the location of the mobile terminal, and control the output unit to display an arrow indicating the calculated driving direction in a turn-by-turn (TBT) manner on the screen.

Furthermore, according to an embodiment, the communication unit may transmit the destination and the position of the mobile terminal to a previously set vehicle navigation apparatus (or vehicle control apparatus).

Here, the turn-by-turn navigation may be a scheme in which only the arrow is displayed on the screen or in which the arrow is displayed in a size larger than that of at least one graphic object when there exists the at least another graphic object for providing a vehicle navigation function.

Furthermore, according to an embodiment, the display unit or output unit may display additional information associated with at least one of the destination, a stopover on a driving route from the position of the mobile terminal to the destination, a distance from the position of the mobile terminal to the destination, a total required time, a remaining required time, and an arrival time, along with the arrow on the screen.

Figure 10:
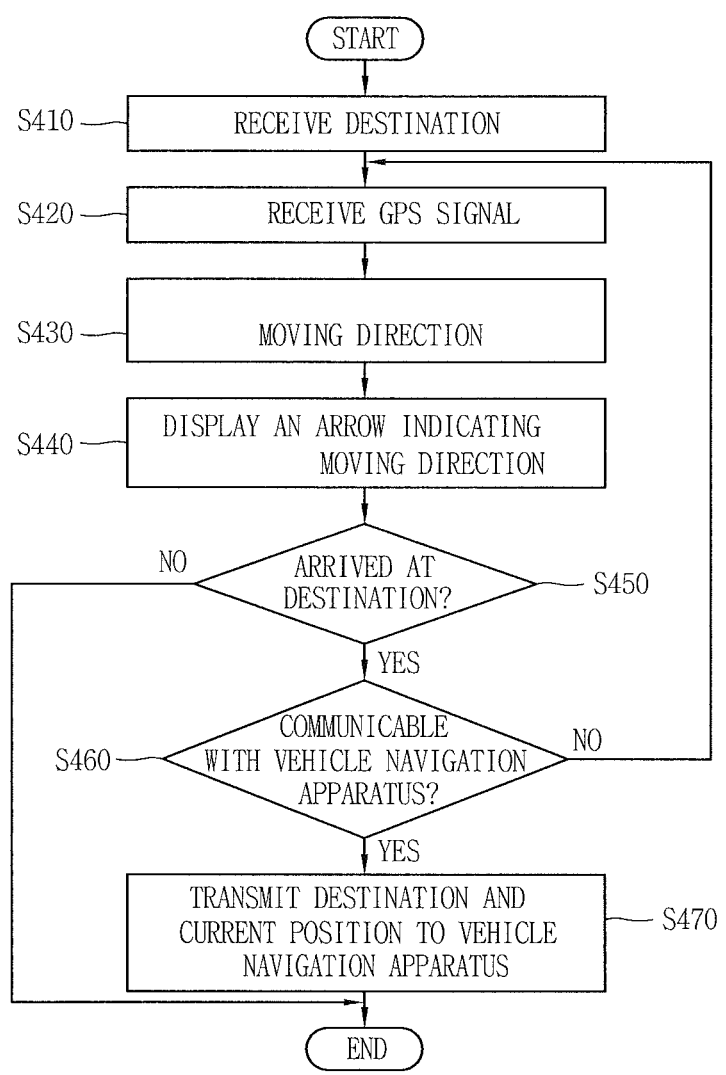
FIG. 10 is a flow chart for explaining the operation of a mobile terminal according to a first embodiment disclosed in the present disclosure.

FIG. 10 is a flow chart for explaining the operation of a mobile terminal according to a first embodiment disclosed in the present disclosure.

The watch-type mobile terminal 200 for providing a navigation function may include an input unit 130, a receiving unit 115, a controller 180, a display unit 151, and a communication unit 110.

Here, the input unit 130 may be the same as, similar to or correspond to the input unit IN200 illustrated in FIG. 9, the receiving unit 115 to the position detection unit P200 illustrated in FIG. 9, the controller 180 to the controller C200 illustrated in FIG. 9, the display unit 151 to the display unit D100 or output unit OT200 illustrated in FIG. 9, the communication unit 110 to the communication unit CM200 illustrated in FIG. 9.

Referring to FIG. 10, first, the process (S410) of receiving a destination from the outside through the input unit 130 is carried out.

According to an embodiment, the user may enter a destination desired to receive route guidance through a keypad or touchpad. According to another embodiment, the user may enter a destination using a voice signal through the microphone 122.

Next, the process (S420) of receiving a signal for calculating a current position of the mobile terminal 200 through the receiving unit 115 is carried out.

As illustrated above in FIG. 2, the receiving unit 115 may receive a GPS signal for calculating a current position of the mobile terminal 200 from a GPS satellite 300.

Subsequently, the process (S430) of calculating a current position of the mobile terminal 200, and calculating a moving direction for arriving at the destination in real time according to the calculated current position of the mobile terminal 200 is carried out.

In other words, the controller 180 may calculate a moving direction for arriving at the destination of the vehicle 500 in real time according to the position of the mobile terminal 200.

Then, the process (S440) of displaying an arrow indicating the calculated moving direction on the display unit 151 is carried out. The detailed description thereof will be described later.

In this case, the display unit 151 may display an arrow indicating the calculated moving direction in a turn-by-turn (TBT) manner on the screen.

Here, the turn-by-turn navigation may be a scheme in which only the arrow is displayed on the screen or in which the arrow is displayed in a size larger than that of at least one graphic object when there exists the at least another graphic object for providing a vehicle navigation function.

In other words, according to an embodiment, the display unit 151 may display additional information associated with at least one of the destination, a stopover on a driving route from the position of the mobile terminal 200 to the destination, a distance from the position of the mobile terminal 200 to the destination, a total required time, a remaining required time, and an arrival time, along with the arrow on the screen.

Figure 11A:
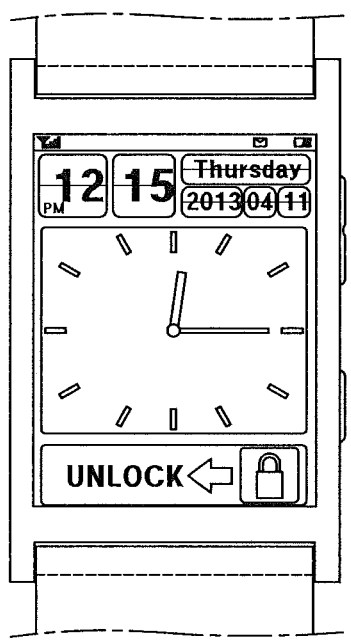
FIGS. 11A and 11B are conceptual views illustrating an embodiment for implementing a mobile terminal 200 according to an embodiment disclosed in the present disclosure.
Figure 11B:
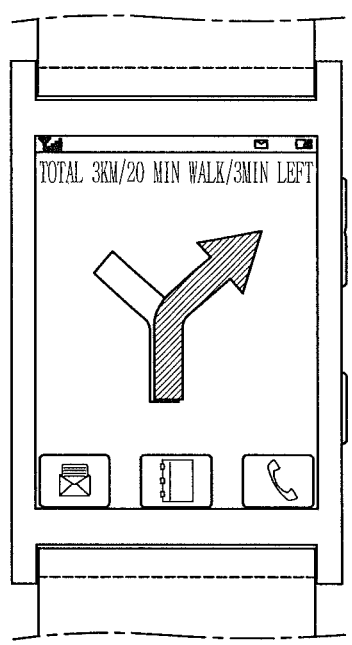

For example, referring to FIG. 11B, the display unit 151 may display "total 3 km" which is a distance from the position of the mobile terminal 200 to the destination, "20 minutes walk"which is a total required time, and "3 minutes remaining" which is a remaining required time along with the arrow on the screen.

Then, the process (S450) of determining whether or not the current position of the mobile terminal 200 corresponds to the destination, namely, whether or not the vehicle has arrived at the destination, is carried out to terminate route guidance when the vehicle has arrived at the destination.

The process (S460) of determining whether or not the vehicle is able to communicate with a previously set vehicle navigation apparatus (or vehicle control apparatus) prior to arriving at the destination is carried out.

As a result, when any vehicle navigation apparatus capable of communication is not retrieved, it returns to the process (S420) of receiving a GPS signal again.

On the contrary, when any vehicle navigation apparatus capable of communication is retrieved, the process (S470) of transmitting the current position of the mobile terminal 200 to the vehicle navigation apparatus is carried out.

In other words, the communication unit 110 may transmit the destination and the position of the mobile terminal 200 to a previously set vehicle navigation apparatus of vehicle control apparatus.

During the process (S470), it may be possible to transmit and receive data using a previously set protocol (or preset communication protocol) to the vehicle navigation apparatus. The vehicle navigation apparatus that has received the data perform route guidance to the destination. In other words, route guidance that has been carried out in the mobile terminal 200 is subsequently carried out in the vehicle navigation apparatus.

Specifically, the vehicle navigation apparatus or the vehicle control apparatus may perform a navigation function for the vehicle.

In this case, the communication unit 110 may transmit and receive vehicle driving information associated with the navigation function with the vehicle control apparatus based on a preset communication protocol.

Here, the preset communication protocol may be at least one of Bluetooth, Radio Frequency Identification (RFID), Infrared Data Association (IrDA), Ultra Wideband (UWB), ZigBee, Wireless LAN (protocol such as Bluetooth, 802.11n), Wi-Fi, Wireless Broadband (Wibro), World Interoperability for Microwave Access (Wimax), High Speed Downlink Packet Access (HSDPA) and Near Field Communication (NFC).

According to an embodiment, the vehicle driving information may include information associated with at least one of a destination of the vehicle, a stopover on a driving route, a current position of the vehicle, a speed of the vehicle, and a driving direction of the vehicle.

The communication unit 110 may transmit and receive the vehicle driving information when the destination of the vehicle or stopover on a driving route is set.

On the other hand, FIG. 10 is a flow chart for explaining a route guidance process, but a control method of a mobile terminal according to the present disclosure may not be necessarily limited to the above flow.

Specifically, the process (S420) of receiving a GPS signal and the process (S430) of calculating the current position and moving direction of the mobile terminal 100 may be sequentially carried out in real time or carried out for each previously set period of time.

On the other hand, the mobile terminal 200 according to an embodiment disclosed in the present disclosure may be implemented as a wearable device. For example, the mobile terminal 200 may be implemented in the form of a wearable bracelet and necklace.

FIGS. 11A and 11B are conceptual views illustrating an embodiment for implementing the mobile terminal 200 according to an embodiment disclosed in the present disclosure.

According to an embodiment, the input unit 130 may receive a screen mode change input from the user.

The display unit 151 may displays a screen in the turn-by-turn manner when the screen display mode is a TBT screen display mode.

Furthermore, the display unit 151 may display a driving route to the destination of the vehicle and a map around the driving route on the screen when the screen display mode is a MAP screen display mode.

Furthermore, the display unit 151 may display a screen in the TBT screen display mode and a screen in the MAP screen display mode at the same time when the screen display mode is a dual screen display mode.

In this case, the controller 180 may change the screen display mode to the MAP screen display mode when the screen mode change input is received in a state that the previously set screen display mode is a TBT screen display mode.

Furthermore, the controller 180 may change the screen display mode to the TBT screen display mode when the screen mode change input is received in a state that the previously set screen display mode is a MAP screen display mode.

Furthermore, the input unit 130 may receive a screen mode setting input from the user.

In this case, the controller 180 may set the screen display mode to any one of the TBT screen display mode, the MAP screen display mode and the dual screen display mode based on the screen mode setting input.

According to an embodiment, the display unit 151 may include a touch screen, and the screen mode change input may be a user touch input through the touch screen.

Referring to FIG. 11A, the mobile terminal 200 may be implemented in the form of a wrist watch (wearable watch).

For example, the users may carry the mobile terminal 200 worn on his or her wrist. Furthermore, the user may normally check time or transmit and receive a call or message through the mobile terminal 200 (prior to being changed to a navigation mode).

At this time, the user may change the mobile terminal 200 to a navigation mode (for example, a TBT screen display mode or MAP screen display mode).

FIG. 11B illustrates a case where the navigation mode is the TBT screen display mode.

According to a specific embodiment, a flicking input or the user touch input may be applied to the display unit 151 to release screen lock, and then a touch is made to a specific button to change it to a navigation mode. Otherwise, the destination may be entered as a voice signal to change it to a navigation mode.

Referring to FIG. 11B, it may be seen that the mobile terminal 200 has been changed to a navigation mode.

Specifically, an arrow indicating a moving direction for arriving at the destination based on a current position of the mobile terminal 200 may be displayed. In FIG. 11B, it may be seen that the vehicle should move to the right between movable routes to the left and the right from the current position.

Furthermore, additional information such as a distance and a required time from the position of the mobile terminal 200 to the destination at a time point of starting route guidance, a required time from a current position of the mobile terminal 200 to the destination, and the like may be displayed at the same time.

In FIG. 11B, it may be seen that a distance from the departure to the destination is 3 km, and it takes 20 minutes by walk, and the vehicle arrives at the destination after 3 minutes from the current position.

On the other hand, as described above, the mobile terminal 200 may perform route guidance in a turn-by-turn (TBT) manner that outputs an arrow indicating a moving direction.

FIGS. 12A through 12D are conceptual views illustrating an embodiment of an arrow indicating a moving direction.

Figure 12A:
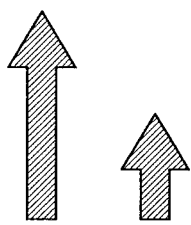
FIGS. 12A through 12D are conceptual views illustrating an embodiment of an arrow indicating a moving direction.

FIG. 12A is a conceptual view illustrating an embodiment of an arrow indicating a straight direction.

Referring to FIG. 12, the length of an arrow may be variably displayed according to the extent of a distance that should go straight ahead. For example, an arrow indicating a relatively long distance may be displayed in a lengthier manner.

Figure 12B:
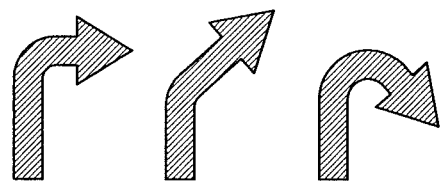
Figure 12C:
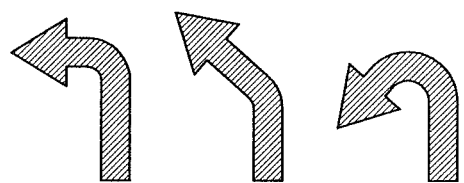

FIGS. 12B and 12C are conceptual views illustrating an embodiment of an arrow indicating a left and a right turn.

Referring to FIGS. 12B and 12C, the angle at which the arrow is bent may be displayed in a relatively variable manner according to the extent of a left or right turn.

Figure 12D:
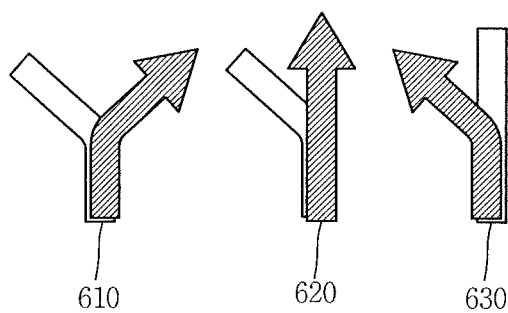

Referring to FIG. 12D, it may be possible to display an arrow indicating a plurality of movable routes and moving directions.

Specifically, in case of 610, it may be seen that a right turn should be made through an arrow in a right direction among the left and right movable routes. Similarly, it may be seen that the vehicle should go straight ahead at a turn point in case of 620, and make a left turn at the turn point in case of 630.

With the output scheme, the user may intuitively find the moving direction or the extent of a distance to the destination.

Furthermore, a previously set signal may be output to notify the user the moving direction. Specifically, the signal may include may include a voice signal, a vibration signal and other audio signals, and the signal output scheme may be set by the user. Furthermore, the signal may be displayed along with the arrow.

According to an embodiment, when going straight ahead, a beep sound may be output for a predetermined period of time or a vibration lasting for a predetermined period of time may be output. Otherwise, a voice signal of "go straight ahead" may be output. Each output scheme may be selected in whole or in part, and concurrently or sequentially output, and may be also output along with an arrow in FIG. 12A.

According to another embodiment, when making a right turn, beep sound or vibration may be output twice. Otherwise, a voice signal of "make a turn right" may be output. Each output scheme may be selected in whole or in part, and concurrently or sequentially output, and may be also output along with an arrow in FIG. 12B.

According to still another embodiment, when making a left turn, beep sound or vibration may be output once. Otherwise, a voice signal of "make a turn left" may be output. Each output scheme may be selected in whole or in part, and concurrently or sequentially output, and may be also output along with an arrow in FIG. 12C.

Furthermore, a time point at which the signal or arrow is output may be set in various ways.

Specifically, when the moving direction for arriving at the destination varies according to a current position of the mobile terminal 200, a signal or arrow indicating the changed moving direction may be output.

For example, when passing through an intersection while moving to the destination, the foregoing signal or arrow may be output at 10 meters in advance prior to arriving at the turn point. Otherwise, it may be output for a previously set period or upon a user's request.

According to still another embodiment, when out of the path by more than a predetermined distance in consideration of GPS errors at low speed, the closest direction for returning to the path from the current position may be output. To this end, a technology for matching to a road with no error even when there is a GPS error may be used.

The intersection may denote a turn point at which the driving direction of the vehicle should be changed according to an arrow indicating the driving direction of the vehicle.

As an embodiment associated with the turn point, the display unit 151 may display a preset notification signal prior to the vehicle 500 arriving at the turn point.

Here, the preset notification signal may be output in the form of vibration of the body or voice.

As an embodiment associated with the turn point, the controller 180 may change the attribute of the arrow according to driving information from a current position of the vehicle to a turn point at which the driving direction of the vehicle should be changed to display it on the screen.

Here, the driving information may include at least one of a remaining distance to the turn point, an entry direction to the turn point of the vehicle, and an entry speed to the turn point of the vehicle.

The attribute of the arrow may be at least one of a size, a shape, a display angle and a length of the arrow on the screen (refer to FIGS. 12A through 12D).

As an embodiment associated with an arrow display scheme in a TBT manner, the controller 180 may collect pattern information on the user's driving pattern for the vehicle or the user's walking pattern for a predetermined period of time.

Furthermore, the controller 180 may change a screen display time point of the arrow based on the pattern information.

Here, the driving pattern may include information associated with at least one of a driving speed, a number of sudden acceleration, and a number of sudden braking.

Furthermore, the walking pattern may be information associated with a walking speed.

Figure 13A:
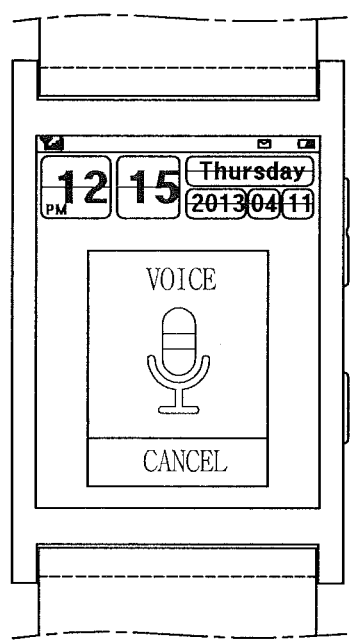
FIGS. 13A through 13C are conceptual views illustrating an embodiment of a user interface associated with destination setting.
Figure 13B:
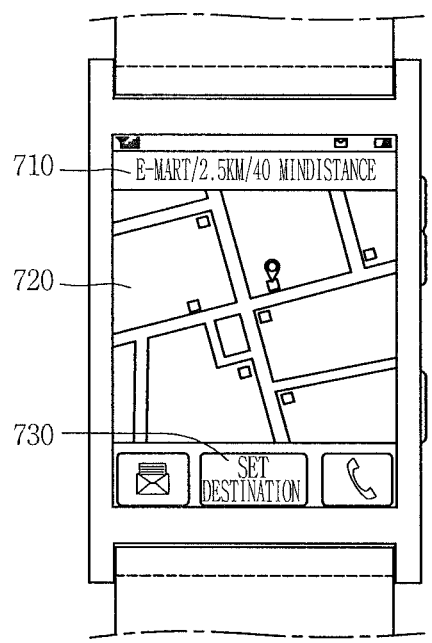
Figure 13C:
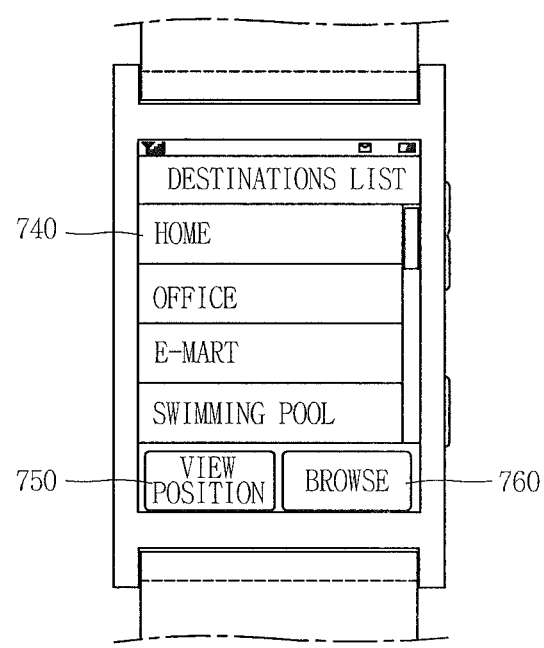

FIGS. 13A through 13C are conceptual views illustrating an embodiment of a user interface associated with destination setting.

Referring to FIG. 13A, the user may enter a destination or stopover using voice. For example, the user may input "E-mart" with his or her voice.

Referring to FIG. 13B, the input voice in FIG. 13A may be recognized to display information 710 such as a distance, a required time to E-mart, or the like, and a map 720. Furthermore, the user may touch the destination setting 730 to set E-mart on the output map 720 as a destination.

According to an embodiment, the user may enter "recent destinations" to receive a destinations list and select a destination from the list.

Referring to FIG. 13C, when the user input "recent destinations" with his or her voice, a recently retrieved destinations list 740 may be displayed.

Accordingly, subsequent to selecting a destination, the user may touch "view position" 750 to check the position of the selected destination. Otherwise, the user may touch "browse" 760 to start route guidance to the selected destination.

According to another embodiment, the user may input recent searches, previous departures, favorite places, or the like with his or her voice to receive a destinations list.

At this time, API capable of setting a destination or stopover may be provided. For example, a query with <slot><destination> or the like may be sent to check the result. For another example, <nearby><convenience store> may be recognized as a request for searching a nearby convenience store.

Furthermore, API with route information may be provided. Accordingly, when a route is requested, a query/request can be made to receive route information including each waypoint from the departure to the destination. To this end, associated information may be received from a map developer.

On the other hand, while guiding a route to a set destination, the destination can be changed with a method as described above. In particular, it can be usefully used during the process of route guidance by the vehicle navigation apparatus. The detailed description thereof will be described later.

Figure 14:
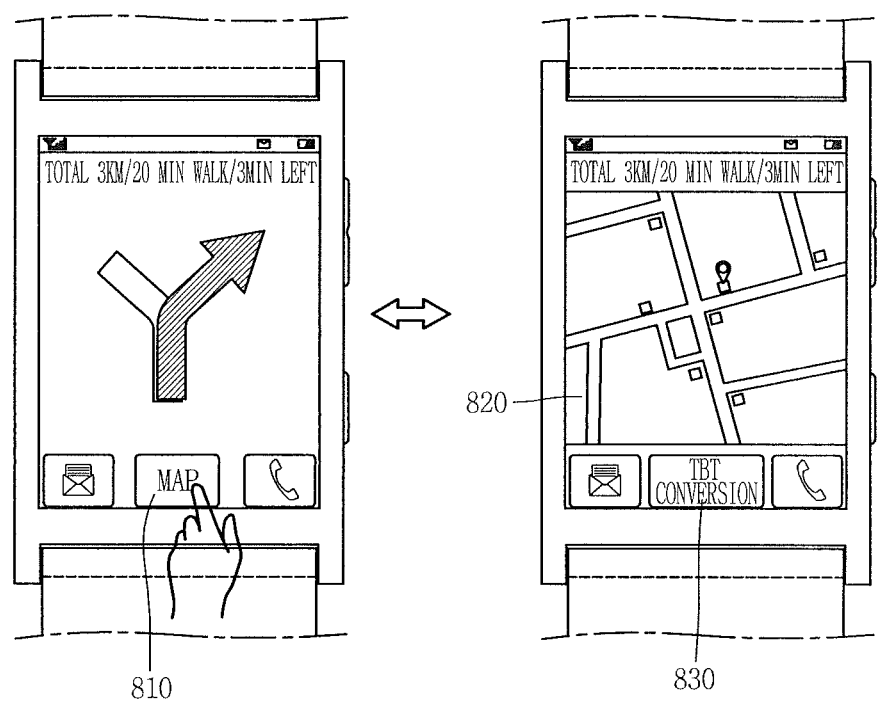
FIG. 14 is a conceptual view illustrating an embodiment of a user interface associated with a route guidance method.

FIG. 14 is a conceptual view illustrating an embodiment of a user interface associated with a route guidance method.

Referring to the left drawing of FIG. 14, as described above, route guidance to the destination may be carried out in a TBT manner using an arrow. At this time, a map indicating the current position and destination may be changed to a screen that displays a map.

The screen display mode displayed in the TBT manner may be the foregoing TBT screen display mode.

Referring to the right drawing of FIG. 14, when the user touches "map" 810 on the left drawing of FIG. 14, a map 820 indicating the current position and destination is displayed. Furthermore, the user may touch "TBT conversion" 830 to return to a state in the left drawing of FIG. 14.

The touch to "MAP" 810 may denote the foregoing screen mode change input.

Furthermore, a screen display mode corresponding to the right drawing of FIG. 14 may denote the foregoing MAP screen display mode.

According to an embodiment, the map 820 indicating the current position and destination and an arrow indicating the moving direction may be displayed at the same time.

According to an embodiment associated with a navigation link function between the vehicle navigation apparatus or the vehicle control apparatus and the mobile terminal, the vehicle navigation apparatus or the vehicle control apparatus may perform a navigation function for the vehicle, and the communication unit 110 may receive vehicle driving information associated with the navigation function from the vehicle control apparatus when a navigation link function is activated.

In this case, the controller 180 may control the display unit 151 to display an arrow indicating a driving direction of the vehicle in a turn-by-turn (TBT) manner on the screen based on the received vehicle driving information.

Here, the vehicle driving information may include information associated with at least one of a destination of the vehicle, a stopover on a driving route, a current position of the vehicle, a speed of the vehicle, and a driving direction of the vehicle.

According to an embodiment, the controller 180 may activate a navigation link function when the execution of the navigation link function for the vehicle is recognized by the vehicle control apparatus.

Figure 15:
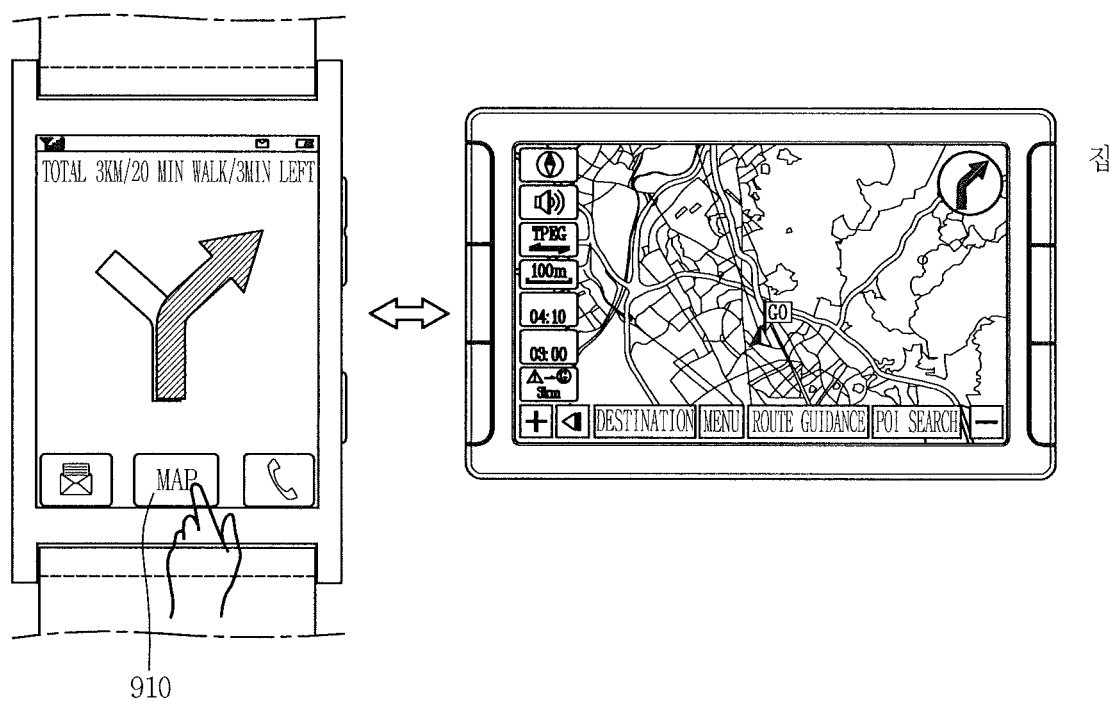
FIG. 15 is a conceptual view illustrating an embodiment linked with vehicle navigation.

FIG. 15 is a conceptual view illustrating an embodiment linked with vehicle navigation.

Referring to FIG. 15, the mobile terminal 200 according to an embodiment disclosed in the present disclosure may be liked with a previously set vehicle navigation apparatus (or vehicle control apparatus 400). At this time, data can be transmitted and received using a previously set protocol.

Specifically, when a previously set vehicle navigation apparatus is recognized while receiving route guidance using the mobile terminal 200, route guidance that has been carried out in the mobile terminal 200 is carried out in the vehicle navigation apparatus. In other words, the foregoing navigation link function may be activated. To this end, the vehicle navigation apparatus should be close to the mobile terminal 200 by a predetermined distance.

Otherwise, when the execution of a navigation function of the vehicle is recognized by the vehicle control apparatus, the navigation link function may be activated.

Furthermore, when getting off the vehicle prior to arriving at the destination, route guidance that has been carried out through the vehicle navigation apparatus is carried out through the mobile terminal 200 (activation of a pedestrian mode).

To this end, the mobile terminal 200 and vehicle navigation apparatus should recognize each other in close proximity. Otherwise, it may be changed through a change button 910 or change voice recognition command.

Hereinafter, an embodiment associated with the pedestrian mode will be described in more detail with reference to FIGS. 16A through 16C.

Figure 16A:
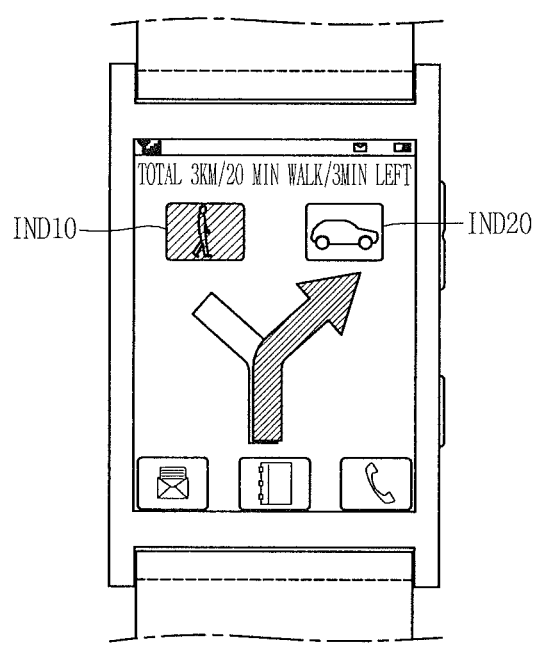
FIGS. 16A through 16C are views illustrating a mobile terminal for providing a pedestrian mode according to an embodiment disclosed in the present disclosure.
Figure 16B:
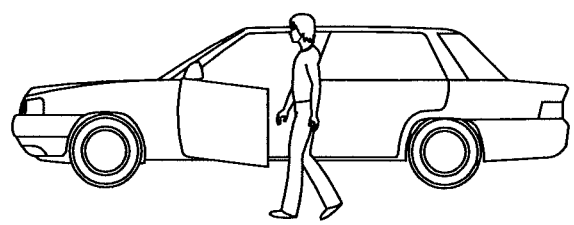
Figure 16C:
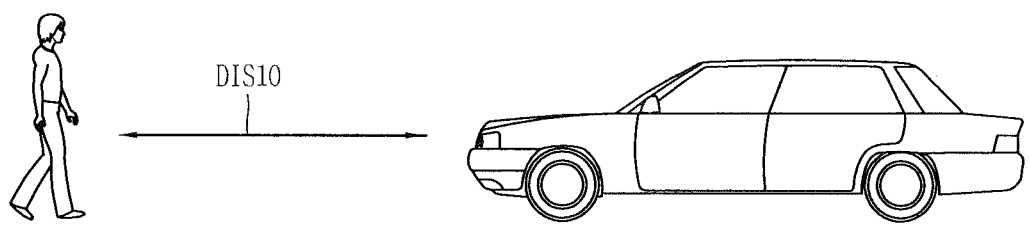

FIGS. 16A through 16C are views illustrating a mobile terminal for providing a pedestrian mode according to an embodiment disclosed in the present disclosure.

Referring to FIG. 16A, when the pedestrian mode IND10 is activated, the controller 180 may output a walking direction to the destination of the vehicle through the display unit 151.

In this case, the display unit 151 may display an arrow indicating the walking direction in a turn-by-turn (TBT) manner on the screen (refer to FIG. 16A).

According to an embodiment, the pedestrian mode may be automatically activated by the mobile terminal 200.

The automatic activation method or scheme of the pedestrian mode may be carried out in various criteria.

Referring to FIG. 16B, the controller 180 may determine whether or not the user gets off the vehicle prior to arriving at the destination of the vehicle.

Furthermore, the controller 180 may activate a pedestrian mode to output a walking direction to the destination of the vehicle through the output unit when the user gets off the vehicle prior to arriving at the destination of the vehicle.

According to another embodiment, the controller 180 may activate the pedestrian mode when it is difficult to move the vehicle from a current position of the vehicle to a destination of the vehicle.

In this case, the controller 180 may determine whether or not it is difficult to move the vehicle from a current position of the vehicle to a destination of the vehicle through the vehicle driving information including vehicle driving route information.

According to still another embodiment, the controller 180 may activate the pedestrian mode based on the user's voice input (a change through the foregoing change button 910 or change voice recognition command).

Referring to FIG. 16C, the controller 180 may activate the pedestrian mode when the mobile terminal is away from the vehicle by more than a predetermined distance (DIS10).

As described above, the mobile terminal 200 and vehicle navigation apparatus may transmit and receive data using a previously set protocol.

As a result, it is not required for the user to newly input a destination to the vehicle navigation apparatus when changing a destination while driving the vehicle. At this time, the microphone 122 of the mobile terminal 200 other than the vehicle microphone may be used, thereby increasing the accuracy of voice recognition.

According to an additional embodiment in which the mobile terminal 200 according to the present disclosure can be used, security may be enhanced using a smart key of the vehicle.

Otherwise, a wearer's body information of the mobile terminal 200 may be used.

The body information may be the user's bio-information.

The bio-information may be acquired from the user's specific body portion (for example, a wrist portion in case of the watch-type mobile terminal).

Here, the bio-information is at least one of information on a heart rate, a body fat, a blood pressure, a blood sugar, a facial shape, a fingerprint, a brain wave, and an iris for the user.

For example, the mobile terminal 200 may obtain a wearer's physical condition such as a hear rate or the like, and make an emergency call or change the destination to a hospital when the abnormality of the wearer's body is sensed.

Second Embodiment—Mobile Terminal for Outputting Vehicle Information

A second embodiment disclosed in the present disclosure may be implemented in part or a combination of the configurations and processes included in the foregoing embodiments, and the redundant description thereof will be omitted below to clearly express the second embodiment disclosed in the present disclosure.

A mobile terminal according to a second embodiment disclosed in the present disclosure may be a watch-type mobile terminal worn and used on a user's wrist portion, and the mobile terminal may include a communication unit configured to perform communication with a vehicle control apparatus installed in a vehicle, a body worn on the user's wrist portion to always contact with the wrist portion, an output unit provided in the body, and a controller configured to control the output unit to output vehicle information on the vehicle acquired from the vehicle control apparatus to the outside.

In this case, the output unit may display the vehicle information on a screen and output it in the form of vibration of the body or voice.

For example, the output unit may output the vehicle information to the user's wrist portion.

Furthermore, according to a second embodiment, the mobile terminal may further include a position detection unit configured to detect the position of the mobile terminal.

In this case, the controller may calculate a driving direction for arriving at the destination of the vehicle according to the location of the mobile terminal, and control the output unit to display an arrow indicating the calculated driving direction in a turn-by-turn (TBT) manner on the screen.

Here, the vehicle information may be information associated with at least one of an air-conditioning function for the vehicle, whether or not a door is open or closed, whether or not a window is open or closed, whether or not a sunroof is open or closed, a battery charging state of the vehicle, a parking position of the vehicle, a navigation function provided in the vehicle, a theft state of the vehicle, and a fueling state of the vehicle.

According to a second embodiment, the controller may generate an alarm signal indicating that the state of the vehicle is abnormal based on the vehicle information, and the output unit may output the alarm signal to the user's wrist portion.

Figure 17:
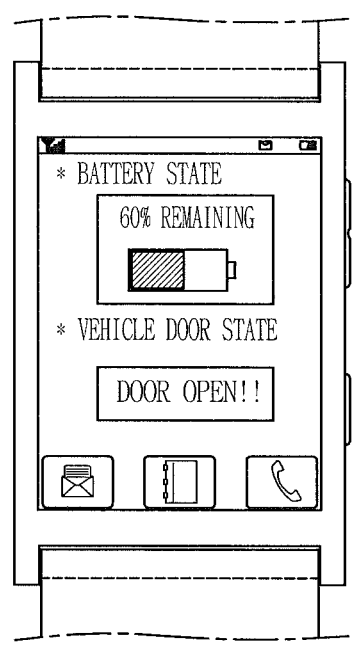
FIG. 17 is an exemplary view illustrating a mobile terminal for outputting vehicle information according to a second embodiment disclosed in the present disclosure.

FIG. 17 is an exemplary view illustrating a mobile terminal for outputting vehicle information according to a second embodiment disclosed in the present disclosure.

Referring to FIG. 17, the mobile terminal 200 may control the output unit OT200 to output vehicle information on the vehicle 500 acquired from the vehicle control apparatus 400 to the outside.

For example, the mobile terminal 200 may display a battery state ("60% remaining") and a vehicle door state ("door open") of the vehicle information on the screen as illustrated in FIG. 17.

Third Embodiment—Control of Vehicle Through Mobile Terminal

A third embodiment disclosed in the present disclosure may be implemented in part or a combination of the configurations and processes included in the foregoing embodiments, and the redundant description thereof will be omitted below to clearly express the third embodiment disclosed in the present disclosure.

A mobile terminal according to a third embodiment disclosed in the present disclosure may be a watch-type mobile terminal worn and used on a user's wrist portion, and the mobile terminal may include a communication unit configured to perform communication with a vehicle control apparatus installed in a vehicle, a body worn on the user's wrist portion to always contact with the wrist portion, an output unit provided in the body, and a controller configured to control the output unit to output vehicle information on the vehicle acquired from the vehicle control apparatus to the outside.

In this case, the output unit may display the vehicle information on a screen and output it in the form of vibration of the body or voice.

Furthermore, according to an embodiment, the mobile terminal may further include a position detection unit configured to detect the position of the mobile terminal.

In this case, the controller may calculate a driving direction for arriving at the destination of the vehicle according to the location of the mobile terminal, and control the output unit to display an arrow indicating the calculated driving direction in a turn-by-turn (TBT) manner on the screen.

According to a third embodiment, the mobile terminal may further include an input unit configured to receive a user input from the user.

In this case, the controller may generate a vehicle control signal based on the user input, and the control the communication unit to transmit the vehicle control signal to the vehicle control apparatus.

At this time, the vehicle control apparatus may control the vehicle based on the vehicle control signal.

Here, the vehicle information may be information associated with at least one of an air-conditioning function for the vehicle, whether or not a door is open or closed, whether or not a window is open or closed, whether or not a sunroof is open or closed, a battery charging state of the vehicle, a parking position of the vehicle, a navigation function provided in the vehicle, a theft state of the vehicle, and a fueling state of the vehicle.

According to a second embodiment, the controller may generate an alarm signal indicating that the state of the vehicle is abnormal based on the vehicle information, and the output unit may output the alarm signal to the user's wrist portion.

According to a third embodiment, the vehicle control signal may be a control signal for controlling or setting a function associated with at least one of an air conditioning of the vehicle, an opening or closing of a door, an opening or closing of a window, an opening or closing of a sunroof, a battery charging state of the vehicle, a driving of the vehicle, and at least one device provided in the vehicle.

Here, the at least one device may be a device associated with at least one of an audio function, a video function and a navigation function.

According to a third embodiment, the vehicle control apparatus may control at least one of the vehicle, a component included in the vehicle, and a device provided in the vehicle based on the vehicle control signal.

Figure 18:
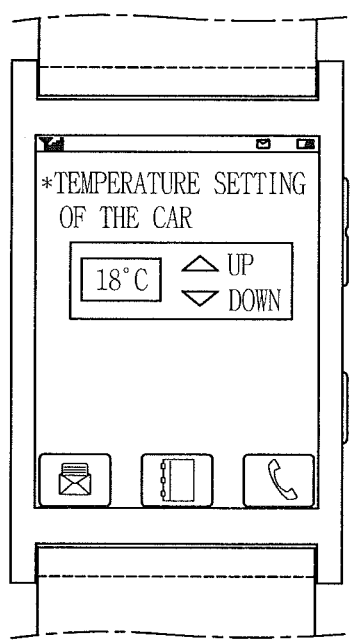
FIG. 18 is an exemplary view illustrating a mobile terminal capable of controlling a vehicle through vehicle control signal generation according to a third embodiment disclosed in the present disclosure.

FIG. 18 is an exemplary view illustrating a mobile terminal capable of controlling a vehicle through vehicle control signal generation according to a third embodiment disclosed in the present disclosure.

Referring to FIG. 18, the mobile terminal 200 according to a third embodiment disclosed in the present disclosure may control an air-conditioning function inside the vehicle.

For example, the mobile terminal 200 may generate the vehicle control signal for controlling an air-conditioning function inside the vehicle through a user input received from a button or graphic object indicating "up" or "down" as illustrated in FIG. 18.

In this case, the vehicle 500 may set the temperature inside the vehicle to 18 degrees based on the vehicle control signal.

On the other hand, the mobile terminal 200 according to an embodiment disclosed in the present disclosure has been described on the condition that a network is supported, but services such as Wi-Fi or tethering may be supported within the mobile terminal 200 itself.

As a result, it may be used while being connected to a network such as a smart phone or tablet. Furthermore, resources such as route guidance or voice recognition may be used from the smart phone or tablet, and associated information may be provided to a preset protocol through tethering. Accordingly, an associated function may be implemented without any network modem such as 3G or LTE.

In this manner, the terminal 200 with no network modem may reduce the unit cost. Furthermore, it may be possible to receive real-time route guidance through tethering using the existing mobile phone.

Furthermore, according to an embodiment disclosed in the present invention, the foregoing method may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented via a carrier wave (for example, transmission via the Internet).

The configurations and methods according to the above-described embodiments will not be applicable in a limited way to the foregoing terminal, and all or part of each embodiment may be selectively combined and configured to make various modifications thereto.

Vehicle to which the Technique of the Present Invention is Applicable

Hereinafter, a vehicle, to which the vehicle control apparatus of the present invention is applicable, will be explained with reference to FIG. 19.

Figure 19:
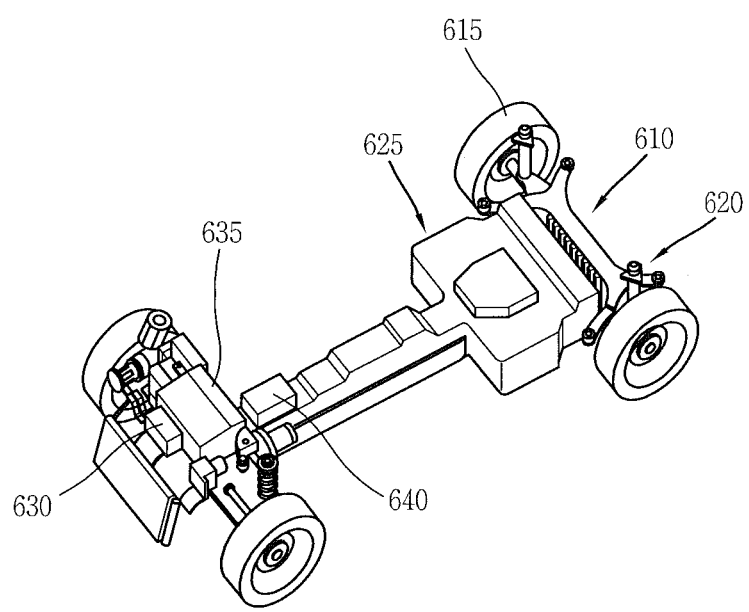
FIG. 19 is a schematic diagram of an electric vehicle having a battery charging apparatus according to an embodiment disclosed in the present disclosure.

FIG. 19 illustrates an electric vehicle. However, it is obvious to those skilled in the art that the technique of the present invention is also applicable to other types of vehicles (e.g., vehicle provided with gasoline engine, diesel engine, or LPG engine) within the scope of the technical spirit of the present invention.

FIG. 19 is a schematic diagram of an electric vehicle having a battery charging apparatus according to an embodiment disclosed in the present disclosure.

As shown in FIG. 19, the electric vehicle 600 having a battery charging device according to an embodiment of the present invention may include a vehicle body 610; a battery 625 provided at the vehicle body 610; and a battery charging device 640 provided at the vehicle body 610, connected to an external power, and configured to charge the battery 625.

Although not shown, a boarding space for a driver or a passenger may be provided at an upper region of the vehicle body 610. For instance, the vehicle body 610 may be provided with a cabin (not shown) having a boarding space therein.

The vehicle body 610 may be provided with a plurality of wheels 615. A suspension device 620 may be provided between the vehicle body 610 and the wheel 615. Under such configuration, a vibration and an impact, which occur when the vehicle body 610 runs on a road, may be attenuated.

The wheel 615 may be provided at each of front, rear, and lateral sides of the vehicle body 610.

The battery 625 for supplying power may be provided at the vehicle body 610.

The battery 625 may be configured as a secondary battery for charging.

An electronic motor 630 for providing a driving force to the wheel 615 may be provided at one side of the vehicle body 610.

An inverter 635 for providing a driving power to the electric motor 630 may be provided at the vehicle body 610. The inverter 635 may be connected to the battery 625 and the electric motor 630, respectively.

The inverter 635 may be connected to the battery 125 to receive a direct current (DC) power, and may convert the DC power to a power suitable for driving of the electric motor 630. Then the inverter 635 may provide the converted power to the electric motor 130.

The battery charging device 640 for charging the battery 625 may be provided at the vehicle body 610. The battery charging device 640 may be provided with a charging circuit 660 connected to an external commercial power (AC), the charging circuit 660 configured to provide the commercial power to the battery 625 after converting the commercial power to a power suitable for charging of the battery 625. Although not shown, the charging circuit 660 may include a commercial power input unit connected to a commercial power and configured to input the commercial power; a rectifying unit and a smoothing unit configured to convert a commercial power input through the commercial power input unit, to a direct current; and a power conversion unit configured to convert a converted direct current into a power suitable for charging of the battery 625, and to output the converted power.

A mobile terminal according to an embodiment disclosed in the present disclosure may acquire vehicle information on a vehicle from a vehicle control apparatus installed in the vehicle, and output the acquired vehicle information to the outside, thereby allowing a user to check the vehicle information in an easy, fast and efficient manner.

Furthermore, a mobile terminal according to an embodiment disclosed in the present disclosure may calculate a driving direction for arriving at the destination of the vehicle in real time according to the position of the mobile terminal, and display an arrow indicating the calculated driving direction in a turn-by-turn (TBT) manner on the screen, thereby receiving a moving direction to the destination when the moving direction is changed. Accordingly, it may be possible to save the power of the terminal, and allow the user to safely move to the destination without continuously keeping his or her eyes on the monitor.

In addition, it may be possible to receive directions in conjunction with vehicle navigation in an uninterrupted manner and to safely change the destination. At this time, a terminal microphone may be used to increase its voice recognition rate compared to when using a vehicle microphone. As a result, it may be possible to enhance the user's convenience.

The scope of the invention is not limited to those specific embodiments, and thus various modifications, variations, and improvements can be made in the present invention without departing from the concept of the invention, and within the scope of the appended claims.

What is claimed is:

1. A watch-type mobile terminal worn and used on a user's wrist portion, the mobile terminal comprising:
   a communication unit configured to perform communication with a vehicle control apparatus installed in a vehicle;
   a body worn on the user's wrist portion to always contact with the wrist portion;
   an output unit provided in the body;
   a position detection unit configured to detect the position of the mobile terminal;
   an input unit configured to receive the destination of the vehicle, wherein the input unit receives the destination of the vehicle based on at least one of a user's touch input and voice input; and
   a controller configured to:
      control the output unit to output vehicle information on the vehicle acquired from the vehicle control apparatus to the outside, wherein the output unit displays the vehicle information on a screen and outputs it in the form of vibration of the body or voice,
      calculate a driving direction for arriving at the destination of the vehicle in real time according to the position of the mobile terminal, and
      control the output unit to display an arrow indicating the calculated driving direction in a turn-by-turn (TBT) manner on the screen,
   wherein the vehicle control apparatus performs a navigation function for the vehicle,
   wherein the communication unit receives vehicle driving information associated with the navigation function from the vehicle control apparatus when a navigation link function is activated,
   wherein the controller controls the output unit to display an arrow indicating a driving direction of the vehicle in a turn-by-turn (TBT) manner on the screen based on the received vehicle driving information, and
   wherein the controller determines whether or not the user gets off the vehicle prior to arriving at the destination of the vehicle, and activates a pedestrian mode to output a walking direction to the destination of the vehicle through the output unit when the user gets off the vehicle prior to arriving at the destination of the vehicle.

2. The mobile terminal of claim 1, wherein the communication unit transmits the destination and the position of the mobile terminal to a previously set vehicle navigation apparatus.

3. The mobile terminal of claim 1, wherein the turn-by-turn navigation is a scheme in which only the arrow is displayed on the screen or in which the arrow is displayed in a size larger than that of at least one graphic object when there exists the at least another graphic object for providing a vehicle navigation function.

4. The mobile terminal of claim 1, wherein the output unit displays additional information associated with at least one of the destination, a stopover on a driving route from the position of the mobile terminal to the destination, a distance from the position of the mobile terminal to the destination, a total required time, a remaining required time, and an arrival time, along with the arrow on the screen.

5. The mobile terminal of claim 1, wherein the vehicle driving information comprises information associated with at least one of a destination of the vehicle, a stopover on a driving route, a current position of the vehicle, a speed of the vehicle, and a driving direction of the vehicle.

6. The mobile terminal of claim 1, wherein the controller activates a navigation link function when the execution of the navigation link function for the vehicle is recognized by the vehicle control apparatus.

7. The mobile terminal of claim 1, wherein the output unit displays an arrow indicating the walking direction in a turn-by-turn (TBT) manner on the screen.

8. The mobile terminal of claim 1, wherein the controller activates the pedestrian mode when it is difficult to move the vehicle from a current position of the vehicle to a destination of the vehicle.

9. The mobile terminal of claim 1, wherein the controller activates the pedestrian mode based on at least one of the user's touch input and voice input.

10. The mobile terminal of claim 1, wherein the controller activates the pedestrian mode when the mobile terminal is away from the vehicle by more than a predetermined distance.

11. A watch-type mobile terminal worn and used on a user's wrist portion, the mobile terminal comprising:
   a communication unit configured to perform communication with a vehicle control apparatus installed in a vehicle;
   a body worn on the user's wrist portion to always contact with the wrist portion;

an output unit provided in the body;
a position detection unit configured to detect the position of the mobile terminal; and
a controller configured to:
control the output unit to output vehicle information on the vehicle acquired from the vehicle control apparatus to the outside, wherein the output unit displays the vehicle information on a screen and outputs it in the form of vibration of the body or voice,
calculate a driving direction for arriving at the destination of the vehicle in real time according to the position of the mobile terminal, and
control the output unit to display an arrow indicating the calculated driving direction in a TBT manner on the screen, wherein the output unit outputs a preset notification signal prior to the vehicle arriving at a turn point at which the driving direction of the vehicle should be changed according to an arrow indicating the driving direction.

12. The mobile terminal of claim 11, wherein the preset notification signal is output in the form of vibration of the body or voice.

13. A watch-type mobile terminal worn and used on a user's wrist portion, the mobile terminal comprising:
a communication unit configured to perform communication with a vehicle control apparatus installed in a vehicle;
a body worn on the user's wrist portion to always contact with the wrist portion;
an output unit provided in the body;
a position detection unit configured to detect the position of the mobile terminal;
a controller configured to:
control the output unit to output vehicle information on the vehicle acquired from the vehicle control apparatus to the outside, wherein the output unit displays the vehicle information on a screen and outputs it in the form of vibration of the body or voice,
calculate a driving direction for arriving at the destination of the vehicle in real time according to the position of the mobile terminal, and
control the output unit to display an arrow indicating the calculated driving direction in a TBT manner on the screen; and
an input unit configured to receive a screen mode change input from the user,
wherein the output unit displays a screen in the turn-by-turn manner when the screen display mode is a TBT screen display mode, and displays a driving route to the destination of the vehicle and a map around the driving route on the screen when the screen display mode is a MAP screen display mode, and displays a screen in the TBT screen display mode and a screen in the MAP screen display mode at the same time when the screen display mode is a dual screen display mode, and
the controller changes the screen display mode to the MAP screen display mode when the screen mode change input is received in a state that the previously set screen display mode is a TBT screen display mode, and changes the screen display mode to the TBT screen display mode when the screen mode change input is received in a state that the previously set screen display mode is a MAP screen display mode.

14. The mobile terminal of claim 13, wherein the input unit receives a screen mode setting input from the user, and
the controller sets the screen display mode to any one of the TBT screen display mode, the MAP screen display mode and the dual screen display mode based on the screen mode setting input.

15. The mobile terminal of claim 14, wherein the output unit comprises a touch screen, and
the screen mode change input is a user touch input through the touch screen.

16. The mobile terminal of claim 15, wherein the vehicle control signal is a control signal for controlling or setting a function associated with at least one of an air conditioning of the vehicle, an opening or closing of a door, an opening or closing of a window, an opening or closing of a sunroof, a battery charging state of the vehicle, a driving of the vehicle, and at least one device provided in the vehicle.

17. A watch-type mobile terminal worn and used on a user's wrist portion, the mobile terminal comprising:
a communication unit configured to perform communication with a vehicle control apparatus installed in a vehicle;
a body worn on the user's wrist portion to always contact with the wrist portion;
an output unit provided in the body;
a position detection unit configured to detect the position of the mobile terminal; and
a controller configured to:
control the output unit to output vehicle information on the vehicle acquired from the vehicle control apparatus to the outside, wherein the output unit displays the vehicle information on a screen and outputs it in the form of vibration of the body or voice,
calculate a driving direction for arriving at the destination of the vehicle in real time according to the position of the mobile terminal, and
control the output unit to display an arrow indicating the calculated driving direction in a TBT manner on the screen, wherein the controller collects pattern information on the user's driving pattern for the vehicle or the user's walking pattern for a predetermined period of time, and changes a screen display time point of the arrow based on the pattern information.

18. The mobile terminal of claim 17, wherein the driving pattern comprises information associated with at least one of a driving speed, a number of sudden acceleration, and a number of sudden braking.

19. The mobile terminal of claim 17, wherein the walking pattern is information associated with a walking speed.

* * * * *